US012266329B2

(12) United States Patent
Lyske

(10) Patent No.: US 12,266,329 B2
(45) Date of Patent: Apr. 1, 2025

(54) FORM ATOM HEURISTICS AND GENERATIVE COMPOSITION

(71) Applicant: DAACI Limited, London (GB)

(72) Inventor: Joseph Michael William Lyske, Greater London (GB)

(73) Assignee: DAACI Limited, London (GB)

( * ) Notice: Subject to any disclaimer, the term of this patent is extended or adjusted under 35 U.S.C. 154(b) by 0 days.

(21) Appl. No.: 17/990,639

(22) Filed: Nov. 18, 2022

(65) Prior Publication Data

US 2023/0197041 A1 Jun. 22, 2023

Related U.S. Application Data

(63) Continuation of application No. 17/707,923, filed on Mar. 29, 2022, now Pat. No. 11,514,877, which is a (Continued)

(51) Int. Cl.
*G10H 1/00* (2006.01)

(52) U.S. Cl.
CPC ......... *G10H 1/0025* (2013.01); *G10H 1/0041* (2013.01); *G10H 2210/111* (2013.01);

(Continued)

(58) Field of Classification Search
CPC ............... G10H 1/0025; G10H 1/0041; G10H 2210/111; G10H 2210/555;

(Continued)

(56) References Cited

U.S. PATENT DOCUMENTS 5,052,267 A * 10/1991 Ino .......................... G10H 1/38
84/613
5,308,915 A 5/1994 Ohya et al.

(Continued)

FOREIGN PATENT DOCUMENTS

AU 704985 C 8/2001
EP 1 274 069 A2 1/2003

(Continued)

OTHER PUBLICATIONS

Horner et al. "Genetic Algorithms and Computer-Assisted Music Composition" URBANA vol. 51, pp. 437-441, Jul. 13, 1991.

(Continued)

*Primary Examiner* — Jianchun Qin
(74) *Attorney, Agent, or Firm* — Burdick Patents, P.A.; Sean D. Burdick; Colin L. Honan

(57) ABSTRACT

A Form Atom defined by self-contained constructional properties representing a historical corpus of music and contained within metadata of the Form Atom is disclosed. The Form Atom has a generative set of heuristics to support generation of a set of chords in a chord scheme or many different sets of chords. The generated chords are spaced out within a defined window of musical time by chord spacer heuristics. The Form Atom has a tag describing its compositional heuristics. A chord list of the Form Atom is provided in local tonic and defines branching structures that may be used for the generation of different chords from the local tonic. A progression descriptor is combined with a form function such that the Form Atom expresses musically a question, an answer and a statement. A meta-map of a chord scheme for a musical section is created from the metadata.

8 Claims, 25 Drawing Sheets

Related U.S. Application Data continuation-in-part of application No. 17/219,610, filed on Mar. 31, 2021, now Pat. No. 11,978,426.

(52) U.S. Cl.
CPC . *G10H 2210/555* (2013.01); *G10H 2210/576* (2013.01); *G10H 2240/075* (2013.01); *G10H 2240/145* (2013.01); *G10H 2250/015* (2013.01)

(58) Field of Classification Search
CPC ....... G10H 2210/576; G10H 2240/075; G10H 2240/145; G10H 2250/015
See application file for complete search history.

(56) References Cited

U.S. PATENT DOCUMENTS

| | | | |
|---|---|---|---|
| 5,877,445 A | 3/1999 | Hufford et al. | |
| 6,297,439 B1 | 10/2001 | Browne | |
| 8,996,538 B1 | 3/2015 | Cremer et al. | |
| 9,542,919 B1 | 1/2017 | Bencar et al. | |
| 2005/0144016 A1 | 6/2005 | Hewitt et al. | |
| 2006/0180005 A1 | 8/2006 | Wlfram | |
| 2011/0010321 A1 | 1/2011 | Pachet et al. | |
| 2015/0013528 A1 * | 1/2015 | Buskies | G10H 1/0066 84/611 |
| 2015/0081065 A1 | 3/2015 | Ball et al. | |
| 2017/0084258 A1 * | 3/2017 | Swiggett | G10H 1/38 |
| 2017/0186411 A1 | 6/2017 | Mintz et al. | |
| 2018/0139268 A1 | 5/2018 | Fuzell-Casey et al. | |
| 2019/0341010 A1 | 11/2019 | Wipperfürth | |
| 2020/0074967 A1 * | 3/2020 | Lyske | G11B 27/036 |
| 2020/0188790 A1 | 6/2020 | Galuten | |

FOREIGN PATENT DOCUMENTS

| | | | |
|---|---|---|---|
| EP | 1666967 | A1 | 6/2006 |
| JP | 4971023 | B2 | 7/2012 |
| WO | 96/24422 | A1 | 8/1996 |
| WO | 01/86625 | A2 | 11/2001 |
| WO | 01/86628 | A2 | 11/2001 |
| WO | 2009107137 | A1 | 9/2009 |
| WO | 2015154159 | A1 | 10/2015 |
| WO | 2020/06792 | A1 | 4/2020 |
| WO | 2020/067969 | A1 | 4/2020 |
| WO | 2020/067972 | A1 | 4/2020 |

OTHER PUBLICATIONS

Combined Search and Examination Report issued on May 18, 2022 for GB 2104696.6 (9 pages).
International Search Report and Written Opinion mailed on Oct. 4, 2022, to PCT Application No. PCT/EP2022/058509.
Partial EP International Search Report issued on Jul. 12, 2022 for PCT Application No. PCT/EP2022/058509 (18 pages).
Partial Search Report and Search Opinion issued on Jul. 11, 2022 for GB 22165702.6 (16 pages).
Search Report issued on May 17, 2022 for GB2104696.6 (1 page).

* cited by examiner

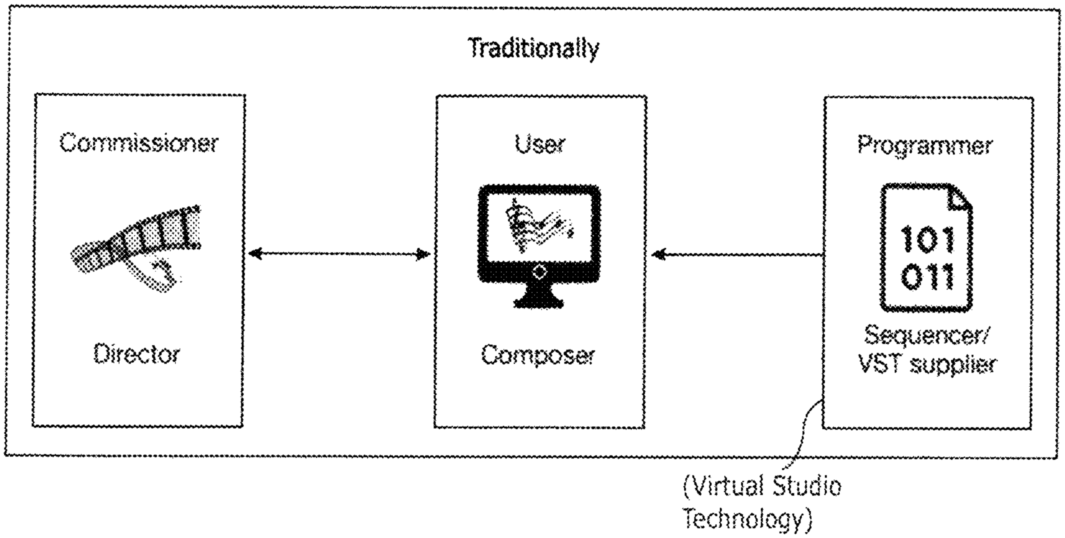
FIG. 1A: PRIOR ART
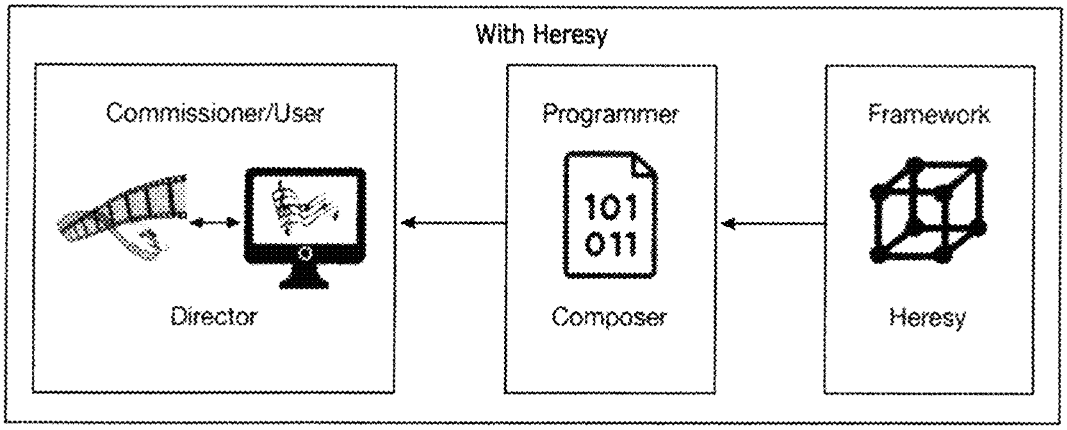
FIG. 1B

FIG. 2A: PRIOR ART (photographic image)

THE HIGH AND THE MIGHTY
Orchestral Suite from the Motion Picture Score
Composed by
Dimitri Tiomkin
Andante maestoso

FIG. 2B: PRIOR ART (photographic image, final score: partial)

$III_m$ => IV => V => I

| Bar | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Treble | 5 | 3 | 3b | 7 | 3 | 5 | 3 | 5 | 3 | 7 | 7 | 7 | 5 | 7 | 7 | 5 | 3b | 3 | 5 | 3 | 3 | 3 | 3 | 3 |
| Bass | 7 | 5 | 5 | 5 | 5 | 7 | 5 | 7 | 5 | 5 | 5 | 5 | 7 | 5 | 5 | 7 | 5 | 5 | 3 | 5 | 5 | 5 | 5 | 5 |

| Bar | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| pattern | 1 | ↓1 | ↓1 | ↑5 | ↓1 | ↓1 | ↓1 | ↓1 | ↓1 | ↑5 | ↑5 | ↑b6 | ↓1 | ↑4 | ↓1 | ↓b9 | ↑3 | ↓1 | ↑7 | ↓1 | ↑$^{7}_{4}$ | ↓1 | ↑7 | ↑7 |
| 5th pos | T | B | B | B | B | T | B | T | B | B | T | B | T | B | B | T | B | B | T | B | B | B | B | B |

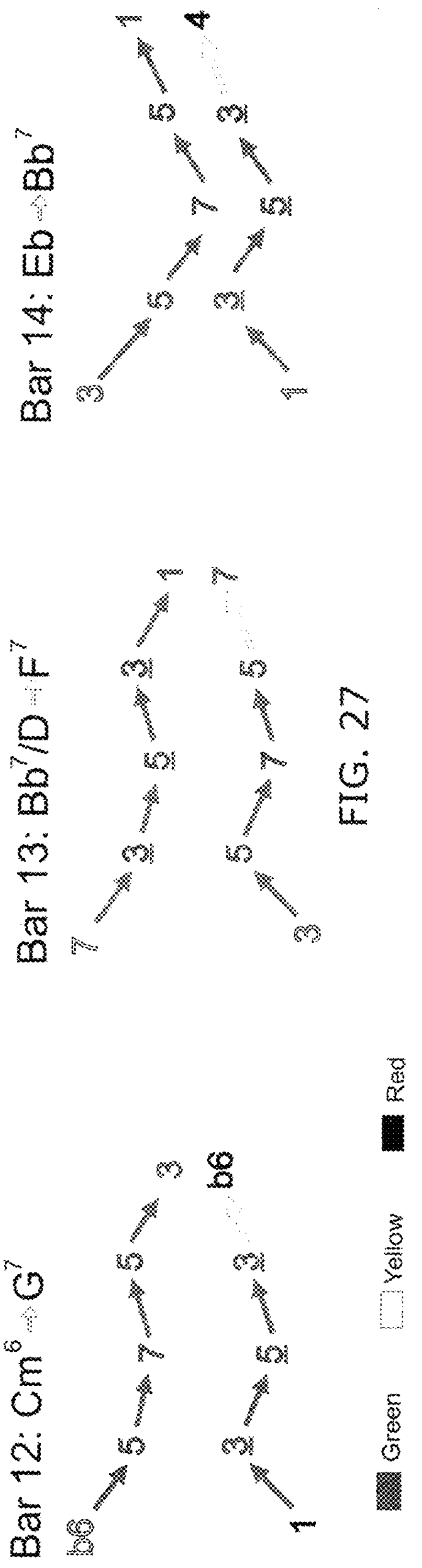
FIG. 27
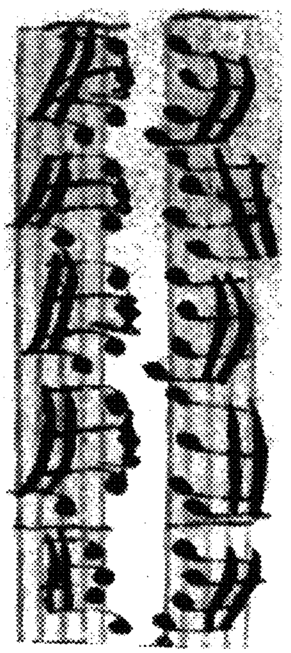
FIG. 28 Prior Art (photographic reproduction)

FORM ATOM HEURISTICS AND GENERATIVE COMPOSITION

CROSS REFERENCE TO RELATED APPLICATIONS

This application is a continuation of and claims priority to U.S. application Ser. No. 17/707,923, filed Mar. 29, 2022, which is a continuation-in-part of and claims priority to U.S. application Ser. No. 17/219,610 that was filed on Mar. 31, 2021, both of which are fully incorporated herein by reference.

BACKGROUND TO THE INVENTION

This invention relates, in general, to signal processing by an apparatus of an audio input signal to split that signal into fundamental constituent data elements, and the mathematical functions thereof necessary to reproduce this signal as well as a plethora of new signals, with differing internal structural properties and differing boundary conditions that permit, through mapping and/or textural classification, the identification of both permissible linkages between constituent data elements and subsequent generative output from the identified mathematical functions, concatenated re-assembly into a different signal with a different structure. More particularly, the present invention relates to a system supporting original generative composition, not just recombination of existing material especially in the context of music and how an original composition can be generated to align with and reflect an emotionally descriptive narrative, such as a described scene in a film script. More particularly, but not exclusively, the present invention relates to a process for identifying and parsing, in existing tonal (as well as non-tonal) music, Form Atoms of varying length and where each Form Atom defines a contextually smallest meaningful snippet or element of musical content having both boundary conditions and compositional properties that permit automated concatenation of multiple Form Atoms into a new musical composition having good musical form but at least acceptable musical form.

SUMMARY OF THE PRIOR ART

Music in its own right does not exist because it is undetectable by science. Rather, music reflects observation by the mind that provides a response in the brain. A profound couple of statements but reflective of the fact that music and, more particularly, the appreciation of music reduces to signal processing and mental stimulation associated with the interpretation of a subjectively constructed journey in sound that exploits the concepts of "tension" and "release" as each is resolved in the mind of the listener. Regardless of what music amounts to and whether it is based on western, tribal or oriental structures, there are desirable physiological effects associated with music, with these effects further affecting emotional responsiveness and demeanour.

Music theory has traditionally been more of a folk psychology used to name and categorise music, rather than a theory in a scientific sense that can predict the effectiveness of a passage, or the next note or chord in a piece.

'Good' music—in the sense of an artistically appreciated structured composition—is music that the mind (i.e., relevant neural pathways and centres of the brain) models successfully by being able to predict both an increase in tension within a musical journey and then the following release of that tension. Alternatively, this can be thought of as a compositional piece asking a question, as reflected in musical phrasing or musical structure, and then the compositional piece answering that question shortly after the question has been posed to permit mindful termination of a particular part within the entirety that is the musical journey in the composition. The question is thus a construct of tension in the music, and the release of a construct that correlates to an appropriate musical answer that puts the change in tonality into perspective. A more complete definition is provided below for these terms to enhance the reader's understanding of what these semantic terms mean in a more technical sense.

Putting the above into a psychological perspective, "good music" is recognised through a self-gratification process in which the mind firstly predicts what it thinks will be delivered by the musical journey, and when an "I was right" prediction is confirmed the reward system of the brain triggers to complete the reward. Whilst not wishing to be bound by theory, it is understood that the reward system refers to a group of structures that are activated by rewarding or reinforcing stimuli. When exposed to a rewarding stimulus (such as good music), the brain responds by increasing the release of the neurotransmitter dopamine. The structures associated with the reward system are found along the major dopamine pathways in the brain, including the ventral tegmental area (VTA) and the nucleus accumbens in the ventral striatum. Another major dopamine pathway, the mesocortical pathway, travels from the VTA to the cerebral cortex and is also considered part of the reward system.

In contrast, "bad music" or bad composition or "bad form" corresponds to reduced reward/gratification that arises from the brain's inability to predict anything from seemingly/ostensibly meaningless random musical events, and thus the brain's inability to congratulate itself with a reward arising from stimulation.

A significant and unaddressed problem that has prevented the effective automated generation of "good" music is "form". The question is how to implement technically a process that does not generate randomness and which technical system is imbued with a technical mechanism that provides consistent evaluation of signal components initially to classify fundamentally compatible musical sections and then to permit those musical sections to be automatically selected and concatenated together seamlessly to provide a new generative composition; this is far from simple.

In fact, with respect to "form" composers require experience to identify "form", and even accomplished composers frequently have failed to appreciate acceptable form until later in their evolutionary compositional life. Even with the gained appreciation of form, composers frequently revert to templates in all their compositions. Templates provide a pre-structured structure on which the desired narrative is hung. A template can, for example, be sonata form or a rondo and other forms, as will be understood. As a specific example, the first movement of any symphony or concerto will share an identical form but a different narrative, e.g. A-B-A-B-C and then D, where A is the first subject in the major/dominant tonic, B is a contrasting key centre to the major/dominant tonic and A and B together form the "exposition", C is the conflict between A and B (which is also known as the "development") and D is the "recapitulation" or resolution of A and B.

"Form", in contrast with "narrative", the latter being what one intends to express musically, i.e., the story between a beginning and end point as expressed by a set of emotional icons such as intensity swells and climaxes, is the structure of linking musical elements together in a musically sensible fashion that avoids discontinuity or randomness (in musical terms) such that a smooth transition is achieved between the syntax of the composite elements. Expressing "form" more tangibly but still subjectively, "good form" may be the syntax reflected in codes and conventions in accepted musical compositions, whereas "bad form" has no obvious or known linking that makes any discernible musical sense between successive musical elements/phrases and, indeed, "bad form" in music will fail to communicate structure because the sound signals cannot logically be processed by the brain.

The problem is that when any generative composition needs to adapt to follow a narrative that is different than that that can be laid down by an initial form template, regardless of whether it is human or machine-based, systems struggle to realise a generative mechanism that consistently achieves "good form" and thus the generation of relatively high levels of dopamine in the brain's reward centres. And with a failure to achieve "good form", by definition the composition acquires "bad form" and correspondingly identifiable qualitative and/or measurable decreases in brain stimulation, particularly associated with the reward centres. Effective generative composition thus leads to a tangible technical effect with an associated technical assessment process. Indeed, better generative composition leads to increasing levels of detectable stimulation/brain activity.

Indeed, identification of common musical traits in splice compatible musical elements is desirable and useful to game developers and/or advert or film trailer producers/editors who are tasked with rapidly compiling a suitable multimedia product that aligns relevant music themes, such as increasing musical intensity (in the context of an increasing sense of developing drama and urgency and not necessarily in the context of an absolute audio power output level) with video output. To provide a context for the problem of composition in a commercial environment, the generation of an appropriate film score is a first example. Currently, the film director will write a narrative reflecting the evolution of action in a scene and will then approach a composer for a suitable composition. The composer will review the narrative and attempt to tailor a composition to the narrative in the provision of a "demo" to the client, such as a film director or game designer.

More particularly, music for films, TV and adverts follows a similar commissioning and production pattern. A composer is commissioned typically by a director or producers. Their choice of the composer is either based on a musical showreel, or through the fact that the commissioner knows the composer's specific discourse and desires it for their project. Before the composer views the pictures, a temp track is typically used to aid in the editing process as well as to give an idea for the type of pace and mood that the commissioner wishes the film to have at specific points. The composer and commissioner then meet for what is known as a "spotting session". In this meeting, the parties view the temp track and discuss the project in terms of where the music should start and stop, a process known as spotting. All other parameters for each section of self-contained music, or music cue, in the film are also considered. This process completes the brief, which consists of entry and exit timings for each cue, any hit points within the cue, and the mood, orchestration, and pace of the cues. Hit points are points on the timeline where the music should "hit" the action, such as Tom being hit over the head with a frying pan by Jerry. From this, the composer produces a demo of the desired tracks for each cue. These tracks are then auditioned by the commissioners and feedback is provided for the cue's refinement. Once the tracks are considered to be in a satisfactory state by all parties, they are then recorded, or baked as it is known.

Interestingly, film composers are prone to borrow and steal ideas from historical pieces and those of other contemporary composers in order to satisfy various briefs, just as John Williams did when lifting a complete orchestral section of the closing of Mars from Holst's The Planets suit in his opening credits for the film Star Wars (Kurtz & Lucas, 1977). Indeed, this point is openly spoken about by John Williams himself in an interview with David Meeker at the BFI (Meeker, 1978). Indeed, it is evidently clear that composers revisit scores and not only tweak them as Bach did (Ledbetter, 2002), but completely reform them so as to make a better temporal narrative, as was the case with Rachmaninoff s Piano Concerto No. 4 (Norris, 2001).

This also leads to the question of the presently perceived artistic process of composition, although with generative composition this must necessarily technically assess "form" and for such "form" to be maintained sufficiently under the control of the system intelligence assembling the generative work.

This iterative process of film score multimedia composition may—or may not—lead to a composition that has "good form", and it will involve again the film director in making a decision as to whether the remotely composed score is acceptable with the requisite level of "good form". The composer, as indicated above, is likely also to be influenced by their own prior compositions and, frequently, will make use of these personal templates in composing the "new" musical work. The use of such personal templates, which generally means that they have accepted form qualities, invariably leads to a score that is "samey"; this is not necessarily a good thing. For example, there are noticeable common traits in the compositions of the main themes for the movies Superman® and Star Wars® since both were penned by John Williams.

In providing at least one resultant "demo" for review, the developer or editor has already expended considerable time in identifying potentially suitable music and then fitting/aligning the selected music to the video. To delay having to identify a commercially-usable audio track, content developers presently may make use of so-called "temp tracks" that are often well-known tracks having rights that cannot be easily obtained, but this is just a stop-gap measure because a search is then required to identify a suitable commercially-viable track for which use rights can be obtained. Further time delays then arise from the instructing client having to assess whether the edit fits with their original brief. Therefore, an effective bank of cross-referenced musical elements that are contextually related to each other in the sense of "form" would beneficially facilitate effective generative composition for alignment with, for example, a visual sequence or the building of a musical program (such as occurs within film score development, TV or streamed advertising and "spin" classes that choreograph cycling exercise to music to promote work rates).

Interestingly, there is rarely a record of the crafting that went into any compositional decisions, although some do exist and provide great insight into the compositional process (Ledbetter, 2002)(Norris, 2001)(Cooper, 1992). Mostly, we are just left with a single score or performance, leading to an attitude of idolisation for the chosen notes; that is, notes that made it into the final manuscript that appear selected from a perfectionist standpoint. Evidence of the alternatives a composer may have taken paint a picture of compositional craft and choice that inevitably led to certain decisions of an arbitrary nature. In (Meeker, 1978), John Williams states that he had 97 different versions of what became the five-note theme to Close Encounters (Phillips & Spielberg, 1977). These were grouped into four groups of variations initially, which were reduced and further refined from there through discussions with the director Steven Spielberg until he arrived at the famous five note melody that is known. However, William's own remarks nevertheless did not stop individuals writing about the apparent mathematics and physics-related perfection of his, and the director's, final choice for those five pitches in a particular chord, with particular timing and note duration. To Williams, it was clear that this was a set of notes no better than many others; however, they were the chosen ones that others have come to believe were in some sense preordained and, arguably, those with best "good form".

As another example, an interactive game provides no tailored user-experience with respect to the accompanying musical score. Presently, "it is what it is" for the particular aspect of the game or scene in a game and just reflects base programming. Should there be an effective generative process, then the sound experienced in terms of musical textures can provide an enhanced indication for the user as viewed from the emotional perspective of the on-screen avatar. For example, it would be an immersive experience for a player to be exposed to a user-dedicated specific musical segment that reflected growing emotional or physical conditions of the player's in-game avatar. Currently, gaming systems provide no audible suggestion of in-game issues that the avatar is facing/experiencing and this is to the detriment of the physical player experience. The problem, however, is that each player journey is unique so how does a relevant tailored and meaningful sound experience get generated on-the-fly? And, in fact, can such a sound experience be tailored to music that has particular connotation and relevance to a specific user? At the moment, any accompanying game-related score is simply a generic path that may have no emotional connection to the player and, indeed, the score may actually not emotionally resonate with the player or actually may be disliked by the player.

Generative music compilers do exist. These existing systems typically use some form of Markov process to generate chords, but all have a series of algorithms that produce different notes across different instruments. The problem with the prior art approaches is that they support little if any creativity and little if any ability to manipulate compositional content. In fact, the prior art approaches all generally produce compositions that sound the same because all generated composition is based on a fixed number of predefined instrumental templates. The consequence of this straight-jacketing approach is a loss of musical texture. This is a significant problem which diminishes usability because of the resultant sameness.

There are various methods for writing chord schemes that have been implemented over the years (C. Johnson, Carballal, & Correia, 2015; Lerdahl & Jackendoff, 1996; Nierhaus, 2009). The aesthetic valuation for any given method is based on the developer's artistic requirements, justifications, post-rationalisations, or simple tolerances. Experience in fact shows that it can be considered acceptable for any chord to follow any other chord given enough context in the surrounding harmonic progression. When choosing a chord to follow another one, if this context is ignored and we only look for evidence of the sequence in an example, we find ourselves in the position whereby chord schemes simply become a randomised sequence.

Whilst the present invention relates to a signal processing of a sound signal especially for use in a generative sense, in order to provide further context it is appropriate to provide a working basis for the terminology that is used by musicians and which is relevant to specific embodiments and implementations of the invention. In this respect:

In Western musical theory, a cadence is a melodic or harmonic configuration that creates a sense of resolution (finality or pause), especially since any cadence has decreasing emphasis. A harmonic cadence is a progression of (at least) two chords that concludes a phrase, section or piece of music. And a rhythmic cadence is a characteristic rhythmic pattern that indicates the end of a phrase. A cadence can be weak or strong depending on its sense of finality. While cadences are usually classified by specific chord or melodic progressions, the use of such progressions does not necessarily constitute a cadence; there must be a sense of closure as at the end of a musical phrase. Generally, harmonic rhythm plays an important part in determining where a cadence occurs. Cadences are also strong indicators of the tonic or central pitch of a passage or piece of music, In music, the tonic is the first scale degree of the diatonic scale (the first note of a scale) and the tonal centre or final resolution tone that is commonly used in the final cadence in tonal (musical key-based) classical music, popular music, and traditional music. In the do solfege system, the tonic note is sung as do. More generally, the tonic is the note upon which all other notes of a piece are hierarchically referenced. Scales are named after their tonics: for instance, the tonic of the C major scale is the note C. The term tonic can also be referred to as a the keycentre. The local tonic, e.g., Cm or Bb, provides both the first and last notes of the scale.

A triad formed on the tonic note, the tonic chord, is thus the most significant chord.

A chord is a series of pitches played in parallel with each other and which are tied to a keycentre. In terms of function, the mind makes use of a chord to predict where it is in the composition. A chord does not in its own right have any lexicological meaning because musical meaning is derived from the syntax, i.e., the sequence of chords.

A chord scheme is a chain of chords.

A metachord scheme are the principals of how a chord scheme is written.

Major and minor scales' are two of the most popular and commonly used scales in western music, with a set of notes each with a distinct pitch forming the scale. Major and minor scales are variations of the diatonic scale in which there are pitch intervals of five full steps and two half steps, with the relative pitch/physical displacement of the third note determining whether the scale is major or minor. This third note makes the major scale brighter and more cheerful sounding while giving the minor scale its characteristic sadness, melancholy and darkness. In a major scale, the third note is one note higher than the minor 3rd note. The pattern of steps in a major scale has note spacing WWHWWWH (where W representing transition of a whole note and H representing transition of a half note), whereas the pattern in a minor diatonic scale has note spacing WHWWHWW. Ire convention Western music, any major or minor key will have seven degrees/notes in its scale, i.e., notes A to G.

Whilst the inventive concepts—of which there are many—will now be described in considerable detail, the following description of additional musical terminology may further assist.

Particularly in Western music, the relationship between chords is defined by the degree of scale. The degree of scale refers to the position of a particular note (having a particular pitch) on a scale relative to the tonic, i.e., the first and main note of the scale from which each octave is assumed to begin. In music theory, a diatonic scale is any heptatonic scale that includes five whole steps (whole tones) and two half steps (semitones) in each octave, in which the two half steps are separated from each other by either two or three whole steps, depending on their position in the scale. This pattern ensures that, in a diatonic scale spanning more than one octave, all the half steps are maximally separated from each other (i.e. separated by at least two whole steps).

An octave is the difference in pitch between two notes where one has twice the frequency of the other. Two notes which are an octave apart always sound similar and have the same note name, e.g., C, while all of the notes in between sound distinctly different, and have other note names e.g., D, E, F, etc. Notes naturally fall into groups of twelve, which are all one octave apart from each other. An octave thus comprises 12 equal semitones, with each semitone therefore having a frequency step in a ratio of $2^{1/12}$ to the earlier frequency.

Further, it will also be appreciated that the choice of the note within a chord leads to its classification. For example, a three-note chord (which incidentally is a "triad") can have varying note spacing between the three notes of:

- for a minor triad, 3 semitones followed by 4 semitones;
- for major triad, 4 semitones, followed by 3 semitones;
- for an augmented triad, 4 semitones, followed by 4 semitones; and
- for a diminished triad, 3 semitones, followed by 3 semitones.

Whilst not wishing to teach your grandmother to suck eggs, a dominant 7th is where the (piano) chord includes a fourth note that is a degree/scale note down from the 8th (i.e. the repeating note in the next octave), whereas a major 7th is where the chord includes a fourth note that is a semitone down from the 8th.

Clearly, as will be understood, a full orchestration for multiple instruments will have different scores for each instrument, with different instruments having different numeric representations on the Musical Instrument Digital Interface protocol (MIDI) scale. For example, middle C has a value of 60 (representing a real-world frequency of 261.63 Hz using contemporary tuning of A=440 Hz).

Instruments have idiomatic restrictions. For example, a conventionally tuned 4-string bass guitar, the lowest MIDI value is position 28. Conversely, a violin will only generally be able to play two notes simultaneously with these having a lowest note having a MIDI value 55.

Returning to the underlying technical problems associated with effective automated generative composition, another issue faced by the music industry is how best to augment the listener/user experience, especially on a personal/individual level. Indeed, it has long been recognized that the contextual relevance of or relationship between a piece of music and an event brings about recognition or induces a complementary emotional response, e.g., a feeling of dread or suspense during a film or a product association arising in TV advertising.

Tailoring a generative sound experience to a narrative articulated by an end user having no credentials in composition would be advantageous provided that the composition was quickly generated and of a discernible standard. However, in short, for automated generative composition, there is presently no effective way to assess "form" in a sound signal comprised from selectively linked musical phrases typically expressed in terms of bars, or indeed how a procedure for generative composition can be automated to avoid "bad form" and thus to impose the related consequences on human physiology and state of mind.

SUMMARY OF THE INVENTION

In overview, a generative composition system reduces existing musical artefacts to constituent elements termed "Form Atoms". These Form Atoms may each be of varying length and have musical properties and associations that link together through Markov chains. To provide myriad new composition, a set of heuristics ensures that musical textures between concatenated musical sections follow a supplied and defined briefing narrative for the new composition whilst contiguous concatenated sections, such as Form Atoms, are also automatically selected to see that similarities in respective and identified attributes of musical textures for those musical sections are maintained to support maintenance of musical form. Independent aspects of the disclosure further ensure that, within the composition work, such as a media product or a real-time audio stream, chord spacing determination and control is practiced to maintain musical sense in the new composition. Further and additionally, a new and complementary but independent technical approach structures primitive heuristics to maintain pitch and permit key transformation.

According to a first aspect of the invention there is provided a generative composition system, comprising: an input coupled to receive a briefing narrative describing a musical journey with reference to a plurality of emotional descriptions for a plurality of musical sections along the musical journey; a database comprising a multiplicity of music data files each generating, when instantiated, an original musical score and wherein each original score is partitioned into a multiplicity of identifiable concatenated Form Atoms having self-contained constructional properties and where each has: a tag that describes a compositional nature of its respective Form Atom; a set of chords in a local tonic, and a progression descriptor in combination with a form function that expresses musically one of a question, an answer and a statement, and wherein musical transitions between Form Atoms are mapped to identify and then record established transitions between Form Atoms in multiple original scores and such that, within the system, groups exist in which Form Atoms are identified as having similar tags but different constructional properties; and processing intelligence responsive to the briefing narrative and coupled to the database, wherein the processing intelligence is arranged to: assemble a generative composition having regard to the briefing narrative through selection and concatenation of Form Atoms having tags that align with emotional descriptions timely required by respective ones of the plurality of musical sections; and select and substitute Form Atoms from different original scores into the generative composition, the substitute Form Atom: derived from any original score; and having its compositional nature aligned with the emotional descriptions.

The database may include heuristics in the form of meta-data containing information explaining how to reconstruct original musical artefacts as well as alternatives thereto.

The Form Atom may be assembled into a string of form atoms that generate a string of chord schemes with associated timing.

The system can include chord spacer heuristics arranged to distribute chords across a stipulated time window.

The system intelligence may be arranged to process chord schemes to instantiate textures where texture notes are derived from chords and their associated timings.

Each Form Atom has minimal length and different Form Atoms may embody different musical durations.

In one embodiment, a subset of the tags may be semantically identical.

In another embodiment, each Form Atom never includes a tonic in a middle section of the Form Atom.

Each Form Atom will have a specific set of chords in a local tonic expressed as interval distance relative to the local tonic having both pitch and tonality.

In an embodiment, the Form Atom stores a chord type and a chord's bass.

In an embodiment, the database store lists of Form Atoms that are linked to lists of preceding or following Form Atoms through Markov-chain associations that identify, from a corpus of artefacts, prior transitions that have worked musically with good form.

Form Atoms provide harmonic structure and an ability to generate harmonic structures that obey compositionally good musical form.

Form Atoms may have associations to a list of mapped textural components which define texture for the composition and which permit, when selectively chosen and written with chord scheme chains, maintenance of textural continuity in the generative composition.

In another aspect of the invention there is provided a method of generative composition, the method comprising: receiving a briefing narrative describing a musical journey with reference to a plurality of emotional descriptions for a plurality of musical sections along the musical journey; assembling a generative composition having regard to the briefing narrative through selection and concatenation of Form Atoms having tags that align with emotional descriptions timely required by respective ones of the plurality of musical sections; and selecting and substituting Form Atoms from different original scores into the generative composition, the substitute Form Atom: derived from any original score; and having its compositional nature aligned with the emotional descriptions; and wherein each original musical score is partitioned into a multiplicity of identifiable concatenated Form Atoms having self-contained constructional properties and where each has: a tag that describes a compositional nature of its respective Form Atom; a set of chords in a local tonic, and a progression descriptor in combination with a form function that expresses musically one of a question, an answer and a statement; and mapping musical transitions between Form Atoms to identify and then record established transitions between Form Atoms in multiple original scores and such that groups of Form Atoms exist in which Form Atoms are identified as having similar tags but different constructional properties.

In a further aspect of the invention there is provided a method of analysing a musical score containing a plurality of musical sections, the method comprising: identifying the presence of an emotional connotation associated with a musical texture in the plurality of sections and wherein the musical texture is represented by a plurality of identifiably different compositional properties, and wherein: i) the musical texture has an emotional connotation; and ii) each musical texture of any musical section is expressed musically in terms of the presence of musical textural classifiers selected from a set containing multiple pre-defined musical textural classifiers and such that: a) different musical sections may include a differing subset of pre-defined musical textural classifiers; b) for a given musical section, each pre-defined musical textural classifier has either zero or at least one component to that textural classifier and wherein each component that is present is further tagged as either a musical accompaniment or a musical feature and where each musical textural classifier that has a component present possesses: i) either no musical feature or a single musical feature, and ii) one or more musical accompaniments; and c) different musical sections can have a common descriptor or a similar descriptor having an association with the common descriptor, but at the same time different musical sections possess differing subsets of musical textual classifiers or differing subsets of components in the musical textural classifier.

The textural classifier may be selected from a group comprising at least some of melody, counter-melody, harmony, bass, pitched rhythm, non-pitched rhythm and drums.

A musical feature is a salient musical component in musical texture; and contains information about musical tension and release within the musical section and which tension and release would be musically contextually destroyed if the musical feature were to be combined with another musical feature in the musical section and in the same pre-defined musical textual classifier. An accompaniment does not interfere with another accompaniment or a feature in any specific textual classifier of a musical section and can be added or removed selectively to thicken or thin the texture of the musical section.

In yet another aspect of the invention there is provided a method of providing texture in an automated generative composition process, the method comprising: generating at least one chord scheme to a narrative brief, wherein the chord scheme is based on Form Atoms and the narrative brief provides an emotional connotation to a series of events; and apply a derived texture to the at least one chord scheme to generate a composition reflecting the narrative brief.

The method may further comprise identifying absence of a textural narrative in a first musical section concatenated with a second music section having a texture profile; and filling the first musical section with at least one component that is a musical accompaniment or a musical feature selection wherein the at least one component is based on one of: history of preceding textural classifiers and a continuation of a dominant one of the textural classifiers, else a logical bridge between a destination subset of pre-defined musical textural classifiers based on intensity of respective subsets.

Effective generative composition, according to the various component aspects of this disclosure, thus leads to a tangible technical effect, particularly through the production of a generative work that has "good form". The embodiments achieve this through a categorization process in which technical properties linked to Form Atoms, of non-standard varying duration, are extracted and stored relative to a descriptor of expressive qualities of each Form Atom. A relationship map is established between different Form Atoms such that the technical properties exhibited by one Form Atom can be concatenated with those properties of an adjacent Form Atom in a fashion where the transition in musical terms between adjacent Form Atoms has perceptibly good form. This approach underpins the ability to produce automated generative composition.

The present invention, amongst other things, functions to reduce chords to their relational position to the base tonic, while maintaining pitch relationships arising in any transposition between different keys/tonics. The chain of transitions is then maintained. Putting this differently, in any musical key in the preferred implementation, the relationship between chords is expressed by the degree of the scale. Thus, regardless of the octave, in the key centre of F, an F note in the scale would be expressed as a value I, a Bb as a IV and a C as a V. This approach therefore leads to an equivalency between chord schemes irrespective of the chosen tonic and is maintainable across both major and minor scales (or any chosen degree of scale that departs from the exemplary context of a 7-note Western scale as used herein). Consequently, by reducing notes within chords to their relational position relative to the base tonic means that relative constructional context of any chord is maintained irrespective of transposition to a different tonic, i.e., the chain of transitions is then maintained. Thus in the exemplary key of C major on a piano:

Middle C on the piano would have a MIDI value 60 and position I, db on the piano would have a MIDI value 61 and position IIb, D on the piano would have a MIDI value 62 and position II, Eb on the piano would have a MIDI value 63 and position Mb, E on the piano would have a MIDI value 64 and position III, F on the piano would have a MIDI value 65 and position IV, Gb on the piano would have a MIDI value 66 and position Vb, G on the piano would have a MIDI value 67 and position V, Ab on the piano would have a MIDI value 68 and position VIb, A on the piano would have a MIDI value 69 and position VI, Bb on the piano would have a MIDI value 70 and position VIIb, B on the piano would have a MIDI value 71 and position VII, and C (in the next octave and with a return to the tonic) on the piano would have a MIDI value 72 and position I (again).

According to another embodiment of the invention, a Form Atom is disclosed. The Form Atom is defined by self-contained constructional properties contained within the metadata of the Form Atom. The self-contained properties represent a historical corpus of music. The Form Atom also has a generative set of heuristics to support the generation of a set of chords in a chord scheme or many different sets of chords in the same or different tonics which achieve the same form function to have a similarly associated emotional and musical connotation. The generated chords are temporally spaced out across a defined window of musical time by chord spacer heuristics. The Form Atom also has a tag describing its compositional heuristics. A chord list, provided in local tonic, defines branching structures which give options for generating different chords from the local tonic. The Form Atom further has a progression descriptor in combination with a form function to express musically one of a question, an answer and a statement. A meta-map of a chord scheme for a musical section is created from the metadata.

The preferred embodiments therefore work on the premise that every chord can be measured in the context of its local tonic/key centre by an integer, and that relationships can be established between chords rather than just sequencing of specific chords.

Advantageously, aspects of the present invention therefore analyse and then parse music to deduce various heuristics permitting generation of musical textures as well as performance parameters and the building blocks required for assuring quality of final assembly/performance of processor-originating generative work. A classification mechanism allows for different instrumental components to be used in different compositional contexts, thereby allowing brand new textures to be created through combining principals of different compositions. The beneficial result is a generative composition that follows a brief, i.e., a narrative provided by a client, and which consequently is musically relevant, formalistically variable (since, unlike the prior art approaches, it is not formalistically tied to a template) and which has audibly—and thus reward centre rewarding—good musical form.

Beneficially, based on processing music information retrieval techniques and analysis supported by a processor-based system intelligence, such as a bespoke expert system, the present disclosure provides a multiplicity of complementary yet inventively different technical solutions. The processing mechanisms function to compress an original musical composition through a series of mathematical functions (having correctly applied parameters) that support both the reproduction of the original composition/score as well as myriad other alternative generative composition that satisfy human requirements of predictive tension and release that stimulate the reward centre of the brain to promote dopamine release. In this respect, correct parameters amount to the application of mathematical choices based on developed core heuristics, i.e., rules, together with a sequential ordering of execution of these core heuristics. The invention applies an Occam's Razor approach, i.e., generative mathematical functions should be the simplest to support the objective reproduction of the original musical intent, to selection of heuristics in the various generative aspects of the approach, such as in (a) pitch generation, (b) pitch transformation into a new tonic, (c) chord spacing that maintains the rate of play of generative chords in the generative composition and (d) texture maintenance in the generative composition. Examples of such mathematical functions, of which there are many disclosed in detail herein, can include the axioms that a bass note in transposition cannot be below the lowest note on a bass guitar or a score for a transposed violin component can maximally only relate to play two notes simultaneously.

Applications of the techniques of the embodiments and aspects of this disclosure can be employed in any music to video application, including film score, advert production and gaming (especially in the context of producing a user-specific musical accompaniment that is generated to reflect player-selected music having direct player connotation to player emotion(s)). Also, since the generative piece embodies "good form" and originality, the application of the technology can be applied to produce a new composition for which lyrics can be written.

The present invention produces alternative generative musical works that are equally satisfiable to the mind from a process that identifies compatible musical elements from different musical sources/scores and concatenates complementary generative heuristics/mathematical functions.

BRIEF DESCRIPTION OF THE DRAWINGS

The patent or application file contains at least one drawing executed in colour. Copies of this patent or patent application publication with colour drawing(s) will be provided by the Office upon request and payment of the necessary fee.

Exemplary embodiments of the present invention will now be described with reference to the accompanying drawings in which:

FIG. 1A is a diagram illustrating composition approach in the prior art.

FIG. 1B is a diagram illustrating compositional approach of the present invention.

FIG. 2A shows a prior art sketch of the final score to The High and the Mighty.

FIG. 2B shows a prior art formal final score to The High and the Mighty.

FIG. 27 is another exemplary diagram according to an implementation of the invention that expresses musical notes within Bars 12 to 14 of the Bach prelude as a numerical array.

FIG. 28 is an image of a Wilhelm Friedemann Bach manuscript copy of Johann Sebastian Bach's Bar 14, C minor prelude 1, from the "Clavier-Buchlein version".

DETAILED DESCRIPTION OF A PREFERRED EMBODIMENT

Figure 3:
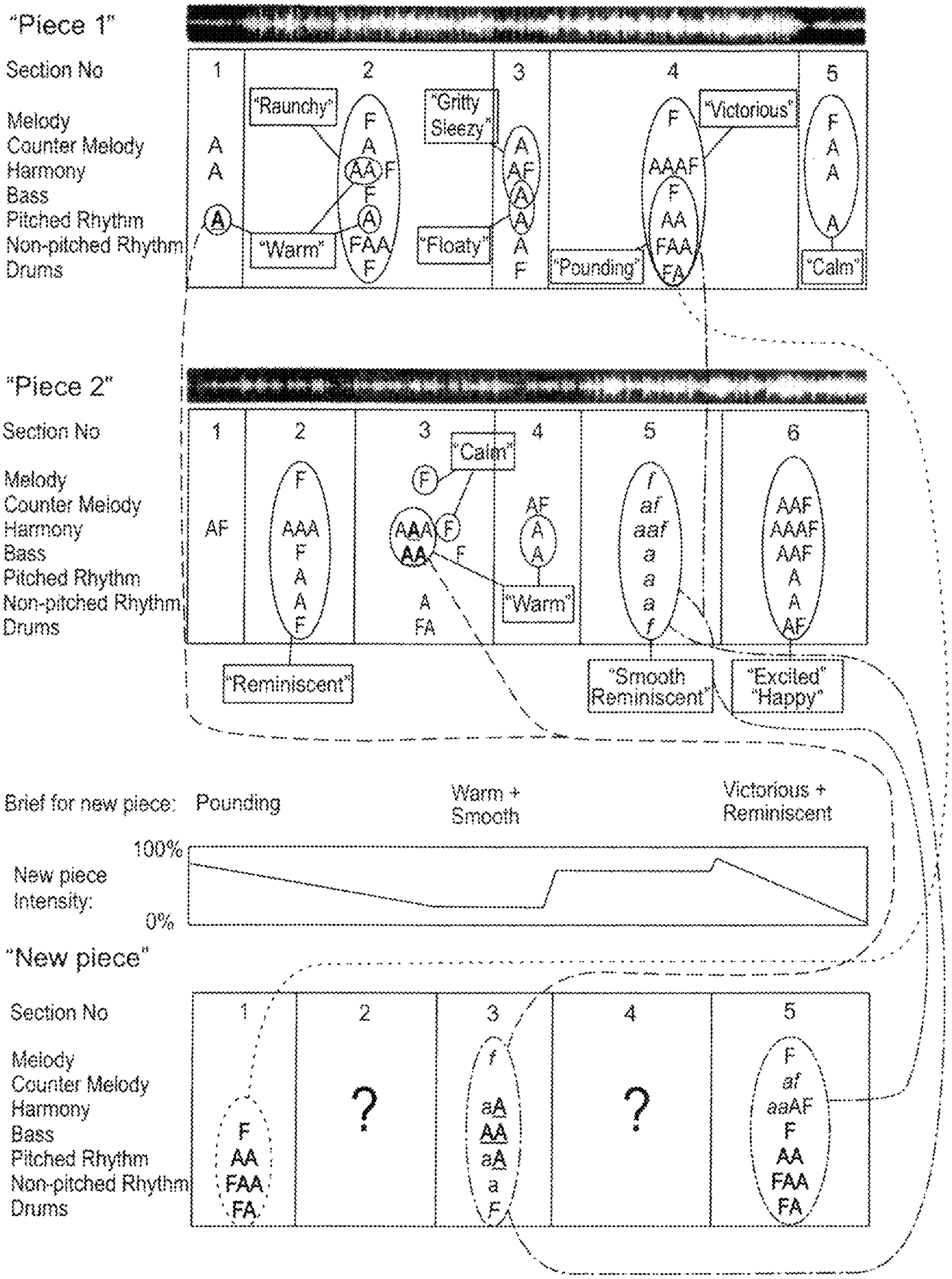
FIG. 3 is a representation of texture classification and generative assembly according to an embodiment of an aspect of the present invention.

The extensive nature of this application and the invention lends itself to being broken down into an overview, followed by explanatory sections and then followed by a worked example of the application of the signal processing approach and the application of the functions to a specific example. Within this application, the system may be referred to as the "Heresy generative system", "generative composition system", or other appropriate descriptive tag for a computer-implemented system that oversees a real-world application of a new mathematical analysis and re-assembly approach within an applied technical process applying a Turing equivalency that results to an improved technical output.

The principles behind the "Heresy generative system" revolve around a shift from how we traditionally view compositions and the composition process, and treats music (and the related signal processing of audio signals) as a fluid non-static entity that never has a final fixed state that cannot be changed.

It is important to understand the requirements involved in creating a "brief" before considering how each aspect of the generative system of the preferred embodiments interact to create a new score from existing (analysed) artefacts. The brief itself is a set of compositional requirements that are the backbone of the generative system. The description will then consider the generative approach of the various embodiments and aspects.

The invention considers, as a corpus, potentially all compositions as a source for analysis, reference and input into the generative system. Through this process, the invention functions to extract (either through digital analysis through signal processing by AI or processor-based intelligence or otherwise by a musicologist) certain specific compositional principles from a given composition or multiple compositions, thus allowing the invention to blend principles from different works into one distinctive/discrete meta-composition. Applying an Occam's Razor based approach, these compositional principles are expressed as a set of heuristics/rules that can subsequently create new generative works.

With regards to the Heresy generative system, it is understood that different keywords in a brief potentially have different meanings to different users. Therefore, it is preferable that generic terms that have little semantic meaning to the concept they are tagging are used, in order to give a noun to a category, whilst still allowing attachment of one or more keyword to a personal set of meta-tags that mean something to a user alone. Natural Language Processing "NLP" can be employed to derive a processible data for a usable descriptor of a musical section.

An effective categorisation strategy may be the Estil method of vocal training (Klimek, 2005). This abstract connotation-labelling method offers a viable alternative to trying to attach words with semantic meaning to music, the pitfalls of which are highlighted in (G. A. Wiggins, 1998).

The system of the invention and preferred embodiments provide a framework for crafting iterations in composition. It offers a way for users to state an intent (in the form of an inputted narrative or brief that is interpreted and correlated to heuristics and thus salient musical sections that can be concatenated together in an auditory seamless fashion), and then, indeed, to adjust quickly the output from this briefing specification. In other words, the system of the present invention offers the ability to define a set of compositional ideas, before auditioning them and listening to how effectively they communicate the original intention. Nevertheless, the chosen ones will change every time the system is asked to generate a new composition, whilst form is protected. The inventive approach takes this principle one step further in that it offers the ability to see which generative expression is potentially "wrong". More particularly, through critical analysis and commentary of the system's output, it is possible to identify (considering the original intention/instruction/brief) exactly which heuristic produced a wrong chord, note pitch, length, position, voicing, voice leading, textural clash or emotional connotation. It is then possible to reflect this criticism in the heuristics themselves, altering how they make their decisions to fit better the compositional intention, iteratively refining the heuristic expression of the original concept. Alternatively, whilst the system can generate perfectly reasonable material, there are instances where this result could be better aligned with the original intent. This gives two things: firstly, a new compositional idea that can be post-rationally meta-tagged as a different concept; and secondly, an insight into how close one's original intention may be to other compositional ideas and indeed the generative work.

The system of the present invention makes a shift of roles from traditional film-scoring methods. Where composers have traditionally relied on technological tools by programmers and engineers (such as streamers and click-tracks), and sequencing software for demoing their material; and whilst commissioners have taken a selective role in choosing material presented to them, such as Steven Spielberg did with the themes for both Indiana Jones (Laurent, 2003) and the Close Encounters five-note motif (Meeker, 1978), the system of the present invention shifts these roles; this is reflected in the comparison of approaches shown in the commissioner/user/composer/programmer delineations of FIGS. 1A and 1B.

With the present invention, the composers themselves become both the programmers and the users. Composers now use the tool to create the heuristic processes that can be used by other users, thus taking on the technical role of programmers, whereas the commissioners themselves can become composers, as users of the generative tool.

The approach underlying the present invention is based on an understanding of composition, and particularly the act of composition, in a conceptually different way, namely: showing how the next note in the audio signals follows an earlier note (as expressed in rules associated with the generation thereof and the length of a fundamental musical component that expresses fundamental audio signal components of a musical section) a rather than what the note actually is. In this paradigm, the principle of composition requires a method of analysis, with iterations of generated heuristics applied to refine the concept for composition.

According to the present invention, a processor-based system and related methodology differs from systems of earlier approaches in that the present invention makes each of the processes, decisions and weighting factors (that go into composition) the core on which the system can abstract the principles for how to generate these new compositional works. Particularly, rather than using a suite of parameterised generative systems that present components whose compositional input is all but complete, the system of the present invention break downs composition from scratch and creates generative mechanisms for the specific piece.

Axiomatically, the present invention asserts that:

1. Fewer heuristics that can achieve the same result are more desirable. This is Occam's Razor and by making heuristics easier to understand this approach makes them easier to adapt and easier to build on with future rules applied by the processors and functionality of the present invention.
2. A linear increase in heuristics encompasses an exponentially increasing number of works. In short, new compositions preferably should increasingly incorporate past analytical components, and therefore give increasing compression progress to a universal set of heuristics that explain previous and future compositions.

3. New heuristics must explain more than one phenomenon. If a set of new rules only explains one core compositional component from a specific piece, then this is a bespoke ruleset and should be omitted until evidence from the corpus can provide further examples of where the heuristics are appropriate. This avoids over fitting rules to analysis of composition, and causing bloat and noise in the pursuit of seeking a more unified understanding of composition. In practical terms, fewer rules will be required to explain new compositions by (at least) the same composer, or for those compositions that are connected through similarity in genre or time.

When a piece is analysed and generative heuristics are created from it, these will have a specific flavour, and can be considered a "pack". A heuristic pack may produce piano preludes in the style of Bach, or action movie music in the style of John Powell. These packs can then be meta-tagged with information about the intention of the content and its emotional connotation(s).

In this way, music composed by the generative framework of the present invention never has a generic and identifiable sound in itself, but its heuristic packs most definitely will. The functional tool thus reflects a generic expression of composition with a measurable output that allows for refinement towards greater simplicity and higher diversity of output. This in itself is significant to the compositional process especially in the context of automated generative composition having good form.

The present invention, as will become apparent from the more detailed explanation below and herein of the various interactive components that support automated generative composition, is capable of predicting the immediate path for a new composition at a specific point, thereby offering a new mechanism in the field of composition for reflection on practice, and refinement of the categorisation of emotional connotations.

Section A

I. Meta-Composition: The Briefing Mechanism

Music is synced to film for a variety of reasons. Whilst "synced" music, i.e., music which sits within the diegesis, is typically heard by the characters as part of the story, non-diegetic music, i.e., music that sits outside the story and comments on it, acts in a variety of ways to bring out certain properties of the film.

In the case of synced tracks, that is tracks that have been pre-recorded by an artist and then superimposed to accompany the action (pop, rap, and such the like), these tracks are often the starting point in the editing room and form the basis of the pace and style of the cut. These bring subcultural identities to the film, grounding it in genre, or lending the connotations of a certain culture to the film. A quintessential example of this is the use of "Hotel California" by the Gipsy Kings in *The Big Lebowski*. In the scene that introduces the character of Jesus Quintana (played by John Turturro), the viewer is given a reinterpretation of the original song, which itself has a laid-back, and somewhat melancholy treatment in both lyrics and musical feel. This new interpretation has an energetic and spirited quality, giving connotations that the character Jesus views the environment entirely differently to the narrative's discourse so far: this is a juxtaposition that is highlighted further by a montage of slow-motion shots that accompany the fast-paced music.

In the case of the non-diegetic music being custom written by a scoring composer, s/he may choose a discourse via a textural palette to achieve a specific effect such as this juxtaposition in the Jesus Quintana example, but will also be looking to help the pace and flow of the film through appropriate tempo and time signature mapping, as well as to follow the story on screen until preceding narrative peaks to create tension.

Embodiments of the present invention therefore provide an interface and functionality to a user that allows for the briefing of the above elements. There are several methods that can be considered as appropriate, including but not limited to:

1. A written brief from a spotting session with time-codes for where cues will start and stop, as well as the connotations that each cue will have, complete with any hit points that the director/composer have agreed on.
2. A full score for the film.
3. A short score, or "sketch", on a limited number of staffs, that contains the basic compositional material for orchestrators to use.
4. A partially graphical score used to make notes across a mapped-out timeline that gives the composer, or orchestrators s/he trusts, notes on the desired sound, texture, and harmony. In this situation, the composer's or orchestrator's ability to interpret and understand the directions is an intelligent parsing mechanism that the brief relies on to obtain a result. This discrepancy between sketch and final score is highlighted by the reconstruction of the score to The High and the Mighty as seen in FIGS. 2A and 2B.

Whilst the above list is not comprehensive, it provides an indication of the requirements for a tool that allows briefing. There are, however, components in the briefing that are significant and include some or all of:

1. The ability to map pace across time. This clearly points to the use of a musical time ruler rather than a standard minutes, seconds, and frames ruler. This ruler should be adaptable through tempo and time signature changes to map out the pace of, for example, a film or aspect of an adventure/quest game whether multi-player interactive and irrespective of the game being streamed or remotely accessed.
2. A system to specify hit points, and the associated connotation that the hit point should have.
3. A method for specifying textural elements and their connotations at different points in time.
4. A list of discourses that can be chosen, which bring with them sub-cultural properties: "Cuban Montunos", "LA Urban", etc. This may also manifest itself as the distinctive sound of certain composers, such as "John Barry", or of films themselves such as "The Bourne Identity" movies.
5. A method of setting the compositional pace, including one or more of:

(a) The number of chords across time; (b) Modulations and shifts in tonality; and (c) Emotional connotation keywords that can be associated with different chord scheme properties: (i) Use of pedal notes as chords change; (ii) The use of a cycle of fifths to move through key centres; and (iii) Functional properties of a chord scheme, such as the beginning or end of a cue.

The last item in this list, namely the method of setting compositional pace, gives a hint at the structural hierarchy that the system of the invention uses to compose generatively, as explained in more detail in Section B below. It implicitly is stating that all pace and compositional form comes from specifying a chord scheme and its functionality across time. The chord scheme's requirements are the pillar on which we build the brief, and hence generate output.

II. Chord Scheme Requirements

The complete system of the present invention is based on aspects of textural and melodic output as harmonic sequences of chords. It therefore uses such sequences to form sections of the piece and set its pace.

Chord schemes, in the case of the generative system of the various embodiments and aspects, therefore have two distinctive properties: (i) their form function, and (ii) their emotional connotations.

From a form perspective, the system is arranged to permit annotation of information/stored data for any given section to reflect that this data:

1. Is the current section starting, ending, or in the middle of the cue?
2. Focuses on the piece's tonic, or whether there is a need to move to a different key centre by the end of a section?
3. Represents a section that should be modulated, i.e., is there a need for a local tonic in the next Form Atom (see below) to be different from the local tonic of the current Form Atom (i.e., musical building block of potentially variable length determined by the surrounding context and musical properties and transitional points of the Form Atom)?
4. Stipulates the chord density (number of chords over musical duration) for a given section?

This briefing of desired form functionality of a specific section brings with it information about how the chords should be written in relation to the piece's tonic, whether there should be a movement, via a modulation, at that point to arrive at a new key centre in order to move the piece on into a different subsection of the composition/film.

Functionality in the system intelligence and its interpretational capabilities (see below), when combined with the above form function, provides the ability to set the number of chords within a given section, thereby allowing comprehensive shaping of the form and direction of the generative composition.

No matter what generative technique is used to create the form and chords of a new piece, there remains a need for the user to brief the emotional connotative elements that the programmer/composer wants the piece to take. Providing context, when it comes to expressing connotation within film composition, composers try to draw on the plethora of discourses and codes that are within our western culture. However, when dealing with the subject of lexical meaning and its description of music, little consensus exists even from individuals within the same sub-culture. This is because individuals each have different interpretation of their cultural coding.

In terms of reference materials in the form of nuggets of usable musical sections, the system is functionally arranged to reference different compositional components' connotations with meta-tags that make their reproduction easy, but which leave their interpretation open to the user's briefing/narrative. As indicated previously, the briefing may be processed using NLP techniques to cross-correlate coded musical sections with similar or identical language expressed in the narrative that is input to the system. NLP techniques are well-known. In this way, a user can bring their own interpretation to the system's ability to write a generative composition independently based only on the brief as input, coded and correlated to sections of music having associated connotation, without being hindered by a programmer's perspective on what the meta-tags associated with or attached to the musical segments should always apply. Clearly, emotional connotations take the form of generic variable keywords (or short key phrases) which have user specific meaning. These are initially named as Mode 1 . . . Mode n, but can be changed depending on the user's preferred lexical meaning. Compositional heuristics (such as methods for creating specific chord sequences, textures, melodic contours, chord-spacing heuristics, note generators, and rhythm generators) have these keywords attached to them. The generative mechanism operates to select appropriate heuristics to create these connotations at each instance in the timeline where they are requested by the user.

III. Texture Requirements

Having established how to meta-tag connotations to specific musical generative heuristics, the system of the various embodiments provides a mechanism that maintains musical texture and particularly constrains requests for insertion of adjacent musical components (e.g., Form Atoms) that would clash, such as asking for seven melodies at the same time or three bass lines.

It is, however, entirely possible to have three bass lines at the same time. John Powell's cue "To The Roof" from The Bourne Supremacy has exactly this: we hear a driving bass line in the synth bass, accompanied by the double basses playing sustained long notes in the bottom of the string texture, whilst there is a percussive effect every bar on the final three semiquavers of the bar and the first beat of a new bar whereby a bass player drags the fingers across muted strings. In isolation alone, any single one of these bass lines would work as a viable bass part, but here the texture calls on all three to make a final effect that neither contradicts the harmony nor clashes in sonic space.

The system intelligence firstly generates a set of heuristics and applies a technical approach to the identification and use of a set of musical components [for instruments], such as stings (e.g., a viola), offset horns, a harp arpeggio, pizzicato-bass. Identification can be achieved using Music Retrieval technologies to create a MIDI representation of the original score, or simply the original score itself stored in MIDI format. There can be one or more musical components that then contribute to define a set of textural classifiers, such as [but not limited to] melody, counter-melody, harmony, bass, pitch rhythm, non-pitch rhythm and drum/beat and other musical characteristics as will be appreciated by the skilled addressee. In this respect, reference is made to FIG. 3.

Each of these musical instrument components is further classified, according to an aspect of the invention associated with final assembly of a composition, to have one of two attributes, namely the component may either be a "feature" or an "accompaniment". A (musical) feature can be considered to give temporal sense, awareness and gravitas, i.e., contributing significance, to a musical section. A musical feature is thus a salient sonic component in the texture space of the musical section, i.e., it itself contains information about tension and release and which information would be destroyed in the event that a second feature co-existed in a common textural classifier even if that second feature is played by an entirely different instrument. An accompaniment is complementary musical fluff that is inessential but provides richness and tonality to a textural classifier.

There is also one or more semantic descriptors associated with each musical section, such as a Form Atom. The descriptors will generally be derived by a musicologist who has critiqued a musical section of an existing piece of music and, indeed, within an overall corpus of musical artefacts in a library.

Within each musical section, a musical component or collection of musical components (including multiple musical components in a single textural classifier, such as harmony) can be grouped together and correlated/tagged with a semantic descriptor, such as "raunchy", "warm", "gritty/sleezy", "floaty", "pounding", "victorious", "reminiscent", "calm", "both smooth and reminiscent at the same time", as well as with broader semantic descriptors such as "loud", "sexy", "exciting" and more other descriptive connotations, including "light Spring day" and "shimmery woodwind". There are, of course, myriad semantic descriptions. Different musical sections may contain the same semantic descriptor or a similar sematic descriptor that has some common descriptive connotations, but then again the same semantic descriptor in different musical section may have different instrumental components and/or differing numbers of instrumental components. The semantic descriptors are therefore linked or associated, such as within metadata, to the respective musical section. Semantic descriptors can therefore be associated with just a single instrument component, or otherwise assembled from a subset of instrument components or groups of subsets (either mutually exclusive or overlapping) of instrument components or from groups of textural classifiers. The granularity is user-selectable.

Whilst it could be possible for the system to store the texture classifiers for each section with each section or provide a direct record, it is preferred that the system intelligence applies a set of heuristics, e.g., computation parameters, to generate the respective attributes (having regard to historical records of what combination of instrument components are linked or closely associated with particular descriptors).

With automated generative composition, the inventor has identified that instrument components within a particular textural classifier (e.g., melody) cannot contain more than one instrument component that is categorised as a feature. If this were the case, then features in the same textural classifier would be mutually destructive. However, this is not the case for musical components that are accompaniments. Consequently, a single textual classifier may contain zero or a multiplicity of instrument components acting as accompaniments but no more than one (if any) instrument components fulfilling the role of a feature. Conversely, within a descriptor, multiple features may exist so long as the multiple features are distributed across the textural classifiers (and not within a single textural classifier.

In FIG. 3, for example, the descriptor "pounding" in musical section 4 of "Piece 1" is comprised from four (4) textural classifiers, namely bass, pitched rhythm, non-pitched rhythm and drums. It just so happens that "pounding" is actually a subset of a more general descriptor "victorious" which further includes a melody as well as a harmony. In this example, the semantic descriptor "pounding" actually has eight individual instrument components, with one being a feature component "F" in the bass textual classifier, two individual instrument components being accompaniments in the textural classifier pitched-rhythm, three individual instrument components being in the non-pitched rhythm of which one is a feature and two are accompaniments, and two individual instrument components being in the drums (textural classifier) on which one is a feature (such as a floor Tom) and one is an accompaniment (e.g., a snare). For the sake of simplicity, the number of instrument components is represented in each textural classifier as either a blank/nothing (in absent), or the letter "F" for a feature or one or more letter "As" to represent the number of instrument accompaniments. Looking now at "Piece 2", one can see that there is no descriptor for its section 1, one descriptor in each of sections 2, 4, 5 and 6 where the counter melody in section 4 has no assigned descriptor and thus no contribution of the connotation "warm", and Piece 2 has two different but independent features for melody and harmony that both relate to the semantic descriptor "calm".

There is one further piece of information that can be derived, by the processing system of the invention, from the instruments components, namely musical intensity. Based on a comparison between sections, a count of the number of instances of feature and accompaniments associated with a descriptor and/or the entire musical section is interpreted to provide an indication of intensity in that section. In short, the higher the count of components then the more intense and rich the section.

The system intelligence functions to look for commonality in descriptors between musical sections and, importantly, the contributory nature of the components associated with each of those descriptors to identify usable instrument components (or entire descriptors) that can complement one another across different musical sections in any future generative composition.

As intermediate summary, there may therefore be one or a multiplicity of instrument components and/or textural classifiers that can contribute to an overall texture for any musical section. Indeed, within a musical section, there may actually be zero, one or more sets of textural classifiers, with these having musical components that are treated by the system intelligence to be mutually exclusive or complementary and which sets may be isolated, partially overlaid or layered so that one textual classifier is actually a subset of another textural classifier.

Returning again to FIG. 3, looking at musical section 3, the system intelligence thus identifies the bass accompaniment to be usable for expressing an emotional connotation of one or a combination of "gritty", "sleezy" and/or "floaty". The linkages (shown by dotted lines in FIG. 3) just show how, potentially, the system intelligence can insert musical texture derived from analysis of a musical corpus into a new composition that follows a briefing note pounding followed by warm and smooth followed by victorious and reminiscent, and with a time-varying intensity that drops between the start of musical section 1 and the end of musical section 2, then levels off during musical section 3 before sharply rising and then remaining constant in musical section 4 before again sharply rising at the start of musical section 5 before tailing off to zero intensity.

It should be noted that the musical sections are not representative of discrete time scales and there may, in fact, be a multiplicity of Form Atoms present within each musical section.

Figure 4:
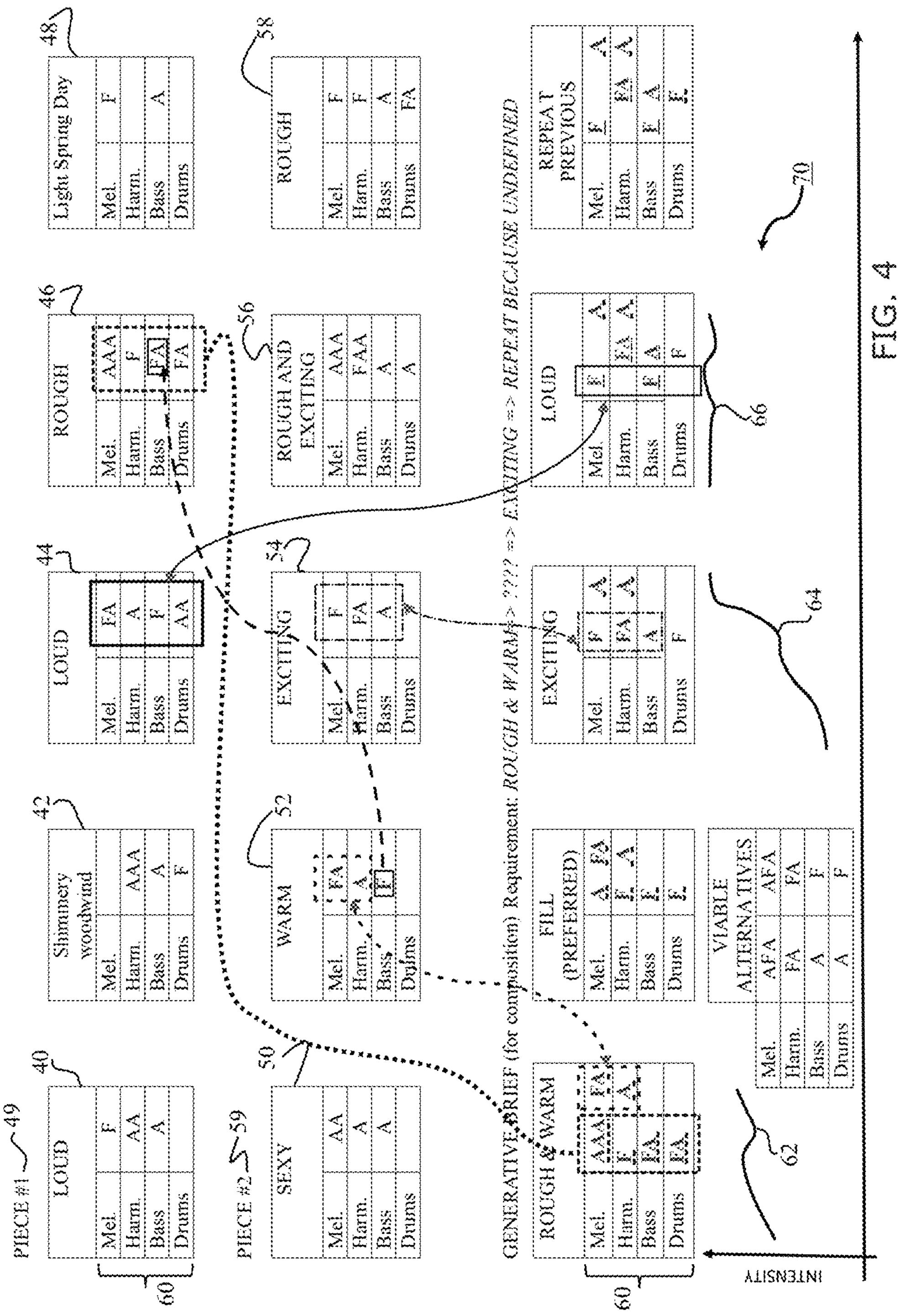
FIG. 4 is a representation of texture classification and generative assembly and in which an intermediate musical section has been unspecified and "filled" to provide texture continuity according to an embodiment of an aspect of the present invention.

Turning to FIG. 4, there is shown a succession of musical sections 40-48 for a first piece of music 49 and a succession of musical sections 50-58 for a first piece of music 59, with the first and second pieces of music forming a (limited) "corpus" of artefacts. For the sake of explanation only, the textural classifiers 60 have been restricted to four, namely melody, harmony, bass and drums and are presented from the perspective of a simplified macro perspective (rather than with textural descriptors with sub-classifications and more complex inter-relationships). In FIG. 4, contributory derivative musical components are drawn or assembled into the generative composition 70 from similar descriptors analysed by the system and parsed from individual musical section in the corpus; the relationship is shown by the lines with arrow heads.

A brief has been input into the processing system of preferred embodiments, such as through touchscreen or other computer interface. The brief stipulates an intensity pattern 62-66 for musical sections 1, 3 and 4, but no narrative for musical section 2 that must thus be filled from all perspectives of the invention as described in totality herein, including texture continuity.

Dealing solely with the latter issue of texture continuity at this point, the system intelligence of the preferred embodiments firstly looks to assemble a musical section that is both "rough and warm". There is no corresponding overall texture having the descriptor, so the processing system assembles the components of "rough" from Piece 1 and "warm" from Piece 2. These are entirely complementary since they have no feature in a common. The textual classifier and the overall intensity is high so there is no particular need for the system to reduce the number of accompaniments. This therefore generates:

| Rough and Warm | | | |
|---|---|---|---|
| | Rough | Warm | Gen. Textr |
| Mel. | AAA | FA | AAAFA |
| Harm. | F | A | FA |
| Bass | FA | | FA |
| Drums | FA | | FA |

Ignoring the intermediate transition in the succeeding musical section, the third musical section is narrated as being "exciting". There is, in this respect, a directly corresponding texture that can be lifted from musical section 3 of Piece 2. In musical section 4 of the generative work 70, there is also a corresponding pre-analysed "loud" texture at musical section 3 of Piece 1. However, the system recognises that adaption is required both to fill the unspecified space 80 between musical sections 1 and 3 and to morph the texture in the generative work from reflecting "exciting" to reflecting "loud".

Musical section 5 has no stipulated texture and so either represents a termination point for the generative composition 70 or a chance to repeat musical section 4 in totality or with a variation in, for example, an accompaniment. These are design parameters executable by the system intelligence based on heuristical instruction.

Dealing with the fill, there are four alternative processes by which fill can be accomplished by one or an appropriate and logical combination of:

1. Morphing from the components in a start texture to the required components of the texture in the destination section. This can be a simple linear interpolation exercise;
2. Fulfil a requested intensity brief stipulated by the user;
3. Apply a Markov approach by analysing corpus of historically closest compositions to identify the likely or permissible transitions between textural classifiers; and
4. Work on the basis of selected intensity in terms of specific desired textural classifier, such as harmony.

In terms of user input of the preferences for unspecified musical sections, a preferred embodiment includes a GUI that includes dial-down values for one or more user-selectable textural classifiers. The user/programmer is thus able to set relative intensity levels between the multiplicity of textural classifiers, with the system intelligence configured to apply comparative analysis to identify suitable candidates for direct in-fill or adaptation.

Looking again at the generative composition 70 and its texture needs, since the musical section 3 must include the prior analysed textual classification for "exciting" in Piece 2, there is no choice other than to maintain this exact textural structure because the textural classification fits. The first issue relates to the unspecified intermediate hope at musical section 2. It is generally desirable to maintain features from a previous section, and it is also relevant to assess the level of intensity in the texture presented for "rough and warm"; this looks relatively high given the nature of the distribution of the instrument components across all textural classification and also because the resulting texture of rough and warm includes three features. Consequently, heuristics would generally dictate that a variation would be required to begin the transformation towards the texture for "exciting" but it would be beneficial from a continuity perspective to maintain a solidly associated texture from "warm" of Piece 2, but to reduce the accompaniment associated with purely the rough texture. It is noticeable that significant musical components from the "rough" descriptor remain, although now diminished. To move in an alternative direction, the system intelligence would—or at least could—consider retaining either contribution from bass and drums from the rough texture, with this including continuation of either or both of the accompaniment or feature components from the rough texture. However, in view of the brief drop in intensity, a fuller carry-over of the accompaniments from musical section 1 is not preferable. However, the feed-through of the feature from the drums through each of the successive musical sections yields a degree of textural continuity. In short, the system intelligence looks to maintain as many contributing instrumental components whilst having regard to the intensity changes and avoiding conflict between features that would class in the same textural classification.

In summary, again, the processing system and logic treats features within a musical section with a simple single rule. Any instrument component that realises a feature within a single textural classifier will directly conflict with another feature in the same textural classifier and so that musical situation must be avoided to preserve overall textural space. However, a textural classifier may have as many accompaniments as it wishes. This provides the ability to have multiple textural elements, whilst guaranteeing that any specific one that provides a salient feature to the texture will not be corrupted or interfered with by others. In the aforementioned example by John Powell, the synth bass would be classified as the feature, and the percussive electric muted bass and double basses as the accompaniment. These two auxiliary items do not conflict with the main bass part, and could feasibly be added to any such texture with a featured bass line; the featured bass, on the other hand, would not fit into any other texture that has a featured bass part.

An explanation of textural classifiers now follows:

Melody

The paradox of which is hierarchically more important, melody or harmony, has been a subject of debate for centuries. The system intelligence of the preferred embodiment takes a stance that form is generated through the flow and pace of chords; however, it is possible to change the connotation of a chord, or string of chords, through melodic passing notes, and harmonic substitutions—both of which may be meta-tagged as textural components.

Mostly, melodies are typically all classed as features, although some sparse melodic components can be considered accompaniment melodies: that is, they do not counter a given melody, and are not consuming the textural space that a featured melody would. In the event of a bass melody, the category of the heuristics would be both tagged as melody and bass, and as a feature. This way, there will not be a conflict of texture in the bass region, but certain accompaniment bass components could still be inserted into the texture.

A textural component classified as a melody that is also tagged as a feature may well bring certain alterations to the scale or mode of the given texture. In the case of the exemplary The Bourne Supremacy, there is a main melodic feature throughout the film that quite often prevalent in the celli, and revolves around a falling melodic minor scale with a flattened 2nd. This melodic component would not sit well with any other melodic component that is using a natural 2nd, therefore it would alter the given mode for the texture and any accompanying melody. No other melodic feature would be able to override this because only one featured melodic component can be present at any given time.

Counter-Melody

This category of textural element may be linked to a melody, or simply be a melodic element that sits around the temporal space where a melody might sit. This applies typically to guitar riffs, melodic bridging features in orchestral textures, and melodic components that emphasis mode and tonality, but do not present a strong melodic pattern.

Typically, a counter-melody can play with many others, so they are marked as accompaniment. However, if a specific counter-melody is designed to work in conjunction with a melody, then this can be marked as a feature to make sure no other such textural elements that are interacting with a melody get in the way.

Harmony

A component that is tagged as a feature for harmony states that it does something with a chord (as known in jazz), or a chord that features multiple extensions, like a #11 chord. As with melodic components, components marked as harmonic features are marked as such because they would be deemed to interfere with each other. The issue of how to cope with potentially clashing requests for a melody component that wishes to alter the given scale, and harmonic components that change notes within the given chord is discussed later.

Bass

A bass feature occupies the textural space in the bass range, with this typical of an electric or synth bass line. Bass components that are not features but which are marked as accompaniment will simply occupy the bass note of the chord.

Pitched Rhythm

This is any percussive component that is pitched, such as a trip hop loop that has tuned components that could clash with other such tuned components. It also incorporates orchestral tuned percussion.

Non-Pitched Rhythm

This textural component is reserved for instruments such as shakers, timbale, HiHat patterns, etc. Examples of a feature in this space would be the type of power-drum patterns one hears in many modern film scores, such as at 1:17 in *Rogue One* (Edwards, 2016) and throughout the cue *Funeral Pyre* (Crowley & Greengrass, 2004), or any other type of prominent non-pitched feature. These rolling dynamic power-drum motifs would suffer texturally if they were interrupted by other such non-tuned features.

Drums

This covers all rhythmic patterns that come from drum kits. If marked as features, these are drum patterns that lie out a specific groove to which other accompanying patterns are subservient. Non-featured drum patterns are auxiliary components such as military drum patterns, patterns that in themselves have connotative properties, but which do not interfere with the main thrust of the groove.

With respect to tempo and time signature changes, the approach advocated by the invention renders the timeline as invariant. Film is mapped out across time in seconds and frames. However, embodiments within relevant aspects of the invention are arranged to alter the tempo to create more or fewer bars on the musical ruler. Unlike other sequencer software (Cubase, Logic Pro, Pro Tools) in which tempo does not affect the time ruler, the functionality of the system intelligence evaluates, having regard to the supplied narrative, how much musical material will fit into a given requirement and then generates a best fit solution for the generative composition. The timeline can have multiple tempo changes to allow for different paces throughout a cue, and to enable the timing of arrival at hit points.

Section B

I. Generative Functionality of the Heresy Generative Composition System

To this point there has been a generally philosophical discussion surrounding the ideas that underpin the generative compositional system of the present invention.

To this point, there has been, in fact, a general explanation of the preferred system's hierarchical workflow. We now examine this hierarchy in detail, as well as the tasks that are performed at each level to expose the generative method of aspects of the invention.

An initial outline is now provided on the overarching principle of how the Heresy system of the aspects of the present invention is embodied and functions. This outline explains the hierarchy for how various compositional tasks—from writing chords, through to writing textures—are handled. Secondly, the heuristic mechanism and organisational structure for processing logical tasks is explained. Finally, detail is provided about the preferred properties, functions and interactions between the components and also the preferred steps involved with generating a composition.

II. Heresy System Overview

Figure 5:
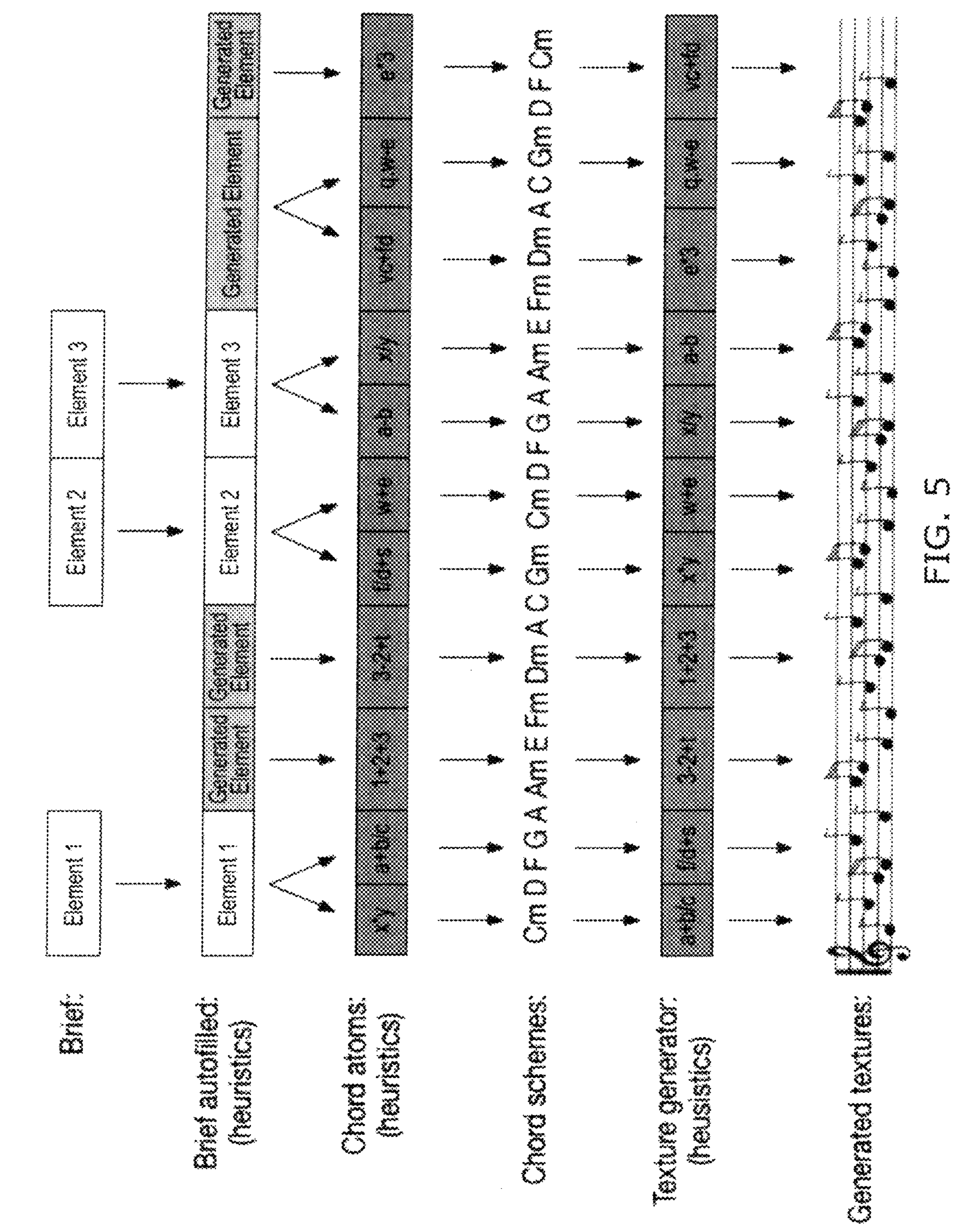
FIG. 5 is a hierarchical task flow for the generative compositional system of a preferred embodiment.

FIG. 5 gives the outline for the different hierarchical layers 100 within the Heresy system embodying a multiplicity of complementary but independent inventive aspects. These layers flow from top to bottom.

Firstly, briefing elements 102-106 are requested from the user. Secondly, these elements 102-106 are interlaced with generated elements 108 to create a complete set of requirements that fill the timeline of the piece of music that is about to be generated. From here, the heuristics of the system, as interpreted and applied by system intelligence, will generate the chord schemes 110 on which the textures will operate and be strung together.

This is achieved through a mechanism that makes use of "Form Atoms". Form Atoms are a meta-chord scheme and thus the principles by and starting point from which a coherent chord scheme is written/generated and, ultimately, a composition is created. Each is a snippet of music (i.e., a musical section) of varying duration that has a length dependent upon the nature of the analysed musical expression and, as such, each represents a building block within the generative system of the preferred embodiments. Each Form Atom is derived from interpretational analysis—either manual or computer-based using WHAT—from a library of existing independent compositions, and is stored as an indexed emotionally-described record that is accessible for future compositional use. Form Atoms are thus meta-chord syntactical descriptors. Each one has a small stored snippet of chords from a previously analysed work, and a generative set of heuristics that, when run, can produce variations of snippets with similar connotative properties as the stored one.

The Form Atoms, such as reference numerals 120-124, include a generative set of heuristics that, when run, produce variations of the stored chord snippet (extracted from the earlier analysed work) to create chord schemes 128 that have a well organised form, narrative direction and purpose. The Form Atoms are chosen and strung together through a bespoke syntax mechanism. These sequential chord schemes are then used to give a texture generator 130 the harmonic palette on which to orchestrate music. The final output of the Heresy generative composition system is music 132 created from the heuristics within the texture generator.

Each Form Atom has a specific syntax internally and to each other but is self-contained in its nature, and each Form Atom embodies or possesses the following signal properties, generative characteristic or attributes:

1. A specific set of chords in a local tonic expressed as interval distance relative to the local tonic having both pitch and tonality and thus a key centre for the Form Atom;
2. Predicates that are formed from:
(a) A form function definition based on logical operative selection between musical phrasing that is one of a question, an answer or a statement and, optionally, whether the Form Atom operates as a modulator that permits a change from the current local tonic to a new local tonic in the next Form Atom, a modulated Form Atom which indicates the preceding Form Atom has a different tonic, both or neither a modulating or modulated Form Atom (meaning that the local tonic stays the same relative to preceding and following Form Atoms) and, further optionally, whether the Form Atom appears at the beginning, end or neither the beginning nor the end of a particular piece of music; and
(b) A progression descriptor establishing the nature of cadential or sequential progression between adjacent chord atoms, i.e., the passage of the chord atom scheme across time;
3. A generative set of heuristics/rules that support generation of a set of chords in a chord scheme or many different sets of chords in the same or different tonics that achieve the same form functions and which thus have the similar associated emotional/musical connotations, and heuristics that space out temporally any number of generated chords for any given length of musical time to fill the briefing space;
4. A tagged descriptive association with an emotional connotation that articulates one or more realistically palpable emotional response(s) experienced by a listener when the Form Atom is used in a chord scheme in accordance with heuristics described herein, with such a descriptive association providing relationships to music elements, e.g., chords, chord timings and chord distances to their tonic. These descriptive associations or "placeholders" can be taken from a library so as to present consistency with terminology used in any narrative brief, although this is not a requirement provided association between different descriptors used in different parts of the system of the invention can be resolved as equivalent, similar or neither in semantic space; and
5. A smallest musical phrase that makes musical sense and which has a describable relationship with neighbouring Form Atoms; and optionally
6. Metatags, such as composer name, instrumentation and/or genre as examples amongst other more specific detail, including (for example) the name of a suite of specific preludes or a series of films. This allows for easier referencing to find styles in a generative phase of composition when briefing considerations are identified. This list allows for further Form Atom refinement from the briefing mechanism.
7. A Form Atom cannot contain a tonic in the middle of itself.

Form Atoms provide harmonic structure and the ability to generate harmonic structures that obey compositionally good form, and they store a list of textural components in a classified state which define texture and which permit maintenance of textural continuity in the generative composition.

The system, as a whole, therefore functions to generate and store lists of Form Atoms that are linked to lists of preceding or following Form Atoms through Markov-chain associations that identify, from a corpus of artefacts, prior transitions that have worked musically with good form.

Returning to the issue predicates and what is meant by the terms question, answer and statement.

A question is a chord scheme that suggests tension requiring mental settlement as indicated by notes that have appeared within a harmony or melody and which are questionably present because they are outside of the key centre of the local tonic of the Form Atom. Multiple successive questions can be asked musically.

An answer is the resolution of the question which operates to resolve the presence of the questionable tones (i.e., pitch) or notes (i.e., pitch with duration) from the mind's perspective by reinforcing the key centre of either the local tonic or any new tonic of the answering Form Atom. An example of this are the opening two phrases of "The Love Theme" from Superman by John Williams.

A statement is entirely self-contained from a musical question and doesn't imply or induce any meaningful musical tension that requires release through resolution. A statement is neither a question nor an answer.

Aspects of the present invention that relates to Form Atoms thus have appreciated that all chords within a chord scheme relate to a local tonic, e.g., C or Cm for the major and minor scales of C. Moreover, the sequence of chords is less valuable than an understanding of relationships between chords. If you know the relationship between, say Dm and G with a local tonic of C, in terms of MIDI separations (i.e., chord IIminor=>chord V for Dm and G) within the degree of scale, then this sequence of chords can be repeated in any different key centre (e.g., chord IVminor=>I in the local tonic of G).

The predicates, as indicated above, also must include (as a minimum besides an indication of question, answer or statement treated logically by an exclusive OR function, XOR) either one of four cadential progressions (where the sequence/displacement of chords is not mathematically expressible) or two sequence progressions.

Cadential progressions take one of four alternative forms and express ways to change the tonic. Cadential progress thus can be logically XORed during processing to identify one of:

1. a tonic that appears at the beginning (Cb) of the Form Atom;
2. a tonic that appears at the end (Ce) of the Form Atom;
3. a tonic that appears at both the beginning and the end (Ct) of the Form Atom; or
4. the absence null appearance (Cn) of the tonic in the Form Atom.

There the two alternative sequence progressions permit termination, with these coming in the XORed forms of 1. an interval based sequential progression, Si, where the chord is followed by a mathematically expressible distanced relationship with another chord; and
2. a tonality-based sequential progression, St, which relates to the scale of the local tonic and a sequence of chords which have mathematically expressible relationships that can be repeated forever and which is based on tonality of the local tonic.

Cadential progressions therefore string together as a series of chords with relation to the key centre of the Form Atom's tonic. The options for which chords can be chosen from each other is extracted from all stored analysis of previous pieces. This is essentially a range of choices found using a Markov chain, but with relation to a given key centre. A simple example of this might be that in the key of C we observe that Dmin or F may come before G7, therefore, we can choose either of them as preceding chords to G7 if the tonic is C. We can then perform a similar action to precede this chosen chord of Dmin or F.

Sequence progressions can be based on the tonality of the Form Atom's tonic, such as the second section of Bach's C Minor Prelude, bars 5 to 14 (see Section D), or may ignore the tonic altogether and simply proceed in a given interval sequence such as a cycle of 5ths or a rising sequence of major triads spaced in minor thirds.

In the case of a cadential pattern, if the tonic is present within the Form Atom, it could be said to be a pivot point from which we can arrive at and depart from one Form Atom to the next. Although a Form Atom cannot contain a tonic in the middle of itself, this does not preclude the well-known culturally accepted principle of a phrase's chord scheme culminating in a second inversion tonic—to dominant—to tonic progression. Rather, Form Atoms therefore have their tonic appearing in one of the four ways highlighted above in the cadential progressions list.

A consideration for cadential sequences is the ability to change key. In the event of a key change, if the new tonic features at the end of the chain of chords, then we simply state that it is not considered a tonic until the next atom. This means that modulations are created by sequences of new tonics. Unlike Form Atoms, the relationships of these tonics are not relative to an external datum; instead, they are categorised through emotional tags, and provide a component of the emotion-briefing mechanism. New tonics may appear at any point in a piece of music; within this mechanism, though, they will have at least one Form Atom sequence before they can change. It is possible that this sequence could be one chord only, that of the local tonic, in which case care must be taken in the briefing mechanism to make sure that such changes are not too frequent or else a series of random chords may be inappropriately produced.

In the case of sequence progressions, there are two possibilities: i) the chord scheme is related to the tonic, or ii) it is a regular sequence of chords which ignore it. In both circumstances, the sequence needs to be broken at some point. This is accomplished by an escape chord. Escape chords are related to the chords that immediately precede them irrespective of the local tonic. They are used to break the sequence and establish a bridge to the next Form Atom. Consequently, escape chords typically produce a change in key centre.

Figure 6:
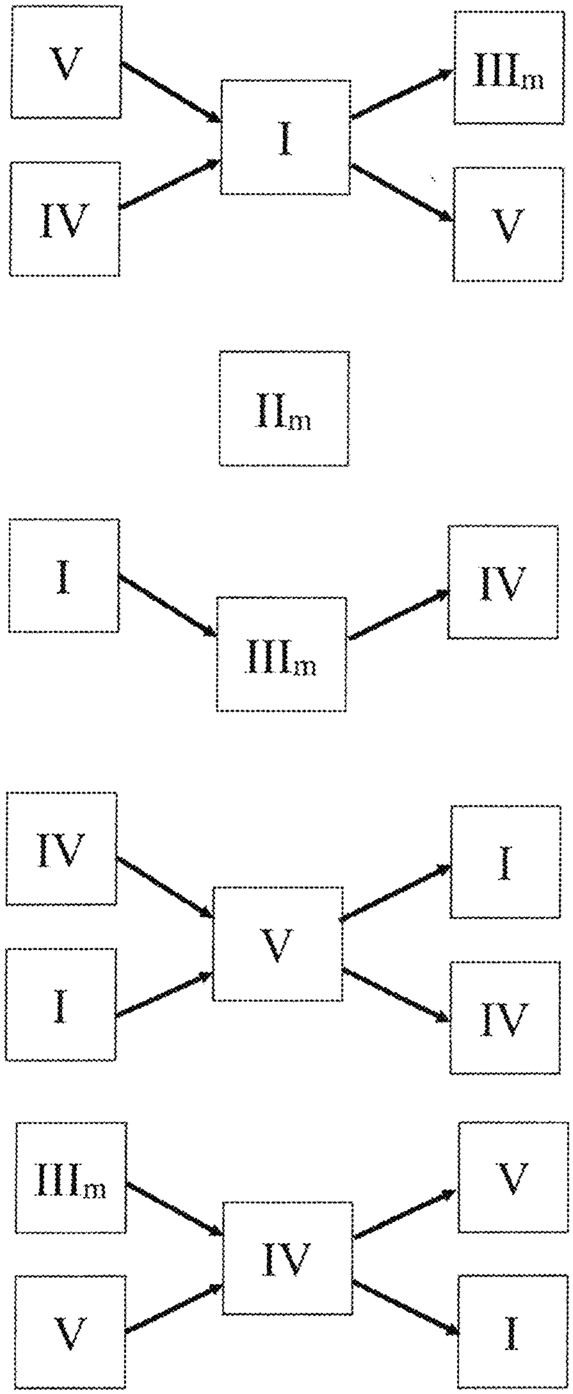
FIG. 6 represents, according to an embodiment, assemblage of permissible inter-Form Atom mapping relationships.

Once Form Atoms have been analysed (and thus derived) from a series of pieces of music and labelled with progression descriptors, Form Atoms can be strung together like jigsaw pieces. Any Form Atom that has the same progression descriptor as another, can be interchangeably substituted. We can therefore generate a series of Form Atom interrelationships using the principle of Markov chains: the relationship between any Form Atom and the ones that precede or follow it is established by looking at their progression descriptors as well as the predicates. This is reflected in FIG. 6 which shows inter-Form Atom relationships and a resulting Markov chain 602 having a permissible chord scheme construction arising from identification of form-viable concatenated Form Atoms capable of supporting the chord transition for identified emotional connotation. For example, in a limited corpus that generated the chains in FIG. 6, chord V to either chord I or chord IV is permissible but transition to chord IIm is not because (a) there is no established path in the corpus, and (b) there is (implicitly) no common descriptor between the emotional connotations of chords V and IIm. In the case of FIG. 6, there is in fact no established/recognised relationships to chord IIm (when appreciating that FIG. 6 is a highly simplified view). The Form Atom transition from chord IV as a destination is shown in FIG. 6 to be from chords IIIm and V and its onward permissible transitions to either chord I or chord V. All these translations have been extracted by critical analysis of the historical corpus of music by automated use of music information retrieval (MIR) techniques or otherwise manually coding by a musicologist.

Consequently, if a Form Atom x has an example within the corpus of being followed by a Form Atom y, then any Form Atom with the same descriptor as y can follow x. This can work in any direction temporally, so we can also precede Form Atoms using the same technique. Finally, the weightings of any Form Atom being used are based on how many occurrences we find in the corpus; this provides a probability selecting and using a specific Form Atom within a new composition.

Modulation is necessary to provide a contrast between two key centres and provide structure across time. This allows for the application of heuristics that align with the brief to move the generative composition along its tonal journey. A modulator Mor that is present within a Form Atom confirms that there will be a definite transition to a new key centre at the end of the Form Atom. If the Form Atom is a modulated, Med, Form Atom, then historical analysis has identified that, at the instantiation of the modulate Form Atom, there has been a change in key. A modulated Form Atom therefore emphasises the emotionally significant perceptible changes in surrounding and context, such as when there is a change in pace or when a narrative of a film scene must change. A modulator Mor and modulated Med Form Atom are therefore exclusive, i.e., an ORed logical function.

| Predicate | | | |
|---|---|---|---|
| Progression Descriptor | Form Function | | |
| Required | Required | Options | Options |
| XOR | XOR | OR | XOR |
| Cb | Question | Mor | Start |
| Ce | Answer | Med | End |
| Ct | Statement | Mor + Med | Neither |
| Cn | | Neither | |
| St | | | |
| $S_i$ | | | |

It is possible for any given Form Atom to have multiple form tags at the same time, except for those of question, answer and statement, whereby the atom can only have one of these at once.

There are, consequently and potentially, 6×3×4×3=216 separate lists for predicate combinations. The number of lists may be reduced by combining lists or otherwise ignoring one or more of the optional form function predicates. Each predicate list will be populated with Form Atoms that, from above, include contextual descriptors linked to their respective content that define a real-life emotional experience, feeling or emotional connotation that can be tied to both a briefing narrative input into the system intelligence (e.g., through a user interface) and, further, to semantic descriptor(s) linked with each texture.

Figure 7:
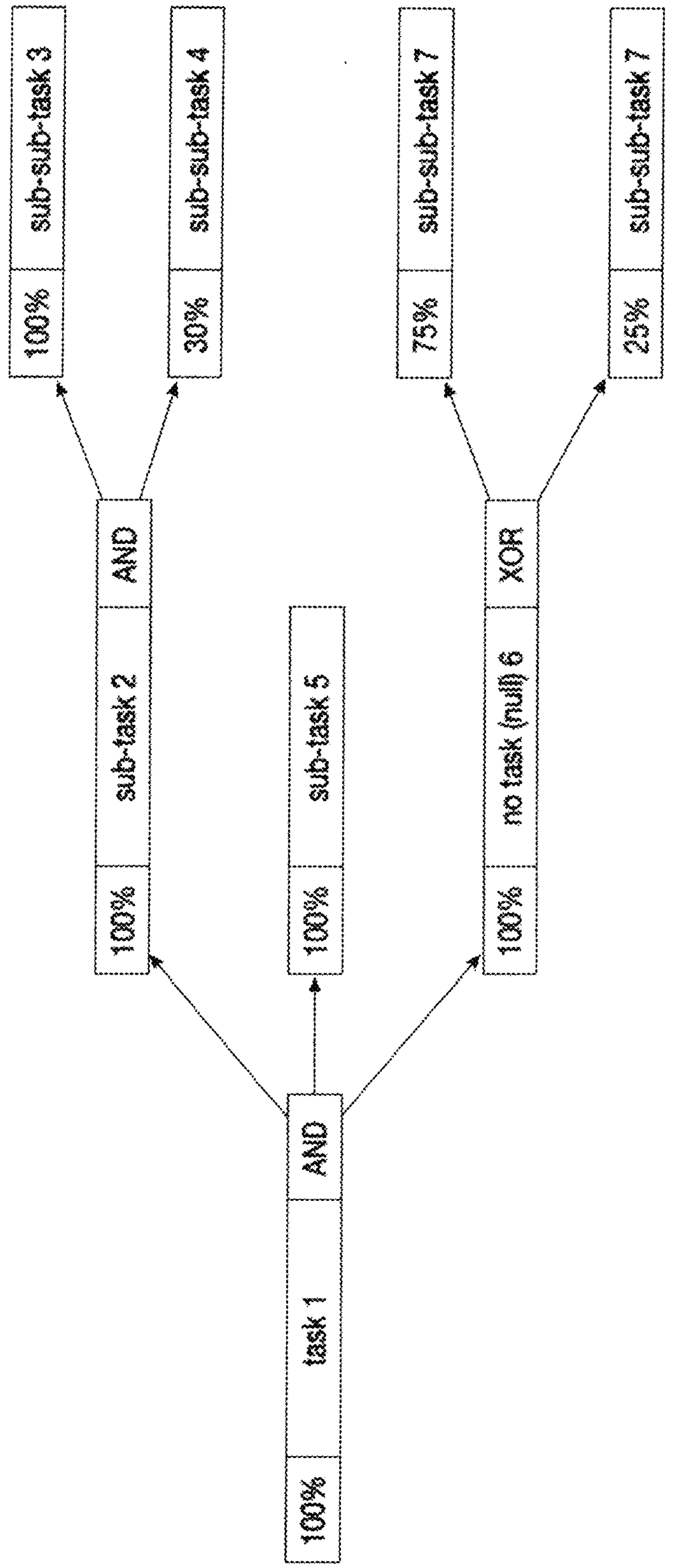
FIG. 7 shows the Affordances of a heuristic mechanism with hierarchical and logical flow as practiced by the approach of embodiments of the present invention.

FIG. 7 provides an overview of the mechanism for generative composition achieved by the various aspects and combinations of embodiments, with the extent and depth of any combination merely varying the level of sophistication, implementation complexity and/or attainment of the generative signal that is eventually output. More particularly, FIG. 7 is a schematic overview of how heuristics are logically organised and processed.

Independent of the tasks that the heuristics perform in accordance with the concepts of the present invention, FIG. 7 shows the affordances necessary for a heuristic mechanism that organises them; let us consider these in turn:

1. There is an ordered method for how the heuristics are processed. This is shown in FIG. 7 by following the numbers attached to the task and then succeeding sub-tasks.
2. There is an overall percentage chance of the task being performed. This is represented by a percentage at the front of the task box.
3. There is a branching mechanism for subtasks. The percentage chance of the sub-tasks being processed is used as a weighting mechanism for the probability of taking each branch.
4. There is a logical operator on the branching mechanism that allows for all or only one sub task to be processed. Depending on the logical operator (AND or XOR), we process either one or all of the sub tasks. In FIG. 7, task 7 is dependent on the XOR branching from task 6, and therefore task 7 is performed by either one of the sub-tasks attached to task 6. One of these sub-subtasks has a 25% chance of being processed, the other has a 75% chance of being processed.
5. There is the ability for a task to be null, offering a branch only for further subtasks; an example of this can be seen in process 6 within FIG. 7.

The generative compositional system of the present invention is, predominantly, a software implemented system that is based on a bespoke expert system running code. The system, as will be understood, therefore includes one or more processors. This system intelligence will call on code stored in memory, and will retrieve, manipulate and return data to and from storage, such as a database or other memory storage. The database may be local to the expert system, but equally it may be remotely located and accessible via a wide area or local area network and appropriate network connection. Equally, the user interface may be a computer or other client device that provides an ability to upload, download and/or stream data and media content to any logically appropriate part of the system for reason of storage (in one or more databases), manipulation and/or output (whether streamed or downloaded or imprinted) as a playable media product, including but not limited to a bespoke user-centric and/or user-selected soundtrack for an interactive game. In short, the underlying system architecture is well-known, although the approach to processing and generative composition efficiency yields manipulated audio signal data (whether aligned with a film brief of for its own sake and purpose) that has improved characteristics and qualities. The system provides a significant advance in the field of audio signal processing in the context of, particularly, audio composition.

Heresy's compositional output is derived from this briefing mechanism from which two requirements for the generative mechanism can be extracted (by, for example, NLP or more structured responses to specific question posed in relation to a selectively definable timeline). The two requirements are:

1. that the mechanism can be briefed by a non-musically skilled individual;
2. that the brief can contain information on the connotations that the commissioner desires at any given point in the composition.

Figure 8:
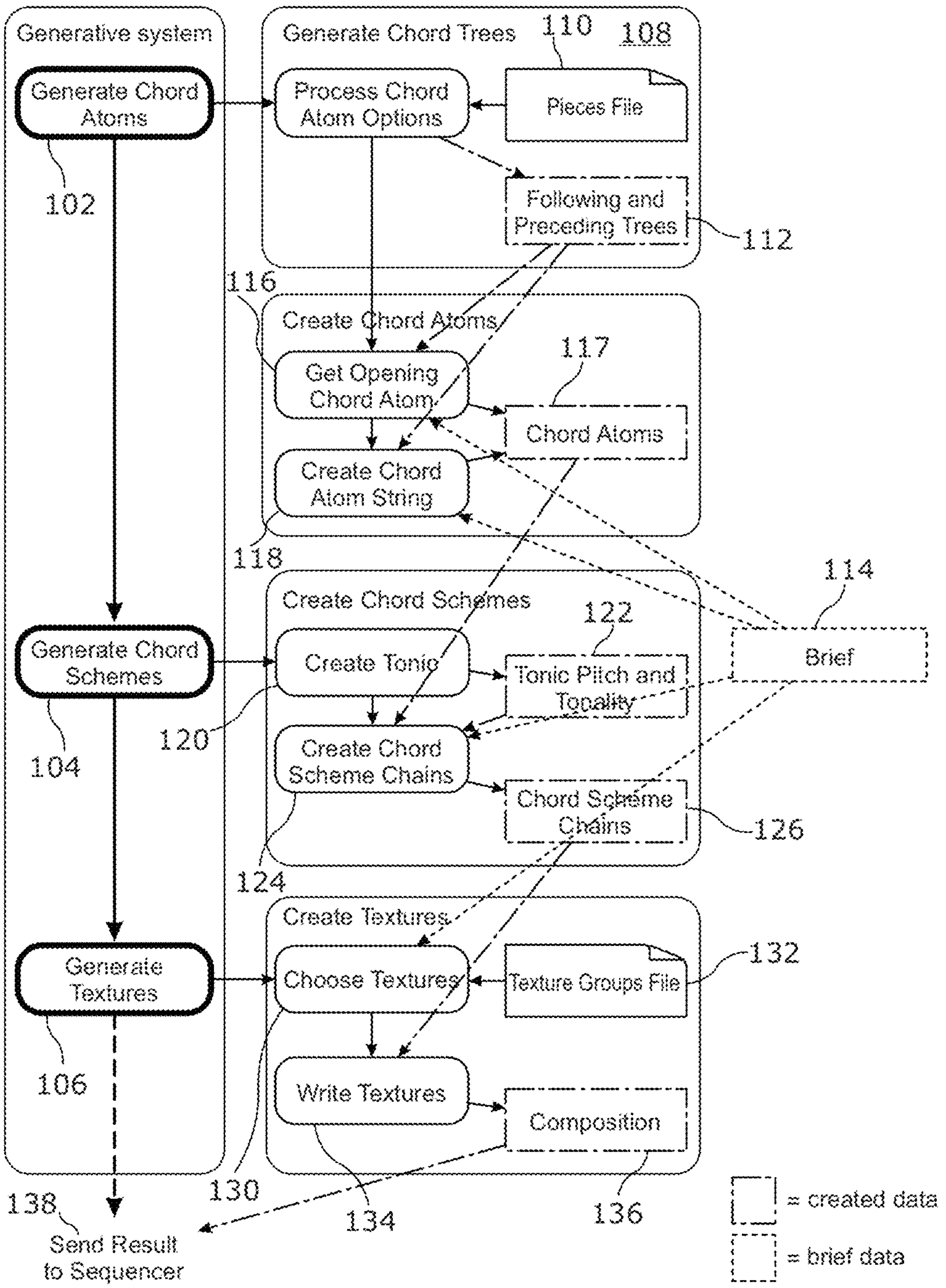
FIG. 8 is a schematic view of a preferred composition architecture and methodology for generative composition.

To fulfil these requirements, the system and in particular the system intelligence needs to be able to generate musical output without any skilled musical input, whilst responding to input concerning emotional connotations. This is achieved through a hierarchical generative mechanism 100, in which chord schemes, textures and melodies are created having regard to the briefing requirements. This mechanism is represented in FIG. 8 which shows the three major method steps (and internal processing, including data management and data processing) to create a composition from a given brief. The steps are:

1. Generate 102 Form Atoms,
2. Generate 104 Chord Schemes—this component creates strings of chords that are related and fulfil briefing requirements. This is because they are made from related Form Atoms' generative heuristics.
3. Generate 106 Textures—this component generates musical material for instruments based on the generated chord schemes and briefing requirements.

The system performs analysis on the musical corpus (or at least a portion of it) stored in a database 110. This results in historically stored music being broken down into Form Atoms and each classified in terms of both the aforedescribed predicates (or a subset thereof) and emotional descriptors that linked to each Form Atom to reflect associated emotional connotation of that Form Atom. The Form Atoms can have ancillary metadata, such as genre information and composer (to name two exemplary categories). The analysis and classification/categorization may be manual and conducted by a musicologist making informed parsing of the music to identify, e.g., beginning and end points of each Form Atom as well as other properties and characteristics of the Form Atom (as discussed herein in terms of predicates), or otherwise the classification and assessment may be entirely or partially based on use of a trained AI/neural network that can import content meaning to extracted file properties representative of the predicates. Such AI systems are described, for example, in US 2020-0320398 "Method of Training a Neural Network to Reflect Emotional Perception and Related System and Method for Categorizing and Finding Associated Content" and other such patents in related AI technology.

The flow process that is within FIG. 8 indicates that the user brief 114 may also influence the pieces file. To this extent, the pieces file could simply be the entire database, although it would be a subset that reflects requirements for a particular genre of work, e.g., jazz, or a particular composer, e.g., Bach, and artist, e.g., Pink Floyd, to be used in the generation of the pieces file. This simply reduces the complexity in generating following and preceding chord trees or Form Atom trees.

Using a Markov chain approach, connections that extend both forwards and backwards from each Form Atom, drawn into the pieces file, are established and mapped 112. Essentially, this tree identifies existing permissible paths/transitions between Form Atoms in earlier analysed musical pieces. This process is then refined in the generation of specific Form Atoms that align with the brief, wherein the emotional connotations associated with each Form Atom are resolved by the system intelligence against briefing requirements thereby to select relevant chord atoms that are both musically emotionally relevant and germane in terms of underlying musical properties. The formation of trees and, indeed, the alignment of emotional connotation between the reference in the Form Atom and the stipulated user brief are generally reflected in FIG. 6. In short, viable inter-relationship transitions are identified in the trees and these stored for use in the subsequent composition process. Again, the Markov chains are associated with the requirements of the brief, e.g., a need for raunchy heavy rock for a scene in a bar that has a stipulated start and stop time, so that relationships between relevant Form Atoms align with the brief and provide compositional options for transitions along the composition path.

Based on a brief 114 that is input into the system, the system intelligence selects 116 an opening Form Atom 118 from Form Atoms 117 in the pieces file (or more extensive database), which Form Atom corresponds to the system-interpreted requirements of the brief. Referring again to the brief, the creation of a Form Atom string is actioned 118, which string may include blank periods that must be auto-filled to provide an end-to-end composition that does not contain breaks in audio. The process then moves onto chord scheme generation 104.

In terms of a briefing tool that permits workable input, this general requirement for such a tool is its ability to map pace across time, i.e., a musical time ruler. Preferably, it should be adaptable through tempo and time signature changes and sufficiently receptive to allow identification of:

1. Hit points;
2. Sustained features;
3. Discourse choice;
4. Chord scheme requirements, including
(a) Compositional pace: chords over time, modulations, tonality shifts,
(b) Emotional connotations (bass pedal, cycle of 5ths, mood tags), and
(c) Form function; and
5. Texture requirements.

Brief filling is a constraint satisfaction mechanism and may be achieved by a generic algorithm or on a more laboursome basis involving consideration and recommendation. The process of insertion of fill arises because the briefing mechanism allows for a Form Atom to be specified at any point on the timeline through the use of a Form Atoms requirements list. This list will more than likely contain a series of Form Atoms that do not necessarily tessellate, leaving gaps in between them. The constraint-satisfaction mechanism operates to fill in the gaps in the list, which is preferably exercised through heuristics. This gives a localised treatment of the most popular parameters requested for Form Atoms. The system then fills in the gaps with atoms that have these parameters. The requirement for this system-centric correction or interpretation is therefore dependent on the extensivity of the supplied brief. In-filling of gaps will typically consider and account or compensate for:

1. the mean length and average number of chords per bar within each tempo change in the cue.
2. gaps with request parameters that have values.
3. truncation of the final atom and suitable adjustment parameters to achieve fit.
4. averaged chord density per bar within a given tempo section and particularly such that chord density is set in each atom to reflect a number closest to the average number of chords per bar within the given tempo section.

Briefed sections will typically have properties requested by the user in the form of emotional connotations, form functions, and meta-tags. To refine the list of options, we prioritise in the order of form functions, then emotional functions, then meta-tags. Firstly, if the list contains any item or items with the required form function, we remove all other items in the list that do not have the appropriate form function tags. This is then repeated for emotional connotations, and finally for meta-data. We then chose an option that satisfies the greatest number of tags in general.

Although still at a level of abstraction, a chain of chord schemes contains all the information necessary for a harmonic map of the composition, including position timing between chords. From this information, it is possible to create the relevant notes at any given point in time, and apply them to textural elements such as harmonic and melodic parts.

From the brief 114, the tonic is selected 120, with this providing a primary/priority tone and available chords (with tonic pitch and tonality 1220 expressed in terms of note displacements between I and VII (and which includes minor offsets from the full notes of the degree of the scale). Having regard to the brief, a chord scheme is then created 124 and a chord scheme train 126 stored.

Again, referring to the brief, texture generation is applied 130 following extraction 132 of relevant textural group files having regard to the brief and descriptor correspondence or similarity between the emotional connotations of the Form Atoms in the assembled chord scheme chains. Writing 134 of the textures chord scheme thus leads to generation of a composition which can be sent 138 to a sequencer for either audio broadcast or storage, as the case may be.

Returning to the issue of Form Atoms and taking a deeper look at the benefits associated therewith, the Inventor has realised that harmonic context is the driving force for the choices that are made compositionally. From this, the acceptability of any given chord followed by another chord is dependent on the harmonic context created by neighbouring chords and their relationship with a common tonic, with this manifesting itself in the mind's recognition and physical gratification. Hierarchically, whilst chords are dependent on their neighbours, adjacent sequences of chords also need to be self-contained entities that are related to each other. It therefore follows, following this revelation, that sequences can be substituted for alternative ones depending on their common harmonic properties, such as: do they end with a recognisable cadence to the tonic, do they feature a tonic at the beginning, or maybe at the end? Within the context of the invention, recapitulating specific chord schemes verbatim is avoided through the creation of heuristics that can produce not only the chords for any given analysed sequence, but have the logic to produce different varieties of chord sequences of similar or differing lengths in their place—and whilst any rules of how the sequences connect through certain specific chords may restrict the system's chord choices, it will ensure sound compositional flow across the sequences.

Sequences are delineated and categorised through rules with respect to the occurrence of their tonic. Perceptually, they appear to be of similar length to a musical phrase, although this may not be the case. These small sequences are the aforedescribed Form Atoms. They are the smallest possible building block that can act as an independent sequence whilst still making musical sense to the listener. Form Atoms have certain properties, and Form Atoms with similar properties can be substituted for each other. An aspect of the invention thus defines the properties and constituent parts of a Form Atom, as well as the mechanism by which Form Atoms may be combined.

If progression descriptors were to have complete free rein on the generation of potential chord sequences, then the result is that pieces would start and end with progressions generated by heuristics that fit the criteria but which come from the middle of pieces where the chords may be fully flowing. This would not generally make a good ending or beginning to a piece of music that is trying to temporally deliver a self-contained narrative. Form Atoms that have a start or end tag mean their heuristics are appropriate for such a setting.

As indicated earlier, the question and answer tags come from another important consideration: the problem of chord sequences that involve chords from outside the current local Form Atom key centre. An example would be the love theme from John William's score to *Superman* (Spengler & Donner, 1978), whereby the theme's exposition is accompanied by the following chord sequence:

*Eb=>F/Eb*(or *Eb*#11 13)=>*Ab/Eb=>Eb*

Looking at this example, we can examine the consequences of keeping this chord scheme as a self-contained unit, or breaking it into two Form Atoms that are a question and answer.

If the chord scheme is kept intact, then the information that is gleaned is as follows.

1. An Eb chord can be followed by an F/Eb chord,
2. An F/Eb chord can be followed by an Ab/Eb chord,
3. An Ab/Eb chord can be followed by an Eb chord, and
4. This chord scheme can be substituted for any other chord scheme that starts and ends on the local tonic.

However, in contrast, the approach of the preferred embodiment considers that this chord scheme is a question and answer and that means it is possible and practicable to assimilate all of the chord information in points one through three above. From the inventive approach described herein, a question phrase that has the tonic at the beginning but not the end can be joined to an answer phrase that has the tonic at the end. This gives us the ability to break this chord sequence into smaller substitutable pieces, and to change these pieces to introduce interest. By breaking this Superman example into two Form Atoms, this granularity would allow for a construction of a series of Form Atoms that present {a, b, a, c}. This is indeed what the original piece does. If we extend the example to see the next two Form Atoms, the question is repeated in the original score, but the answer is different to create new interest:

*Eb=>F/Eb=>Ab/Eb=>Eb=>Eb=>F/ Eb=>Abm=>Bb7sus*4

To recap, clearly this initial four bar phrase could be expressed as a chord scheme that is cadential with the tonic at the beginning and end, but this would miss out on a series of opportunities for generation. This creates a rule that chords must be from the given local tonic key centre. In the event of a chord altering a fundamental note in the given scale, we break the Form Atom into a size that puts this new chord, or string of chords at the end or beginning. This then gives the ability to pivot at this chord to a newly implied key, or to follow back to the local tonic via the remaining chords in the progression. We tag the first Form Atom with a form function question tag, and the second with an answer tag. This classification process is significant for generative composition since it opens up greater opportunities for variation in compositional structure that satisfies good form.

Within the Form Atom, a preferred embodiment stores two pieces of chord information, namely the chord type and the chord's bass. An example would be Fm7/Bb. Their specific timing is irrelevant, because there may be more or fewer chords generated by the atom's heuristics depending on the briefing requirement. There are two reasons for storing these chords within the Form Atom. Firstly, for debugging the atom's chord-generation heuristics (because it is important to know what the heuristics were based on). Secondly, so that a Chord Scheme Generator can obtain a set of chord trees of which chords precede or follow each other.

Form Atom Heuristics

There are two sets of heuristics that are used by the Form Atom. Firstly, there is a set to generate a requested number of chords. Secondly, there is a set to space out any given number of chords across any given time-frame. In the case of the first set, this is where one may find heuristics, for example, that would generate a cycle of 5ths, or a sequence of rising triads a minor third apart. There are many others that will be understood by a musicologist, including Markov chains of chords derived from previously analysed works, secondary dominant to dominant jazz progressions such as a III-VI-II-V-I progression or a VI-VII-III-VI-II-V-I progression, or a series of chords that are separated by a single integer difference, such as a series of falling major triads that are all a major third apart. In the case of the second set, there may be a specific effect that is created from how the chords are spaced. For example, in the central chord scheme to the song "La Grange" by ZZ Top, as used in the film Armageddon (Bruckheimer & Bay, 1998), there is a clear intent to keep on the tonic for as long as possible and then to emphasise the two other chords in progression by placing them on the third and fourth beats, respectively, of the final bar of the phrase. This common I=>bIII=>IV Form Atom has a plethora of alternative timings in other songs that also feature it: "Dragonfly" by Ziggy Marley, "Starman" by David Bowie, or "Back In The USSR" by The Beatles, to name but a few. All of these alternative timings have different emotional connotations. This emphasises the importance of chord-spacing heuristics, the importance of applying an appropriate and relevant descriptor of emotional connotation to the Form Atom and the uniqueness of the timing that they bring to the personality of any given Form Atom.

In the generation of Form Atoms, the point is made again that there are two sub-tasks, namely the generation of chord trees that looks at analysed compositions to create forwards and backwards pointing Form Atom trees, and the creation of Form Atoms in which there is a selection of a viable path of Form Atoms from the given chord trees taking into account briefing requirements that affect the decision-making process. Form Atom trees are formed in terms of both forward and backwards paths to address varying levels of input detail provided in the briefing narrative. One tree contains options for Form Atoms that can follow the one we are generating from, whereas the other contains options for Form Atoms that can precede it. Both will typically have multiple branches and both reflect identified musical progression in terms, for example, of whether a sequence of cadences makes sense. This is a qualitative determination based on a quantitative assessment.

When iterating through all Form Atoms of the analysed work, Form Atoms with identical meta-tags for form functions and progression descriptors are placed into the same list. Each preceding and following atom from this one goes into the respective options list for forwards and backwards for that list. Then, when a Form Atom is generated, a choice from these lists creates a neighbouring atom. This allows generation of a meta-structure for the chord scheme of the composition that will make coherent musical sense.

Figure 9:
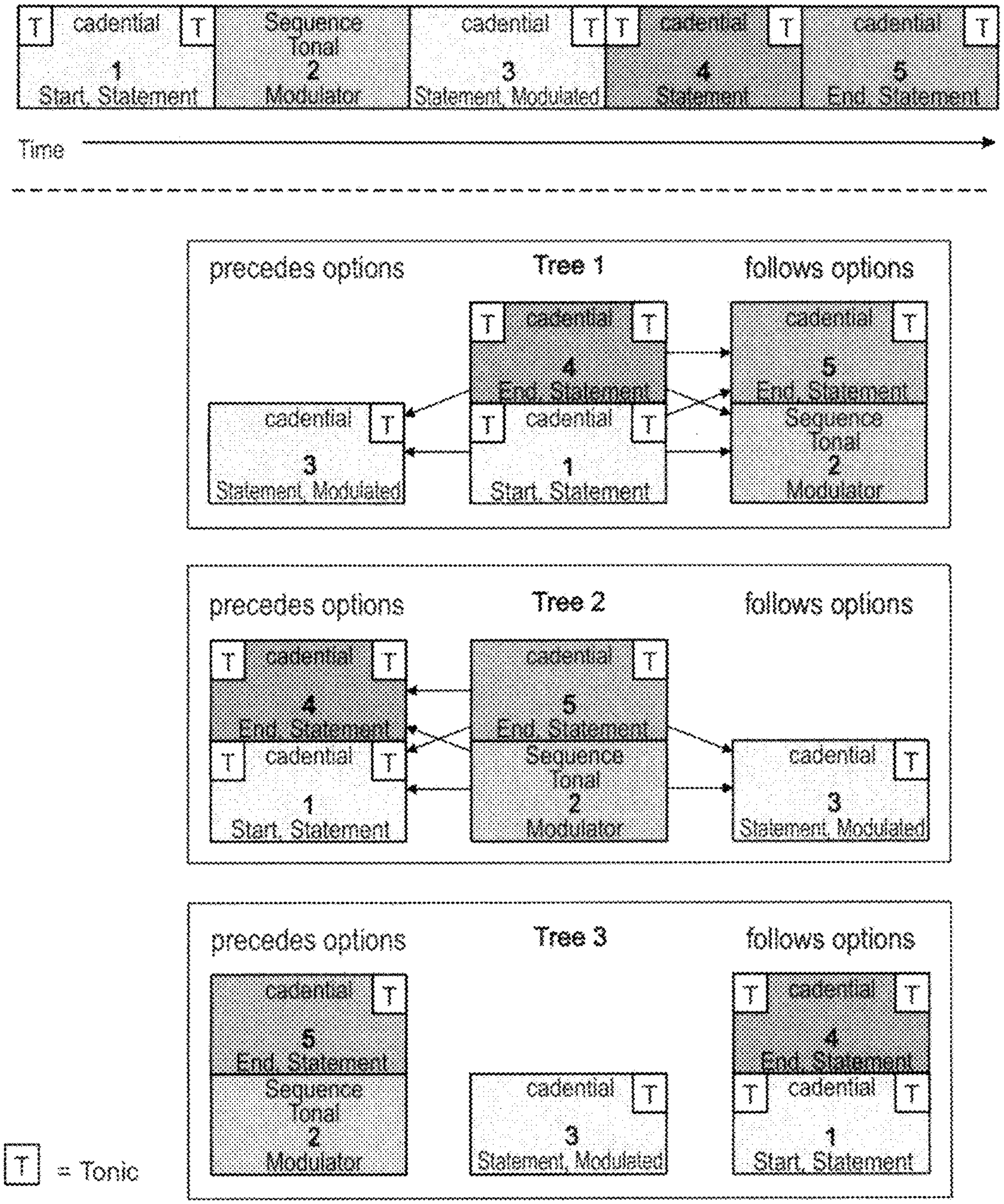
FIG. 9 shows, according to a preferred embodiment, how a single composition is parsed into a set of trees with viable Form Atom branches.

FIG. 9 shows how a single composition is parsed into a set of trees, and the preceding and following options that can be selected for any given atom generated from the lists. End and start form functions do not affect the Form Atoms' listing, but all other categories are considered. Given six different progression descriptors, and three different sets of form functions, this gives an exemplary number of 216 possible lists to reflect every combination.

Chord Schemes

Armed with a repository of Form Atoms, the generative composition process moves to a phase of chord scheme generation. A chord schemes, as the name suggests, is a grouping/concatenation of chords that are formed from Form Atoms having musical properties based on Predicates, as described herein.

Chaining together of chord schemes provides a harmonic map for the generative composition. It is only possible to move to the compositional phase once this harmonic map is in hand, in which third stage notes are actually generated and texture applied to reflect the briefing requirements.

The requirements for each chord scheme come from a requirements list. Once we have generated a Form Atom for every item in the requirements list, we use the heuristics of the Form Atoms in conjunction with the properties of the requirements list to create chord schemes. A chord scheme consists of the following properties:

1. A tonic—this is the tonic for the chord scheme's local context. It is set from the previous chord scheme's new tonic property, or in the event of this being the first chord scheme, the piece's tonic.
2. A new tonic—in the event of the chord scheme modulating, this is set the new key, and will become the next chord scheme's local tonic.
3. A list of chords—this is a list of chords which are expressed through the following properties:

(a) Pitch—this is the root of the chord.

(b) Bass—this is the bass note that the chord is over.

(c) Chord type—this gives a type of chord. Types are used later when creating sets of pitches from which to choose notes. Types are defined by the analyst for the purposes of their own musical generation heuristics. Examples might include maj, min7, dom7 b9, myWeirdChordType1, myWeirdChordType2.

(d) Position—each chord has a local relative position within the chord scheme that is measured from the beginning of the chord scheme which itself is treated as an epoch. Rather than an absolute position (which would measure the chord's position from the beginning of the piece), this allows the chord scheme to be moved back and forth in time by the user if requirements are moved or reordered.

Generating Chord Schemes

Having outlined the type on information that a chord scheme contains, the generation of any given chord scheme for the new composition, given a set of briefing requirements and associated Form Atoms, is a combination of the following factors:

1. Tonality and key—these are affected by the overall emotional requirements stipulated in the brief.
2. Position—each chord scheme starts at a certain position, measured in bars.
3. Length—each Form Atom has a specific length on the piece's timeline.
4. Chord density—this is the number of chords within the chord scheme.
5. Form Atom—this is the Form Atom associated with the requirement from the requirements list. This Form Atom contains the heuristic information we need to generate the chord scheme, and is selected based on the requirement's emotional connotations, form requirements, and meta-tags.

Referring again to FIG. 8 and its outlined process, an initial key centre for the composition is firstly chosen. This is referred to as the tonic, but it is only relevant to the initial Form Atom. The composition piece is free to deviate from this key centre depending on which Form Atoms have been selected to reflect the briefing requirements. Secondly, through an iterative process through each pairing of Form Atom and its associated brief requirement, the system processes respective chord-generation heuristics, followed by their chord-spacing heuristics. The chord-generation heuristics produce the number of chords that the requirement has in its associated property. The chain of chords are then spaced by heuristics depending on how many chords there are, and the effect that the Form Atom wants to produce from its chord spacing.

To initiate the creation of chord schemes, a key and tonality for the composition is selected as a start point. This is done just before the chord scheme generation. In short, the tonic note may be randomised by the generative system. The major/minor tonality of the piece is determined on the basis of an overall assessment of emotional connotation requests in the brief, cross-referenced with analysed pieces that most feature these emotional connotations. Therefore, the analysed compositions that include/feature the most relevant connotations influence the tonality the greatest.

Heuristics

Heuristics performed by the system are generated by analysis, such as by a musicologist although technical approaches are also alternative or complementary, e.g., the use of a genetic algorithm to evolve fewer more accurate heuristics based on fitness functions that test both Occam's Razor (that fewer are axiomatically better) and accuracy in that the heuristics can explain more of the original artefact's note pitches, lengths and positions. These heuristics look for pattern recognition and unusualness in audio components and musical structures to generate a rule that has the fewest number of rules that are able, from a given chord, to generate at least one later chord or a succession of later chords to reproduce the original analysed chord scheme in the original musical artefact. In short, the heuristic is a mathematical explanation. This is the basis on which, given a Form Atom database as a starting point and then a set of textures having aligned emotional connotation which are similar and preferably align with those linked to Form Atoms, composition can be achieved.

Any musical score can be explained by pitch, position and duration for the notes. Other dimensional properties are also generally relevant, e.g., "volume" that relates to the loudness or softness of the performance style which can itself take a number of forms, such as staccato, etc. Every musical score can therefore be described or represented using something akin to the MIDI protocol, i.e., a series of on-off switches over time. Indeed, in providing context for an implementing embodiment, in real terms each 8-bit MIDI envelope is tied to a pulse, and running through a multiplicity of such pulses sequentially generates the performance of the musical score. A series of mathematical functions realised in a Turing equivalent musical programming language can, when combined, ordered and programmed with correct parameters, generate the original score from which these functions were derived. Moreover, the same functions can generate alternatives and acceptable but different scores. For example, the rule may need to explain how to generate a note in the bass from a chord in a specific bar in the treble, and then for there to be selected parameters to be identified that, when applied to the rule, achieve realisation with the original analysed musical notes in the original score. Furthermore, this rule can now be used in other contexts to generate acceptable bass notes even if given different chords. This particular rule may be assigned a suitably descriptive name, e.g., "very basic bass generation for triad in major key" for identification and re-use purposes. The requirement may be, for example, looking at a chord in the treble, we want the bass to be the same pitch but in a lower octave (closest to the bottom possible pitch of a bass guitar). The linguistic explanation for the correct mathematical function may be "in selecting the next bass note, look at all notes in the chord of interest and choose the closest one of those notes (in terms of MIDI separation) to the bass note in the previous bar. In this instance, the correct parameters may relate to the MIDI note separation distances in the original chord in the treble as expressed in terms of the degree, e.g. I, III, IV.

The way in which the generative compositional system of the various embodiments and aspects of the invention works requires heuristics to be used to create chord schemes, textures, fill-in briefing requirements, for the storage of historical information on analysed pieces, and how to plug certain heuristic files into each other. The system therefore develops a generic mechanism that is capable of producing an ordered processing of abstract tasks.

This section describes this processing and model mechanism, before considering the different primitive heuristics within the system that allow for the creation of rhythms, pitches, stored analysis, chords, and chord spacing. Primitive heuristics give the analyst the ability to input their analysis without having to write code.

These processing and model mechanisms allow for the ordered processing of heuristics, as well as the nesting of heuristics into groups that can be copied and moved within the processing flow. It also offers the ability to branch both conditionally and unconditionally, as well as to set the probability that certain heuristics or branches of heuristics may be processed. This is all achieved using the principle of hypernodes.

Primitive heuristics give an analyst the ability to input analysis without having to write code, and are functionally configured to allow for the creation of rhythms, pitches, chords and chord spacing for use or analysis as a consequence of them having predefined mathematical functions in a Turing equivalent musical programming language.

Heuristics Framework—Hypernodes

A hypernode is a building block that allows for hierarchical processing and storing of heuristics. It has the following properties:

1. An ordered list of hypernodes (that supports recursive nesting).
2. A logical operator to describe how the list should be processed.
3. A probability—this is a number that represents the chance of the hypernode being processed.
4. A name—this allows us to name the hypernodes so when listed we can keep track of them.
5. A musical element.

A set of heuristics starts off with one single hypernode. This node in turn contains a list of hypernodes that can have musical elements attached. A musical element contains a specific heuristic, and any other data that needs to be stored with it. Every hypernode has a logical operator attached to it, either an XOR or an AND. If it is an AND, then each hypernode in the list is processed in the list order; if the probability of the hypernode is less than 1, then a random number generator is used to assess whether the item will be processed or skipped. In the event of an XOR list, then only one hypernode is selected from the list to be processed, its likelihood depending on the relative probabilities of each item in the list.

Hypernode Processing

The type of musical element attached to the hypernode will affect how the hypernode is processed. There are different iterative steps that the processor will take depending on this information. These are the types of musical elements that exist within the generative musical composition system of the present invention:

1. Drum—this is a rhythm-generating heuristic, not necessarily associated with drums but with all rhythm in general.
2. Form Atom—this contains information about chords from repertoire that has been analysed and input into the system. Form Atoms are used to create a meta-map of the chord schemes of a piece, as described in detail above.
3. Heuristic—this is a catch-all for any heuristic that is not specifically defined as a pitch-type heuristic. This includes chord and chord-spacing heuristics, as well as heuristics for filling in and completing the omitted parts of a given brief.
4. Pitch—this is a specific type of heuristic that is associated with creating pitch information based on a given chord scheme.
5. Texture adapter—a texture adapter is specifically associated with a texture group. Texture adapters tie pitch, rhythm, and MIDI routing information together.
6. Texture group—a texture group ties texture adapters to meta-tags that can be used by the user.

Whilst all of the above musical elements in a hypernode structure will be processed for every Form Atom, the pitch heuristics will be processed for every chord within a Form Atom's chord scheme. This means that textures are processed only once, but pitch information associated with chord changes is processed for every chord.

Heuristic Components

A heuristic has only three elements that are stored within it: a name, a description (so that the analyst can see what the heuristic does), and a procedure, or method, that is run when the heuristic is invoked/instantiated. This means that heuristics do not contain any pre-programmed data. If a heuristic needs data to be stored with it, then this is held in the musical element that contains the heuristic. However, a heuristic does not rely on data being created for it. This is because all other data is dynamically created and cannot be relied on to be available at the point of processing. This may be due to branching, or statistical chance from probabilities not generating material as expected. Therefore, a series of data maps are associated with different heuristics. These contain any dynamically generated data that any given heuristic may rely on to run its primary function.

The heuristic maps have the following properties:

1. Composition—the composition itself, which includes information on:
   (a) The requirements list—containing briefing information from the user.
   (b) Time signature—of the composition.
   (c) Chord schemes—which are attached to each Form Atom.
   (d) Staffs—the music information that has been created and is ready for the sequencer.
2. A spare Heresy map to provide the heuristic with an ability to send information forwards in time to other heuristics, or to itself when it is processed again.
3. Drum-heuristic-specific information:
   (a) A Black List—for drums that should not be processed if this heuristic has been processed. This is useful to stop things like kick-drum patterns overwriting already written kick-drum patterns.
   (b) Drum—the drum that is being processed. Drums have a plethora of properties that are discussed below.
   (c) A processed drum list—this is a list of drums that have been processed. Some of these may affect the notes that are processed for the heuristic in question.
4. A list of generated pitch information—this is the chord-specific pitch information of notes that Heresy wishes to use when certain drums trigger.
5. A number representing the current Form Atom that is being processed—this allows for surrounding atoms to be considered for things like their local tonic, and chord schemes.
6. A number representing the specific chord within the given Form Atom.
7. A flag list—this may be used as yes/no triggers for this and future heuristics.

Primitive Pitch Heuristics

Having now established the mechanism by which heuristics are processed and how they pass data between each other, it is now possible to consider the different types of primitive heuristics and how they create musical output.

There are two different types of primitive heuristics, i.e., predefined mathematical functions with variable parameters, associated with pitch:

1. Core heuristics—these deal specifically with pitch information and are broken down further into three sub categories:
   (a) Pitch generators—these generate pitch/frequency information, preferably represented in MIDI representational form.
   (b) Pitch transformers—these heuristics change the pitch of notes and chords, i.e., provide an offset which is an integer in a MIDI scale but not in frequency scale where each tonic in successive octaves is frequency doubled.
   (c) Pitch storers—these heuristics create storage areas in memory for notes and Flags. These can be considered simply to be physical storage locations for data.
2. Logical Operators—these heuristics allow for conditional flow control through "If Then Else" type mechanisms, as well as checking whether certain conditions are true, such as note pitches, flags, and chord types being of a certain value. They can also check if note pitches are within a certain range. Essentially, these are branching functions for sub-routines.

Pitch-generating heuristics can gather pitch information from three different sources: from a number that is abstractly stated by the analyst; from a specific inversion position in a chord from the chord scheme; or from an idea staff. An idea staff is a named list of pitch locations, and is set up by the analyst in a separate heuristic list in the hypernode structure. Whilst pitch information can be gathered from any of the three mentioned sources, all generated pitch information is stored in idea staff pitch locations.

There are two different pitch-generator heuristics. The first is called a note picker. This heuristic simply asks what the source note is, and where the destination for the note is. There is the option to randomise the selection from the source if a chord or idea staff is selected. If a randomisation were not possible, then then the note picker would take the exact value from identified ideas staff value at position 0 in the list of pitch locations. However, with randomisation specified, it will take a value from any of the notes stored in the "treble" ideas staff. These literal note values will change every time the chord changes, but this picker will always point to this location. There is also a bar offset for notes sourced from either idea staffs or chords. This means it is possible to obtain pitch information from neighbouring and nearby chords and ideas staffs, and from the pitch values associated with them. In this example, the bar offset is not specified, so the pitch information will come from the idea staff notes associated with the current chord number in the chord scheme.

If the source is chosen to be a chord, then the note number would select a value in the chord from the bass, e.g., in a major chord "1" would give the major third and "2" would give the perfect fifth, "3" may give a major 7th or wrap back around to give the tonic an octave higher, depending on the chord that is generated at the time. The integer gives a literal value for whatever number is specified.

The alternative pitch-generation primitive heuristic is called a Voice Leader. In this generative heuristic, a reference pitch is selected from which to voice lead. This note to lead gives a reference to a note from one of the predefined three sources (idea staff, chord, number). The note to be created is then chosen from a second reference source, typically a chord or ideas staff. The analyst can then specify if they want the note to lead upwards, downwards, or in both directions from the first reference note. If they choose both, then the closest note will be found. It is possible to specify that the note should be forced to change pitch in the event of the note appearing in the second reference chord; this is an example of another rule (of many). If the analyst wishes the note not to wander too far from the initial pitch of a note selected using this heuristic, then this can be specified as a range. This range is then stored in the data map and passed on to the heuristic the next time it is written. If it ever attempts to generate a note out of range, it then has a record of what the initial pitch was and how to voice lead from this value instead. This stops the voice leader heuristic creating melodies and scales that wander off out of idiomatic range for the instrument they are writing for.

It is important to note that the note picker and voice leader generative heuristics are never picking prewritten notes unless their integer option is selected. This means that the pitches that are chosen will be dependent on the harmony in the composition at the point of creation.

There are two types of storage heuristics. One creates a named idea staff with a set number of storage positions; the other is a flag that can be turned on and off during the processing iteration. If the analyst wishes to store any information, then they need to create idea staffs or flags to do this by way of these functions.

Branching and logical operations are achieved by a set of logical operator heuristics. The IfThenElse heuristic presents a set of three hypernodes. The first "if" hypernode checks for a given condition via equality heuristics. There are four different equality heuristics. They can check if a specific note is of a certain pitch, or if a note is within a range of pitches, or whether a chord is of a certain type, or if a flag is in existence and turned on or off If the condition is met, the "then" hypernode is used; if not, the "else" hypernode is used.

Finally, the last set of primitive generative heuristics are transformers. There are three specific ones. The first two are note and chord transposers. These are capable of transposing a note or an entire chord in pitch by a source value from one of the mentioned three sources: an abstract number, an inversion position, or from an idea staff. The third one is an alternative retrospective voice leader. It will take a note in a given position with a given pitch, and it will move it up or down by octaves until it is within an octave of a destination reference note. This is an effective way of removing compound intervals in created pitch material.

Primitive Rhythm Heuristic—Drum

Although there are potentially many alternative mechanisms for generating the rhythmic qualities of melodies and textures from pitch information, a preferred embodiment uses a single primitive rhythm heuristic. This heuristic applies a rhythmic triggering mechanism for the pitch values found in idea staffs created using the pitch heuristics mentioned in the previous section.

The properties of the heuristic are stored in what is referred to as a drum. The drum information is stored in the musical element alongside this primitive rhythm processing heuristic. These musical elements with attached drum data sit in hypernode structures just like other musical elements, meaning that they are processed in a hierarchical order. This means that drums can potentially influence each other as to how they are triggered through their generated and observed output. Whilst drums are indeed used to make drum patterns, their ability to trigger the pitch notes of idea staffs means they have a much more powerful use than that of just creating untuned percussion patterns.

The drum has a name for future reference within the context of the processing mechanism. This drum's name will be referred to by other drums in the same hypernode structure to affect their trigger probabilities. There is a resolution that is defined for the drum. This in turn sets the resolution for two grids: firstly, the probabilities for whether the drum will trigger or not; and secondly, the velocity value if the drum triggers. Each probability can have a value that can be set between 0% and 100%; velocities have a MIDI range between 1 and 127. If a note triggers, then the associated velocity is used. The velocities can be randomised around this value by a set range.

The probability in specific grid positions can be influenced by other drums that have been processed already and triggered. In this case, there are settable velocities for a note should it eventually get triggered. These preprocessed drums may appear in one of two lists. Firstly, there is a not list of drums that negatively affects grid probabilities. If triggered at a given position, these preprocessed drums mean the current drum should not trigger, even if the probability is 100%. This is useful in circumstances such as the unidiomatic triggering of a closed Hi-Hat and an open Hi-Hat at the same time. In this example, an analyst may set the closed Hi-Hat to play on all quaver beats, unless an open Hi-Hat has been triggered. The open Hi-Hat would be processed first in the hypernode structure, and the closed Hi-Hat would be processed afterwards with the open Hi-Hat in its not list. Secondly, there is an attractor list of drums that, if triggered, increases the local probability grid area of our current drum. Whether the attraction adds this probability number to the grid position to the "left", "on", or to the "right" of the triggered grid position is set in the drum properties. This is useful if the user wishes certain notes to be fired next to other notes. For example, in the case of semiquaver snare ghosting, an analyst may wish to increase the chance of a ghost note occurring on a surrounding 2nd or 4th semiquaver if a kick drum or snare drum is triggered on a neighbouring quaver. The kick drum and snare drum may contribute 30% each to the probability of a ghost happening, thus substantially increasing the likelihood of a trigger.

Drums have a pitch value. This pitch value can equate to a literal MIDI pitch, or a store position in an idea staff. Depending on whether the analyst wishes the drum pitch parameter to trigger a specific MIDI note or an idea staff pitch position's value, different rhythm adapters are used at a later stage when the rhythm and pitch heuristics are plugged into each other (such as needed to provided texture).

The drum can be forced to produce a set number of notes, or a range of notes, thus meaning that statistical flukes that result in sparse, or too busy, rhythmic patterns can be avoided. If the drum is only being used as a method to attract or silence other drums through the attractor and not lists, then it can be set to mute. This means that it will not have an output pitch of its own, but it will still be used in the processing mechanism.

The length of time that the given probability grid spans is set by a loop-length parameter. This way, a grid of 16 spread over four beats is effectively semiquavers but spread over eight beats is quavers. It is also possible to say how many times the pattern will occur, or loop around, and whether the pattern happens at the beginning or end of a Form Atom, or the beginning or end of a chord change within the Form Atom. This gives a powerful way to create intricate textures as chords and Form Atoms change.

Finally, the triggered pitch notes are given a length in bars, beats, and fractions of a beat via associated length properties.

Textures

Figure 10:
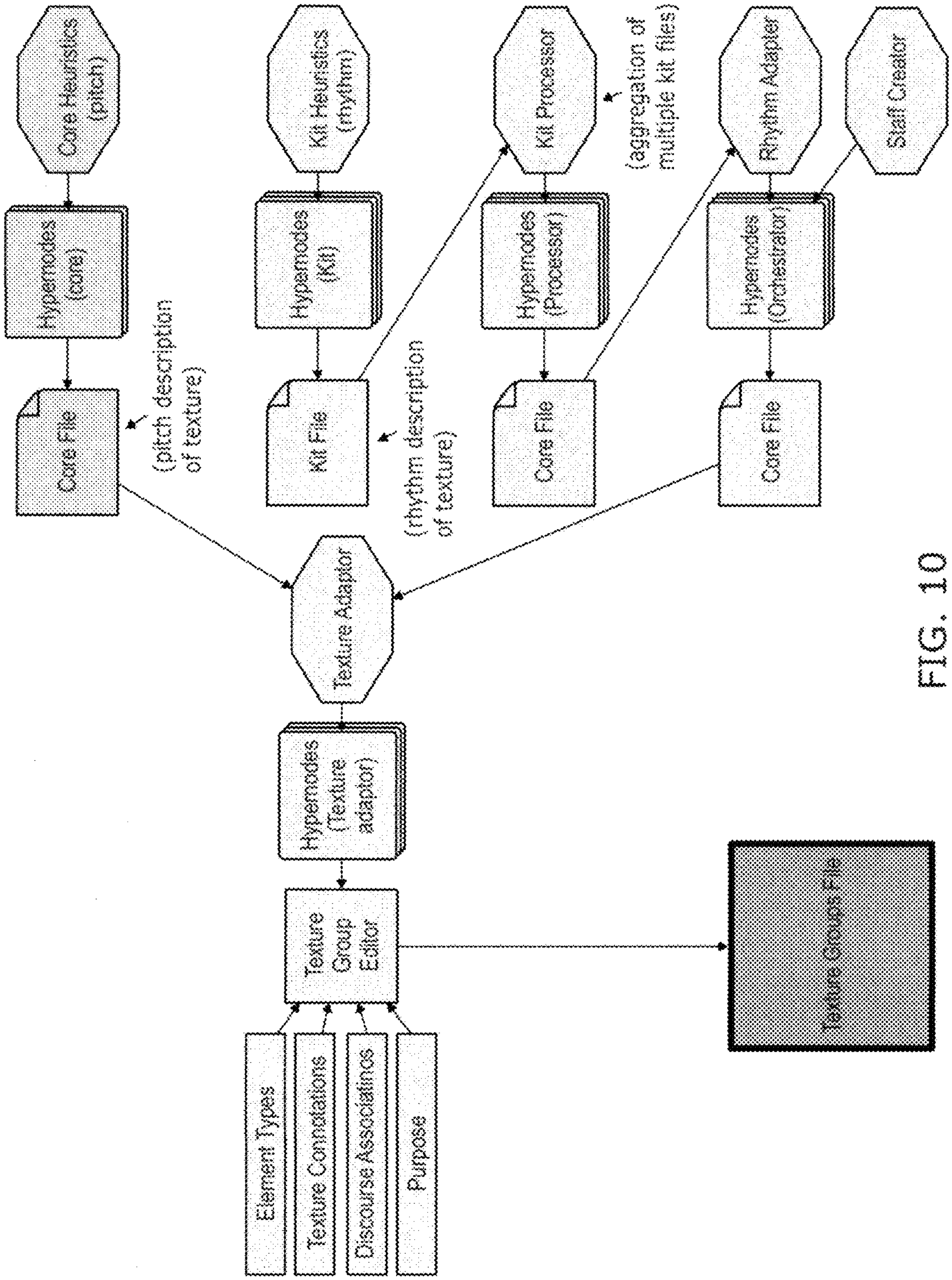
FIG. 10 is a schematic representation of texture generation according to a preferred embodiment of the present invention.

There has already been some considerable discussion of the structure and or effect of texture, particularly in relation to FIGS. 3 and 4. Returning to the point made earlier on extending them again, users achieve textures through specifying emotional connotations. These connotations are, in one embodiment, checked against what is known as a file of texture groups. We will now consider how texture groups are made. The workflow for creating a texture group file that contains this information is represented in FIG. 10. Texture descriptors will eventually be aligned with corresponding descriptors for relevant Form Atoms.

The creation of texture components is the physical output of the generative system of the preferred embodiment since, prior to texture overlay, there is simply a chord scheme chain. Having considered how to classify texture components and link them to a brief, heuristics for pitch and rhythm, and how to form a harmonic map for our composition using Form Atoms and assembled chord schemes, FIG. 10 provides an overview of the processing involved to combine all this information and techniques to understand how textures are specified, constructed, requested by the user, and realised by the system.

The workflow involved with the programming of any given analysis of texture typically follows the following structure:

1. Create pitch data through core heuristics (explained above).
2. Create rhythm data through drum heuristics (explained above).
3. Create a rhythm processor to aggregate desired kits.
4. Create an orchestrator to apply internal storage and external MIDI mapping for rhythm processors.
5. Create a texture group that attaches core files containing pitch data, to orchestrators that contain rhythm and mapping data, through a texture adaptor.
6. Attach meta-tags to the texture group.

Examining the process steps in more detail:

1. The analyst (or program logic and system intelligence as the case may be) starts by creating a set of heuristics that will create pitches that are placed into idea staffs. These heuristics are programmed into a hypernode structure that is stored in a core file.
2. Next, the analyst creates a series of drum heuristics. These hypernodes are stored in a kit file.
3. It is feasible that there may be various different drums across different kits that the analyst may wish to use in order to create a desired rhythm. Therefore, kit files are processed in what is known as a kit processor. This uses a specific heuristic that allows for a kit file, and associated kit from within that file, to be processed. This kit-processing heuristic sits in a processor file.
4. A map is created of where the eventual note information will go, both in terms of the generative system's internal structure and storage, as well as external MIDI mappings for attached VST instruments. Before applying texture, the system has only created abstract snippets of musical material, principally in the form of Form Atoms with related processing to provide chord scheme chains. Texture overlay is where orchestration takes place for a specific range, instrument, and placement onto staffs at a specific point in the score. It is feasible that the orchestrator may wish to use various triggered notes many times, for different instruments (in musical terms, what we know as "doubling"). This is specified in an orchestrator file, which contains hypernodes that tie together rhythm processors, with external MIDI mappings, and internal staffs for storage of MIDI information.

There are two main heuristics that come into play when we create an orchestrator. Firstly, it is necessary to define where to store internally the information that is generated. This is achieved with a staff-creator heuristic. The staff-creator heuristic will place generated material onto a number of staffs. Whilst the ability to have more than one staff is not essential, it is useful for displaying the material to the user in a way that differentiates this material from other staffs, as well as when debugging the heuristics that create the material. The staffs that are created have name properties; a length in bars, beats, and fractions of a beat; a time signature that is appropriate for the material that will be written for it; and an offset measured in bars, beats and fractions of a beat. The offset is applied to the absolute position of any material. This way we can move pickups at the beginning of phrases, and drum fills at the end, across the adjoining bar lines in order to make positive and negative anacruses. Secondly, a rhythm-adaptor heuristic is required to map rhythmically generated material from a processor file, to staffs, and a MIDI channel, a core note, and an idea staff.

As an example, the rhythm processor called "pianos", with hypernode processor called "my Bach piano right hand", will be providing triggers for notes that will request a pitch value from idea staff "treble" at storage position "3". It will take all pitches generated from the idea staff and create MIDI notes for them on channel "11", with an internal destination staff for all this MIDI information that is named "Piano (right hand)". The internal destination staff will provide any information about rhythmic offset. If a pitch position is not specified, then it is assumed that the drum is requesting a literal MIDI pitch. This is how percussion patterns are created. If an ideas staff is not specified, then it is assumed that all the pitches will have the same MIDI and staff routing.

These orchestrators will work on any given pitch information that is generated in step 1 above; however, we may wish these triggers to work on pitches generated by a variety of different core files. Consequently, we now create a texture-adaptor heuristic to tie pitch data, to orchestrator data. A texture adaptor is given two components: a specific core pitch hypernode generator from a core file, and a orchestrator hypernode from an orchestrator file. This texture-adaptor heuristic is placed into a hypernode structure that is part of a texture group.

5. A texture group has a hypernode that contains texture adaptors and meta-data that the analyst wishes to associate with the texture adaptor's output. This data contains the briefing components that a user may specify and includes:

(a) Element types—these are the texture functions listed and discussed herein.

(b) Texture Connotations—these are the abstract keywords that associate emotional connotation, as discussed herein.

(c) Discourse Associations—this is the meta data connotations regarding composer and discourse discussed herein.

(d) Purpose—this is to indicate whether the element components are features or accompaniment.

Texture Generator

Previously, a system for inputting musical textures into the generative system has been described. Like the Form Atoms requirements list describe above, the system also has a texture requirements list. In fact, the system will only write music where there is simultaneously a texture requirement in the texture requirements list and chord scheme requirement in the Form Atom requirements list. These are required to provide the necessary linkage between identical, semantically equivalent or semantically satisfactorily close emotional connotations that can be musically linked from selection of Form Atoms that fit the entirety of the brief.

Earlier, there was described a mechanism by which any gaps in Form Atoms Requirements List was filed. In a preferred embodiment, the system is arranged, in view of a lack of relevant direction in the brief, to continue the current texture meta-tag requests until a new one arises with the arrow of time. This feeds back into the texture requirements list so that the user can delete or change the texture as they see fit in between sections. This means they do not have to repeat texture requirements in between points of changing texture in the brief.

To calculate textures, the generative system of the preferred embodiment cycles through all chord requirements and checks if a texture requirement overlaps with it. If so, it processes the texture requirement whilst using the chord scheme created for the associated Form Atom. If the Form Atom starts early, or extends longer than the texture, this does not matter because the processor is arranged to already have composed material if early, and if late it will compose the remaining material onto the next cycle.

The generative system of the present invention preferably prioritises requests for featured texture elements (such as harmony, melody, counter-melody, etc.) over accompaniment elements. It creates a list of all required elements that are features, then checks for all available texture groups that meet one of these requirements. This texture group list is then scored depending on how many other meta-tags the texture group can fulfil.

As explained, there may be multiple elements within a texture group. Whilst some of these elements may fit the brief requirement, others will not. The texture group may also have metatags regarding connotations attached to it that are also relevant to the brief. Scores are cumulative. To provide a selection process, the system intelligence may score texture elements that are not features but which are requested as +1, elements requested that are features as +2, and groups with appropriate metatags as +4. This takes into account weighting towards texture groups that have satisfied the strictest criterion, namely having a featured element that is requested by the brief. Generally, the system is arranged to choose the highest scored texture group, whereafter there is a temporary removal of the satisfied elements from the brief and repeat of the process to find the next appropriate texture groups. This eventually fulfils all requested elements with and without features, as well as encouraging texture groups with the correct meta-tags for discourse and connotation.

Once we have selected appropriate textures, we perform two tasks. Firstly, we add the texture groups to a list of requirements that will be checked and prioritised on future texture generation cycles if their scores are matched. This way we use repeated texture ideas throughout the composition where possible, rather than changing texture ideas each and every time a similar requirement is encountered. Secondly, the texture groups that have been selected are processed by the system intelligence.

To process the texture groups, these are added into a hypernode list for processing. However, before proceeding, the system creates a data map that contains the form requirement items for both Form Atom and texture. An index of these is recorded, with the composition also added into the data map too. This is all the information the texture adaptors need to process the texture group.

Section C: Analysis Method

Earlier, the reasoning behind compositional decisions has been stated. There has also been a discussion concerning the preferred analysis method used to create input for the framework of the system. Whilst a full analysis of a piece of music would disrupt the explanation of the concepts on which the analysis is based, Section D below gives a detailed analysis of Bach's C minor prelude to highlight the concepts of the inventive approaches employed in the preferred system through a comprehensive and practical example.

This section will firstly offer an overview of the steps that are gone through in order to perform an analysis. It will then describe how the concepts of entropy and redundancy are utilised, before going into detail of how the analysis is performed through the use of examples. This chapter also offers a useful analytical tool that is part of the Heresy framework for inputting the analysis of Form Atoms from a given composition—known as piece annotation.

Overview of Analysis Steps

Before we consider the mechanism in-depth that will allow expression of meta-compositions, this section outlines the steps an analyst or analytically-configured smart system must undertake to obtain a set of heuristics that deliver a desired musical result and generative composition. In order to break any given composition down into the heuristics that the system needs to generate music, the system performs the following tasks:

1. Form Overview—this process is used to breakdown the piece's overall chord scheme into constituent Form Atoms.
2. Form Atom Analysis—this allows categorisation of Form Atoms that have been identified in step one through their properties, as well as to describe any heuristics necessary to create the chord schemes along with their associated chord spacer heuristics.
3. Texture Analysis—groupings of musical notes that can be explained by a self-contained set of heuristics are called textures. Texture analysis involves highlighting the entropy and redundancy that appears within the texture (see "section titled Entropy and Redundancy" immediately below), as well as identification and explanation for how to generate what Deliege (2001) calls cues.

For these three tasks, using Turing equivalent mathematical programming language, a set of provided primitive heuristics, having programmable parameters, generates musical textures based on the output of chord generation and spatial/temporal heuristics which are logically sequenced through the principle of defined Form Atoms.

Entropy and Redundancy

The system and approach works on the premise of explaining the most amount of music in a given piece with the fewest number of heuristics. This means that new concepts may require development of a new heuristic, whilst older ones are further generalised where possible. The principles of entropy and redundancy, set out in our understanding of communication theory, present tools to work towards compression of the rule set.

Throughout the figures we highlight entropy and redundancy using a predefined colour scheme of red (darker tone in grey-scale printing), green (mid-tone in grey scale) and yellow (lightest tone). These colours help show how sets of heuristics can be reused and adapted throughout the analysis, and where we need to devise new ones to cope with material we have no explanation for. Whilst using this colouring mechanism in texture analysis, if the Form Atom analysis has patterns that can benefit from this approach, then this colour coding technique can be applied there too. These colours symbolise the following:

1. Green represents direct repeats of information for which there are devised heuristics.
2. Red highlights components of the analysis for which there is no explanation and for which we have to create heuristics.

3. Yellow symbolises where adaptation of already created heuristics is required, or otherwise a change in parameters is needed to give a different result.

Form Atom Analysis

Introduction

This section shows how to classify Form Atoms into a limited set of progression descriptors depending on their chord scheme's properties (as described earlier). This process results in interchangeable Form Atoms depending on their properties.

Phillip Ball defines tonal music as that which has a priority tone (Ball, 2011), with phrases have functionality which gives the listener a temporal map based on the priority tone. The listener tries to predict how the phrases will bring the piece back towards the priority tone, which involves the process of categorisation (Deliege, 2001).

Figure 11:
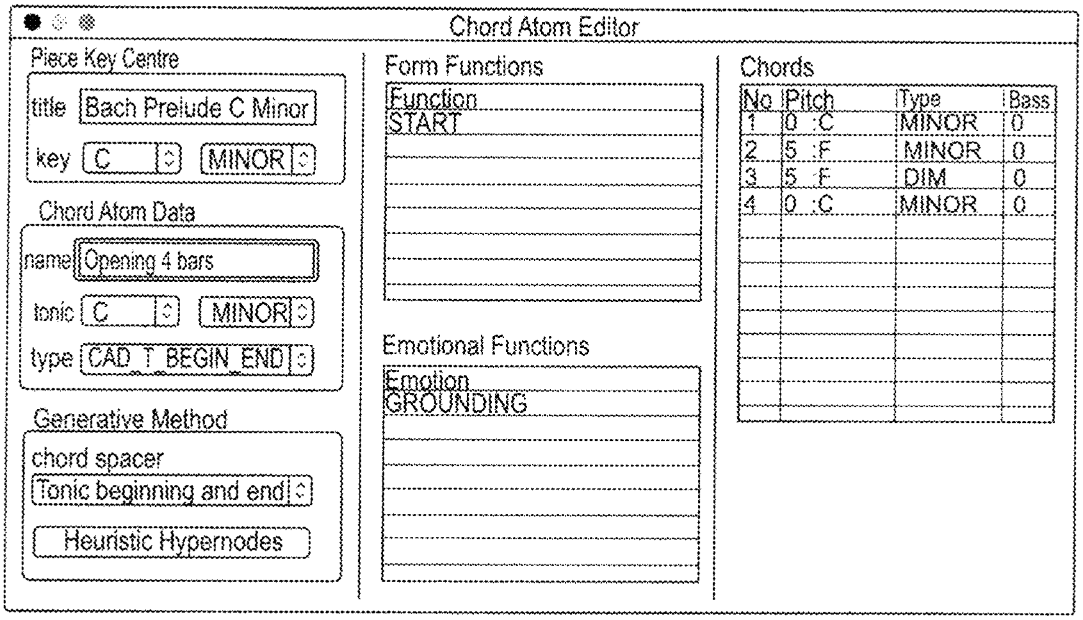
FIG. 11 is a screen shot of a graphical user interface for a piece annotation system according to one embodiment of the present invention.

To achieve the input of an analysed piece, the generative system described herein provides a piece annotation system. For illustrative purposes, an example implementation of this piece annotation system is shown in FIG. 11.

Piece Annotation

To annotate a piece, it is qualitatively broken down into progressions with associated descriptors. This restricts interpretation to a set of descriptors as outlined earlier.

As will now be appreciated, Form Atoms are musical elements that sit in a hypernode structure for reasons of processing, including at least one of manipulation and use. This gives the analyst the ability to structure the piece's input hierarchically, allowing for branches within a piece to be represented next to each other in a logical way. This can be useful for visualising the relationship between Form Atoms that are in different places in the music, such as codas and repeats, and is useful when the system and method of the various embodiments creates such Form Atom trees (as described above).

There is a chord list associated with each atom from the composition under analysis. Each chord has the properties of pitch, type, and bass (e.g., pitch—C, type—minor, bass—C). This string of chords gives an ordered list which can be turned into a branching structure to give options for different chords from, and to, other chords in a cadential sequence. Each atom has a tonic pitch and associated tonality, such as major, minor, or one of the modes. This tonic is needed to give context to the chord branches. If we expand on the previous example considered in the explanation of the local tonic, i.e., D to G with a tonic of C, this is essentially a relationship that can be expressed eventually within the system in semitones as tonic+2 to tonic+7. The mode of the tonic is relevant because it can be used when generating certain sequences of chords, as well as being an important factor in the classification of the tonality of particular choices within a series of branches. For example, in the tonic of C major, we would expect to see an F major preceding a C major chord rather than the rarer F minor. In the parallel tonality of C minor, the expectation of the F chord's tonality is for F minor.

There are three options for progression descriptors: cadential, sequence-intervallic, or sequence-tonal. If cadential, the system intelligence can deduce from the entered chords how to classify the descriptor further based on the tonic's position being either at the beginning, end, both, or neither. This gives the generative mechanism one component of the jigsaw puzzle necessary to construct future chord schemes. There are two Form Atom properties that can have multiple entries: the emotional functions and the form-function lists:

Firstly, considering the emotional function. In the F-to-C example just discussed, the rarer mode of the F minor chord could be interpreted and labelled by the analyst with the emotional connotation "surprise". Later, if a user asks for "surprise" in the brief requirements, this Form Atom would become a potential possibility, and the atom's heuristics would create a chord sequence which encapsulates this surprise quality.

Secondly, the analyst adds form-function information. As previously, the form functions restrict options for interchangeability. Although we described in depth the difference between statements, questions and answers, it is a general rule that, under analysis, if a Form Atom:

1. feels like it is loopable, then it is a statement;
2. feels like it is modulating, or that it can go to a different key centre, then it is a question, and it will inevitably be followed by an answer.

Each Form Atom now has its generative heuristics attached to it. These heuristics may be from previously written ones that are reused, or fresh ones that describe a new chord scheme generative mechanism. These heuristics consists of the two components, as again already described above. Firstly, a hypernode that contains the pitch and tonality chord sequence generator. Secondly, a chord-spacer algorithm which will space the chords that are generated over a given musical timeframe. In this way, the number of chords that will be generated can remain independent of the timeframe in which they will eventually sit. This is important, because the timeframe itself may be quite changeable when film cues are lengthened and shortened.

Standard Chord Heuristics

This section describes the standard cadential heuristic and chord-spacing heuristics. These are our foundations for creating chord-atom heuristics, and can quite often be used verbatim.

Standard Cadential Heuristic

As a starting point for all cadential sequences, given the tonic position from the progression descriptor a standard approach can be used for creating chord trees from all the chords recorded in any analysed pieces (Nierhaus, 2009). To do this in the context of the invention, account must be taken of the Form Atom's local tonic to give the progression context. If the number of chords to be generated is n, and in making sure that the tonic either does not appear or otherwise appears anywhere except in the middle of the atom, four cadential progression descriptors are produced:

1. For a desired chord scheme which has the tonic at the beginning, we generate a chain of chords from tonic to tonic of length n+1. We then remove the last tonic.
2. For a desired chord scheme with the tonic at the end, we repeat the process but delete the first tonic instead.
3. For a tonic-to-tonic chord scheme, we simply produce the chain of chords of length n.
4. For a chord scheme that has no tonic at the beginning or end, we create a chord scheme of length n+2 and delete both tonics. We also confirm that there is evidence that the last chord can cadence to the first in the corpus of analysed pieces, e.g., Dmin=>F=>G7.

Chord-Spacer Heuristics

Chord-spacer heuristics, abbreviated CSH, spread out the available chords into a given number of bars. The foundation heuristic call for any given CSH hypernode system is termed the CSHStandard method. This method spreads out the chords depending on how many chords per bar the given CSH has allocated, balanced by each bar's priority for accepting a new chord. The method needs the given chord sequence, the Form Atom's time signature, the number of bars, and an array of numbers representing the priority of each bar for having chords placed in it. The method finds the highest priority bar and allocates it a chord, thus reducing the bar's priority number by 1. This process is repeated for the number of available chords.

The priority of chords for each bar is given to this heuristic by other CSHs that are specific to progression descriptors. All bars' priorities are set to 0 to start.

CSH Cadential Tonic at Beginning and End

This CSH checks the number of chords to see if it is even. If so, it de-prioritises the first and last bar's priority to −1 each. If this is the same bar, it will take all the chords. If there are two bars, then they will be treated equally. If there are more than two bars, then this prioritisation will decrease the chance of the first and last bars having chords. As the first and last chord are both tonics in this type of chord scheme, this is a way of giving the tonics more musical space to breathe and to assert themselves over the other chords in the chord scheme.

If there are an odd number of chords, then the first or last tonic is given space to breathe, and the opposite tonic is given less time. This is achieved by randomly choosing either the first or last bar and setting its priority to −1, and assigning the opposite end a priority of 2. This encourages space in the chord placing of one of the tonic bars, but gives space to the other, thus making up for the unusual feel of an uneven number of bars. This technique for spacing chords is observed in works by composers noted for phrases made up out of uneven numbers of bars, such as Mahler (e.g., Andante third movement of the Symphony no. 6, anacrusis to bar 3 through to bar 5, 3rd beat) and Burt Bacharach (e.g., "That's What Friends Are For", bars 13 to 18).

CSH Cadential Tonic at the End

This creates even priorities for all bars of 0, except the last bar, which is given a priority of −1 to allow the tonic to breathe.

CSH Cadential No Tonic

This has an even number of bar priorities: all are simply set to 0.

CSH Cadential Tonic at the Beginning

This heuristic is a copy of CSH Cadential Tonic at Beginning and End, except that if the number of bars is odd, then the prioritisation is not random: the first bar is de-prioritised to −1 and the last bar has its priorities increased to 2.

Figure 12:
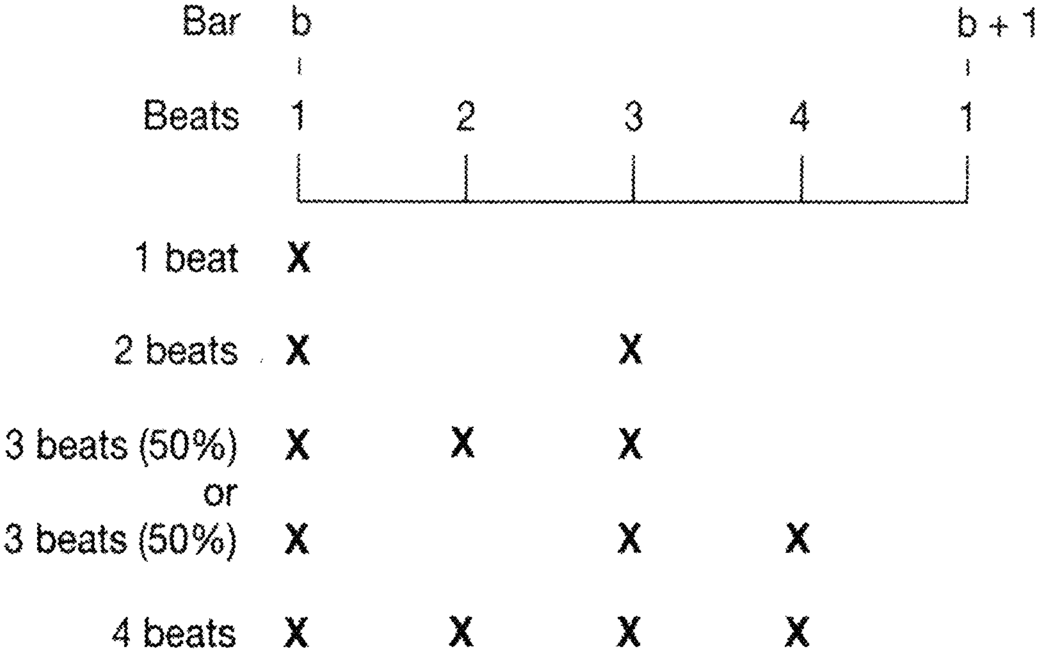
FIG. 12 is a chord placement chart representing a spacing heuristic for use in one embodiment of the present invention.

Actual chord spacing is then performed by a spacing heuristic that sits behind CSHStandard. This heuristic is termed CHS placer and places the chords on beats based on how many chords appear in the bar. This placing is represented in FIG. 12.

From this set of limited standard heuristics, we can see the shape of a preferred chord generator of the generative system, or HCGen for short. This is a series of hypernodes that consists of a standard chord-scheme generator, spacer, and placer hypernode. A root hypernode is created, and in it we place four items:

1. Standard Cadential Heuristic.
2. CSH progression specific heuristic for prioritising bars. This varies depending on the progression descriptor.
3. CSH standard chord-spacer heuristic.
4. CSH placer heuristic.

This represents a typical hypernode structure for creating chords.

Sequential Form Atom Notation

Sequential Form Atoms can come in two varieties: interval and tonality-based (see above).

An intervallic Form Atom moves through a series of chords that involve chords from outside the key centre of the local tonic, so by definition their form function is a question. Sequences need to break their sequence, or they would go on forever; we call the first chord to vary from the sequence its escape chord. Escape chords are, by definition, in the following Form Atom, and this Form Atom's form function is classed as an answer.

There is a standard intervallic template that we use to express the sequence and its escape chord. This can be seen in FIG. 13. We state how to obtain the beginning pitch of the sequence, and specify the tonality and any extensions that the chord may have. We then have two possible arrows from this chord: one to a function that changes the pitch of the chord in semitones and the other to an escape chord. The pitch function has an arrow pointing back to the chord to show the flow loop. The escape chord will have pitch, tonality, and extension information.

Figure 13:
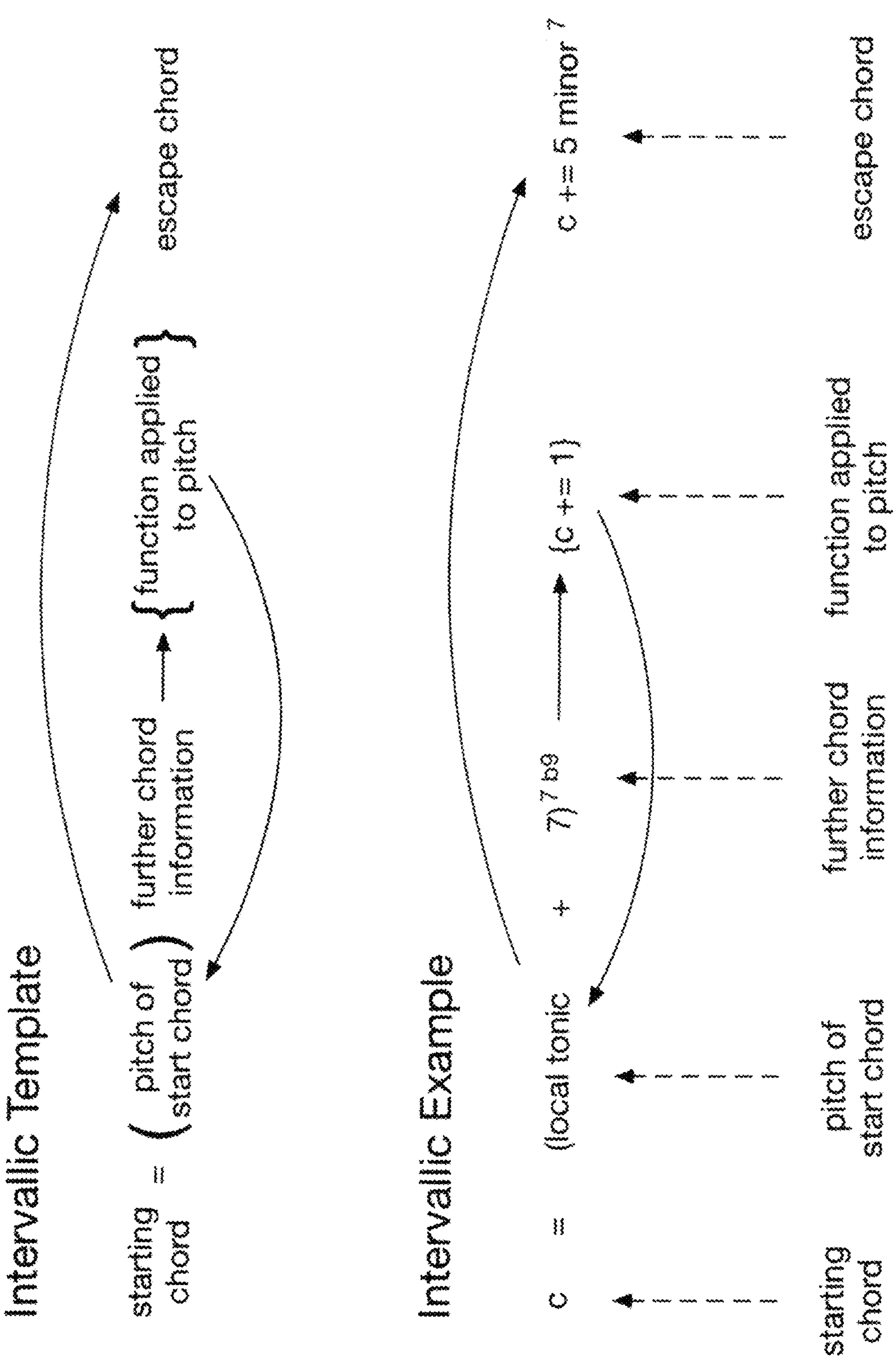
FIG. 13 is a sequential Form Atom template for use in one embodiment of the present invention.

The sequential Form Atom template of FIG. 13 lays out the pitch for the initial chord, how the chord is altered through iterations, and the escape chord and associated relationship and properties.

A musical example of how the Intervallic Template works for Template 1 can be seen below in the Section titled Form Atom 4.

Form Atom Analysis Example

Figure 14:
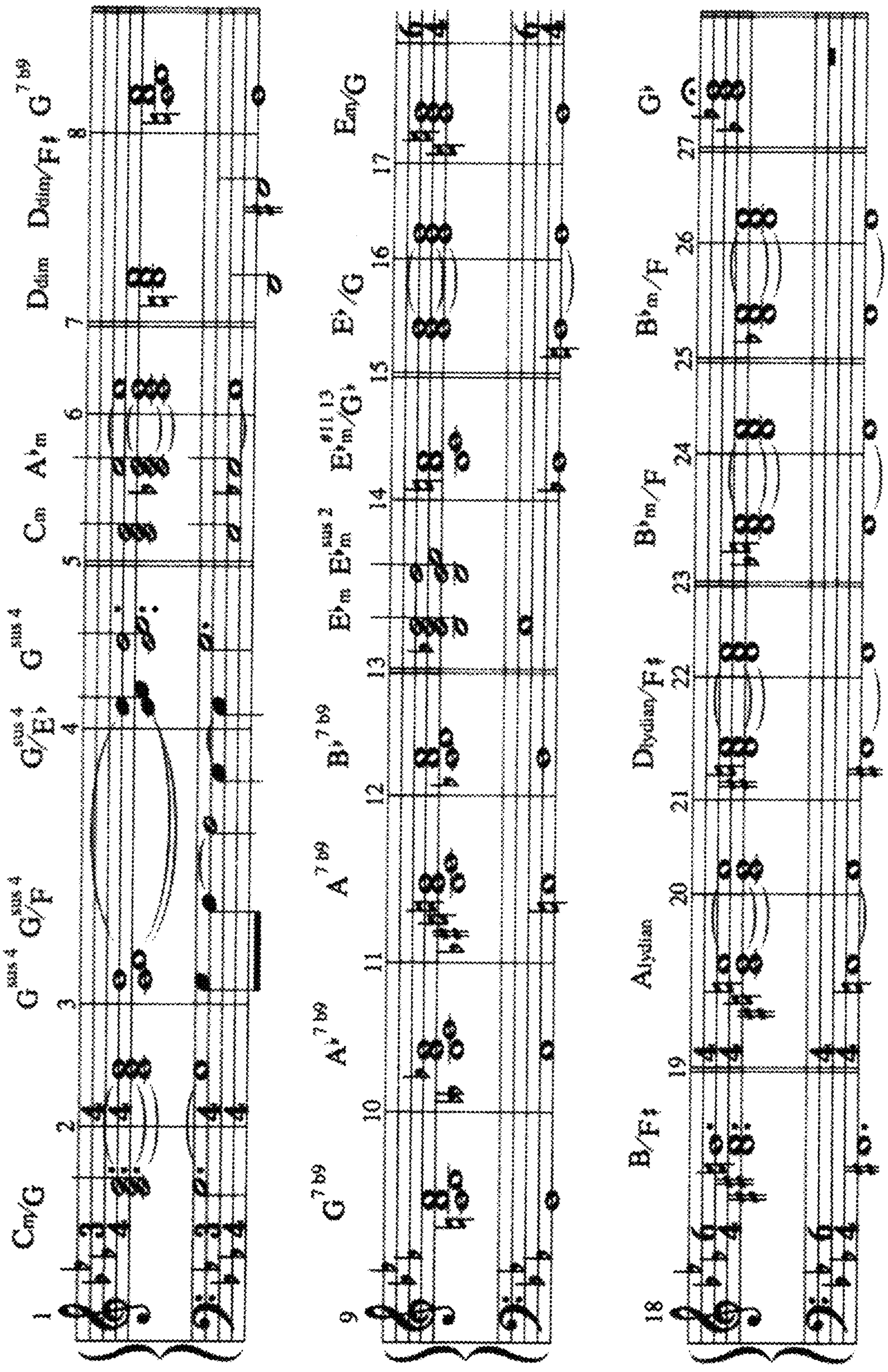
FIG. 14 is a portion of The Quidditch Match musical score by John Williams annotated for reduction and analysis according to an implementation of the present invention.

In this section, by way of an example, a precise code brief is specified for a section of film score from "The Quidditch Match" by John Williams for Harry Potter and the Philosopher's Stone (Heyman & Columbus, 2001), the score and a reduction and analysis of which is shown in FIG. 14.

This demonstrates how we can break down the composition into appropriate Form Atoms that fit the predefined progression descriptors. Due to differing frame rates for different movie formats, this section of music is best found at 6:39 s of the commercial release of the soundtrack. It concerns the build-up of tension towards the final capture of the Snitch, which Harry Potter swallows and then spits out at bar 27. The analysis is high level and coding-language independent. Double bar lines depict each Form Atom.

Form Atom 1 (Cadential): Bars 1 to 4

This Form Atom functions as a perfect cadence in the key of C minor. Due to its initial tonic (albeit in second inversion) and final dominant G chord, it feels clearly loopable and therefore is classified as a statement. The bass movement is worthy of future analysis with regards to how bass movement can be generated in a scalic fashion; however, this movement is not relevant to the immediate study of the chord scheme.

To produce this phrase we use HCGen with a cadential tonic at the beginning bar prioritiser heuristic. The space given to the tonic, and placement of the chords in general through this phrase in this phrase (two chords in the final bar), reflects how our standard chord spacer works.

Form Atom 2 (Cadential): Bars 5 and 6

This phrase contains a tonic minor chord and an Abm which follows it. This Abm seems to pose a musical question which requires a response if the key centre of C minor is to be maintained. If we take this phrase in isolation and ask if it is loopable, it would not be a completely offensive cadence to go from the Abm to C minor; however, the Abm is not in the key centre due to the Cb. This is therefore more appropriate to classify it as a question Form Atom. The treatment of this question in the score is to accent these two chords with a harsh accent. This would warrant an emotional connotation tag: "Chase Starts", or maybe "Power Tutti". These statements are clearly personal to the analyst, and reveal a distinctive set of personal aesthetics with which different analysts may argue. This is fine, so long as the analyst can challenge themselves with the output and stand by the generative results as what they expect from their work. There should also be a consistent use of emotional connotation words. If the analyst wishes, the words can be non-emotionally descriptive, such as mode 1, to allow for the user to make their own associations with the analyst's modes.

To produce this phrase we use HCGen with an adapted CSH cadential tonic at beginning and end. In our adapted version, we would specify that the tonic bar is prioritised and the last bar containing question chords (i.e., those not from this key centre) is de-prioritised to build their tension through having more time on the foreign chord. This means setting the first bar's priority to 2 and the last's to −1.

Form Atom 3 (Cadential): Bars 7 and 8

This section would sound familiar to anyone who knows the works of John Williams: it is the same diminished sequence that is repeated as a build-up of tension in the Star Wars (Kurtz & Lucas, 1977) scores. To this end, and considering it has followed a question, we can expect this to be an answer phrase. Confirming this, we can see that this is effectively a secondary dominant to dominant progression (II to V) in the current key of C minor. This will automatically give Heresy a link from a bVI minor chord to the diminished II chord, therefore any section ending or starting in either of these can call on the other as a link.

Likewise, these chords can be strung together within a cadential section.

We attach the standard HCGen to this Form Atom, selecting cadential no tonic as the progression descriptor.

Form Atom 4 (Sequential): Bars 9 to 12

Figure 15:
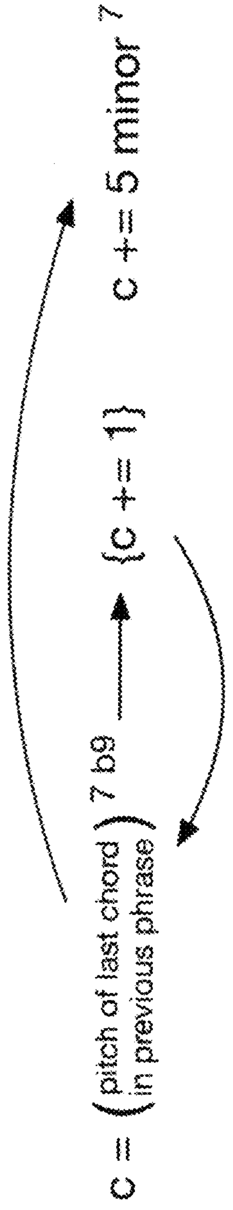
FIG. 15 is an intervallic template representing a loop of sequence Form Atom 3, with escape Form Atom 4, derived from The Quidditch Match composition according to an implementation of the invention.

This is our first sequential phrase in the piece so far, its intervallic template can be seen in FIG. 15, which represents a loop of sequence Form Atom 3, with escape Form Atom 4 in The Quidditch Match. It is based on a dominant 7 b9 chord which rises in semitones. This, by definition, is a question phrase because it requires an escape phrase to answer it, thereby bringing it to a halt. It is worth noting that this chord section could just as easily start on any chord from within a range of approximately −4 to +1 semitones (Eb 7 b9 to Ab 7 b9), and still be effective; however, the repeat of the previous phrase's G 7 b9 helps to ground the beginning of the chromatic rise in this build up and give it a starting context. The previous G could of course be generated differently, so we would tend to say that in the heuristic we create, the start of this chord should be a repeat of the last chord in the previous generated chord scheme associated with the previous Form Atom.

Form Atom 5 (Sequential): Bars 13 and 14

This contains the escape chord for Form Atom 4, hence this is an answer phrase. This escape phrase's chord is minor and its pitch is +5 semitones from the last sequence chord. The 9 #11 13 chord in bar 14 serves as the climactic point of the escape phrase. This is a useful example of how to build a chord function based on embellishment of our current chord. Our heuristics are labelled with the emotional connotation "embellishment", which when asked for will call the chord creation and spacing heuristics that follow.

Heuristically, we would describe this chord sequence as a number of local tonics. The first tonic is a plain triad, the last tonic is a fully suspended chord with a #1 lth and 13th over the third of the chord in the bass, creating a first inversion. Any tonics in between these two points alter one note to adapt towards the final state. The number of tonics is dependent on the number of bars. We use two chords per bar until the last bar where we have the final prescribed chord. If we run out of alterations but still have chord spaces to fill, we change the latter chords in the sequence to occupy one bar rather than half a bar.

Form Atom 6 (Cadential): Bars 15 to 18

If at bar 15, Harry Potter had fallen off his broomstick and broken his neck, we would have been happily content with the self-contained build up that Williams has delivered so far: the escape function could resolve to an Abm chord and effectively finish the cue. However, as Harry pulls out of his steep dive and loses his adversary in the race to be the sole flyer, we are given an anticipation of success and the build up to a win.

To continue building the tension, Williams chooses to lift out of the Em #11 13 to Eb/G. This gives us a new way to resolve from an answer phrase in a way which does the opposite of conclusion. Eb is established as the new key. Still, the piece could end here on a Lydian melody and fade calmly to a final repeated chord of Eb. However, at bar 17, the chord scheme intensifies yet again with the arrival of the Em to 2nd inversion B chords.

Figure 16:
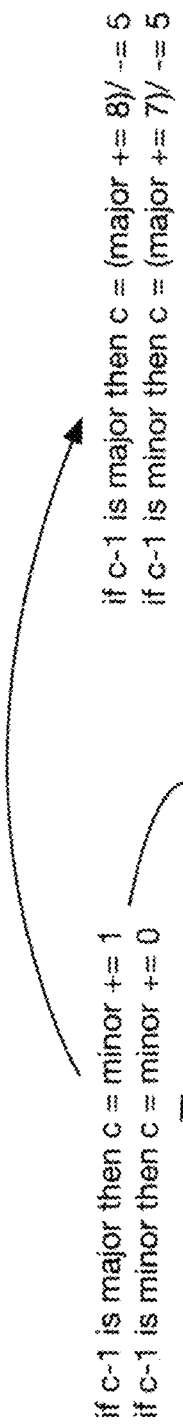
FIG. 16 is a template representing a Form Atom 6 sequential cadence derived from The Quidditch Match composition according to an implementation of the invention.

This reveals a new type of sequential movement that could be extended beyond its current one cycle with immediate escape, namely that of rising pairs of chords in semitones. This is shown in FIG. 16—Form Atom 6 sequential cadence from The Quidditch Match. This takes the chord from the last chord in the previous Form Atom and looks at its tonality, major or minor. If major, the first chord in this new bar is a minor first inversion 1 chord whose root is semitone higher. If minor, then this is a first inversion major chord of the same root. This pattern then repeats until the escape chord is needed.

The escape chord is related to a minor resolution as +7 semitones, and to the major as +8 semitones. The escape chord is in the second inversion and is a major chord.

A standard chord spacer of cadential no tonic will give the desired spacing.

Form Atom 7 (Sequential): Bars 19 to 22

Figure 17:
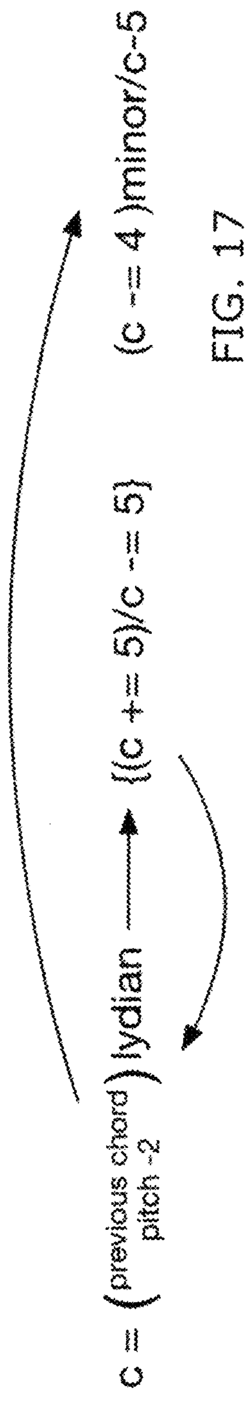
FIG. 17 is a template representing sequence and escape phrases 7 and 8 derived from The Quidditch Match composition according to an implementation of the invention.

This two-chord phrase can be interpreted as a sequence which escapes after its first iteration. It could, however, be elongated to lengthen the time taken throughout the build up. This pattern is represented in FIG. 17—sequence and escape phrases 7 and 8 from The Quidditch Match.

Form Atoms 8 and 9 (Cadential): Bars 23 to 26

Form Atom 8 in bars 23 and 24 (and its repeat as Form Atom 9 in bars 25 and 26), functions as an escape chord to Form Atom 7, and gives us a new tonic of Bb. It is apparent that John Williams uses second inversion chords as escape chords, with the tonality giving a distinctive flavour. This is the beginnings of gathering enough evidence to investigate a more common mechanism for predicting appropriate escape chords based on second inversions and the relationship to the last chord in the sequence, but we would need to see more examples of this in other works to be sure there was a pattern.

Texture Analysis Example

We have looked at the various primitive pitch and rhythm heuristics (above, subsection titled "Primitive Pitch Heuristics"). In this section we illustrate how one can create a texture using them. See in Section D below a far more in-depth analysis of Bach's C Minor prelude, placed there in order not to interrupt the discussion. We shall procedurally step through the process outlined in the earlier subsection titled “Textures”.

Figure 18:
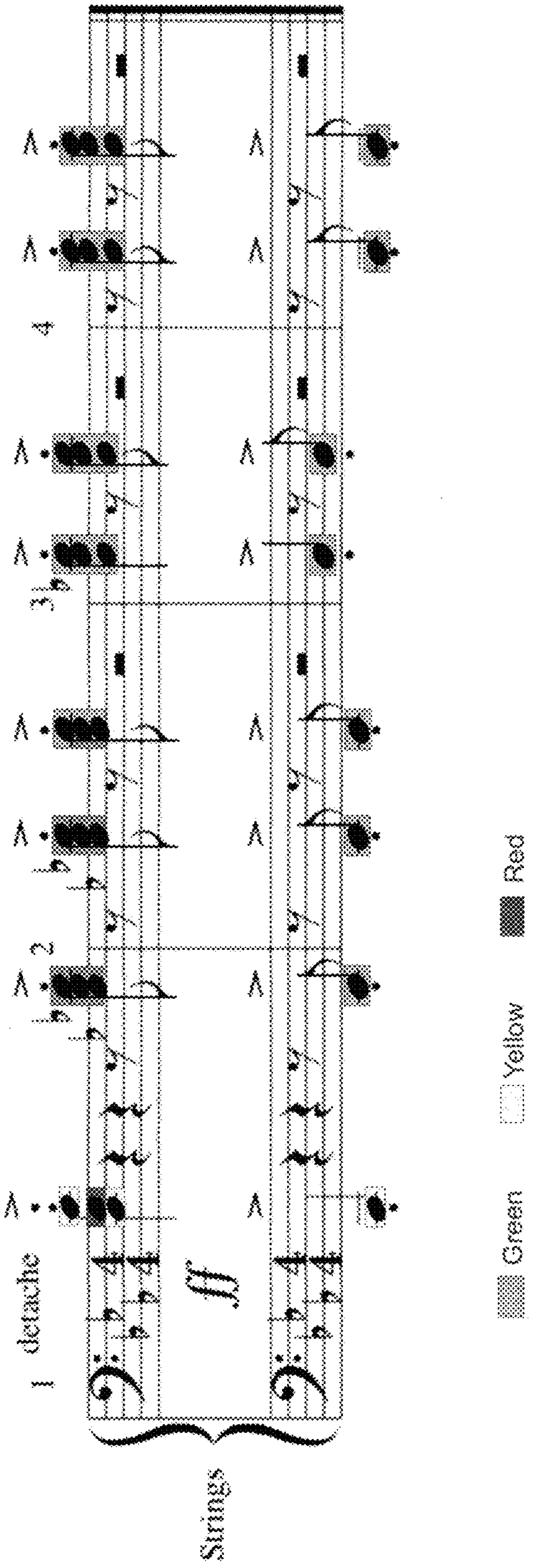
FIG. 18 is a musical score of a four-bar section of detache string writing enhanced according to one implementation of the invention with associated colour labels that indicate note pitch.

For this section we shall create a generative version of the detaché string writing seen in the score in FIG. 18. This figure shows the entropy, redundancy, and development of heuristics through the red (note E in treble, first bar), green (all other notes except) and yellow (base note and other notes in triad of first chord of first bar) colouring system.

The score in FIG. 18 is a four-bar section of detaché string writing with associated colour labels for note pitch. This would be orchestrated across violins 1 and 2, violas, celli, and double basses doubling the celli and sounding an octave below.

This style of writing is typical of many Hollywood thriller and spy scores such as The Bourne Supremacy (Crowley & Greengrass, 2004) and Armageddon (Bruckheimer & Bay, 1998). From an analytical perspective it is worth investigating why this technique is associated with certain semiotics within films in which it features—so popular that it has become a cliché. It is typically used to add gritty tension to action scenes. It underpins adrenaline-fueled chases with action starts in full swing. For this reason, it tends to be orchestrated in the lowest range possible for the instruments at hand, and this in itself normally means that the rhythmic pattern is given room in the texture to be the main feature, un-obfuscated by other instrumentation in this rhythm or pitch area.

This requirement for the strings to be as low as possible gives us a useful starting point. Because the chords are closed in the violins and violas, the pitch-depth restriction falls on the second violin. The heuristics to do this will be created for the second violins without being based on previous heuristics, consequently the second violin’s first note pitch is coloured red. In this case, this means restricting the second note from the top of the texture to being as close to their bottom G as possible without going below it. The first violins then play an inversion above this, and the violas play an inversion below. Both of the pitches for first notes for the first violin’s and the viola’s are developments of the heuristics created for the second violin’s, consequently they are coloured yellow.

The basses and celli simply are playing in unison as low as possible. They are therefore following a similar procedure to the second violin, but their lowest note is MIDI Cl (36). Consequently, they can use the same heuristics developed for the second violin but with a different parameter for their lowest pitch. We therefore colour their pitch yellow for the first note. All the pitches for the rest of the notes in the example are created using exactly the same heuristics as their first note pitch, hence their note heads are coloured green.

It is worth noting that if a chord appears one quaver before a chord change, then the new chord is anticipated, or pushed, resulting in a pre-emptive upbeat. This can be seen at the end of bar 1, when the chord changes to that of bar 2 a quaver early. For this reason, we will need to calculate not only the pitches necessary for any given chord, but also for the immediately following chord. Then, when the rhythm generator has created the placements for the chords, if a chord is a quaver away from a chord change, we can apply the pitch of the following chord. This push will be calculated in the rhythm adaptor, whereby the latter can tell if a chord change is coming in a quaver’s time, and if so, how to change selection from the current chord position’s pitches to the next chord position’s pitches.

Step 1: Pitches

The hypernode structure for the pitch component of the analysis is as follows:

Our first hypernode is an AND hypernode, which will process all elements in the list given a probability of 100%.

1. 100%—CORE: Setup Ideas Staff

This sets up an idea staff with the name Strings with 5 pitch storage positions for the current chord, and 5 for the next chord, giving 10 positions in total. When the texture adaptor detects the presence of a chord change a quaver after the current triggering, it will add 5 onto its array position search, thus choosing the pitches for the chord to come.

2. 100%—AND hypernode: “violin 2”

2.1 100%—CORE: Voice Leader (a) This voice leads from a fixed number of MIDI G2 (55).

(b) The direction is up and it does not have to change from the G2.

(c) The chord to reference is the chord scheme in this bar.

(d) The destination for the pitch data is Strings position 2.

2.2 100%—CORE: Note Picker

The next heuristic will repeat the process of the first heuristic in 2.1, but will have a 1-bar offset in its chord to reference, thus choosing a pitch from the chord to follow. However, in the event of the current chord being the last chord in the chord scheme, we will not have any data to look for. The rhythm adaptor will still look for a note in this array position if there is a quaver triggered at the end of a Form Atom. Therefore, this is a preemptive heuristic to cope with this situation. This simply initialises position 6 of the Strings array with a copied value from 2.

2.3 100%—CORE: Voice Leader

As mentioned, this heuristic is identical to the heuristic in 2.1, but has a 1-bar offset in its chord to reference, thus choosing a pitch from the chord to follow.

3. 100%—AND hypernode: “violin 1”

3.1 100%—CORE: Voice Leader (a) This voice leads from violin 2 upwards in our current bar to the next note available in the chord.

(b) The direction is up and it is forced to change from the violin 2 reference.

(c) The chord to reference is the chord scheme in this bar.

(d) The destination for the pitch data is Strings position 1.

3.2 100%—CORE: Note Picker

As with the preemptive heuristic in violin 2, this initialises position 5 of the Strings array with a copied value from 1.

3.3 100%—CORE: Voice Leader

This heuristic is identical to the heuristic in 3.1, but has a 1-bar offset in its chord to reference, thus choosing a pitch from the following chord.

4. 100%—AND hypernode: “violas” 4.1. 100%—CORE: Voice Leader (a) This voice leads from violin 2 downwards in our current bar to the next note available in the chord.

(b) The direction is down and it is forced to change from the violin 2 reference.

(c) The chord to reference is the chord scheme in this bar.

(d) The destination for the pitch data is Strings position 3.

4.2 100%—CORE: Note Picker

The preemptive heuristic: it initialises position 7 of the Strings array with a value copied from 3.

4.3. 100%—CORE: Voice Leader

This heuristic is identical to the heuristic in 4.1, but has a 1-bar offset in its chord to reference, thus choosing a pitch from the following chord.

5. 100%—AND hypernode: "bass"

5.1 100%—CORE: Voice Leader (a) This voice leads from a fixed number of MIDI Cl (36).

(b) The direction is up and it is not forced to change from the reference.

(c) The chord to reference is the chord scheme in this bar.

(d) The destination for the pitch data is Strings position 5.

5.2 100%—CORE: Note Picker

A preemptive heuristic: it initialises position 10 of the Strings array with a value copied from 5.

5.3 100%—CORE: Voice Leader

This heuristic is identical to the heuristic in 5.1, but has a 1-bar offset in its chord to reference, thus choosing a pitch from the following chord.

6. 100%—AND hypernode: "celli"

6.1 100%—CORE: Note Picker

This note copies the bass at position 5. (It will sound an octave higher when orchestrated on the celli.)

6.2 100%—CORE: Note Picker

This note copies the bass at position 10.

This will give us all the pitch information necessary to create our textures.

Step 2—Rhythm

Now we need to consider rhythm. There are two chords in each bar. The first appears in beat 1, either on the 1st or the 2nd quaver. The second attack point, or stab, appears either on the + of beat 2 or 4. The rhythmic hypernode in the kit's file looks like this:

1. 100%—XOR hypernode: "1 or 1+"

This node will chose between whether the first stab in the bar comes on the first quaver of the first beat or on the second quaver of the first beat.

1.1 50%—AND hypernode: "1"

1.1.1 100%—DRUM: 1Violins 1

(a) This is the drum template from which we will copy all other drums.

(b) Grid resolution=8. 100% chance of triggering on the first beat with a velocity of 122. Velocity is randomised by 10 (122 gives a range of 117 to 127). Loop length is 4 beats. Length is one quaver. Pitch is set to position 1 (this is the position in the Strings idea staff).

1.1.2 100%—DRUM: 1Violins 2

Copy of drum Violins 1. Pitch is set to position 2.

1.1.3 100%—DRUM: 1Violas

Copy of drum Violins 1. Pitch is set to position 3.

1.1.4 100%—DRUM: 1Celli

Copy of drum Violins 1. Pitch is set to position 4.

1.1.5 100%—DRUM: 1Double Basses

Copy of drum Violins 1. Pitch is set to position 5.

1.2 50%—AND hypernode: "1+"

1.2.1 100%—DRUM: 1+Violins 1

In short, this node contains copies of all the drums in heuristic 1.1, but the probability grid is 100% on the second quaver of the bar, not on the first. It is worth noting that the name of the drums is different (incorporating a +sign), so that the NOT and attractor lists can show a differentiation if necessary between these similarly named drums.

1.2.2 100%—DRUM: 1+Violins 2

1.2.3 100%—DRUM: 1+Violas 1.2.4 100%—DRUM: 1+Celli 1.2.5 100%—DRUM: 1+Double Basses 2. 100%—XOR hypernode: "1 or 1+"

This node will chose between whether the second stab in the bar comes on 2+ or on 4+.

2.1 50%—AND hypernode: "2+"

2.1.1 100%—DRUM: 2+Violins 1

These heuristics are copies of all the drums in heuristic 1.1, but the probability grid is 100% on 2+.

2.1.2 100%—DRUM: 2+Violins 2

2.1.3 100%—DRUM: 2+Violas 2.1.4 100%—DRUM: 2+Celli 2.1.5 100%—DRUM: 2+Double Basses 2.2 50%—AND hypernode: "4+"

2.2.1 100%—DRUM: 4+Violins 1

These heuristics are copies of all the drums in heuristic 1.1, but the probability grid is 100% on 4+.

2.2.2 100%—DRUM: 4+Violins 2

2.2.3 100%—DRUM: 4+Violas 2.2.4 100%—DRUM: 4+Celli 2.2.5 100%—DRUM: 4+Double Basses These heuristics are processed by a custom rhythm adaptor. This adaptor checks if the next chord or end of phrase is a quaver away from any given triggered quaver. If so, it adds 5 to the pitch position. This selects the next bar's notes from the Strings idea staff.

Section D

I. Contextual analysis of Bach C minor Prelude to Generate Heuristic for the Generative System of Embodiments and Aspects of the Present Invention DC.1 Abstract The purpose of this study is to analysis the Bach prelude with a view to creating a set of exemplary heuristics capable of reproducing the analysed work as well as many others.

Contextually, this analysis offers a way to turn qualitative musical data into quantitative empirical data, and demonstrates the validity and approach described above in terms of the treatment of chord transposition/manipulation, chord construction and note generation.

The abstraction of the algorithms is essentially based on expert qualitative opinion. These algorithms have a multitude of parameters and criteria which can be changed with observable results. This gives a way to measure the effectiveness of each assertion, and to create a bank of heuristics which give consistent musical results and work in all contexts.

D.2 Introduction

Whilst identifying and developing a simple set of heuristics that reproduce the piece in its entirety, these algorithmic processes are able to produce a wide variety of quality material, too.

Like any other, the application of this analytical method is subjective and iterative. However, its findings provide a road map for an empirically measurable set of heuristics which can be used to test the validity of the analysis. Through this method, a road map is identified to take qualitative analysis and turn it into a set of heuristics which can be judged quantitatively.

The piece under consideration is the first 24 bars of Bach's C minor prelude from the first book of the Well Tempered Clavier (1722). This contains data for three algorithms which are obtainable from the first 24 bars' data. These bars constitute the vast majority of the first version of the piece, after which it jumps from bar 25 to bar 35 and ends with one bar of C major, totalling 27 bars (Ledbetter, 2002, p. 152).

The following study is broken into four areas: three for texture heuristics and one for phrase analysis.

D.3 Analysis Method

Figures 19, 20:
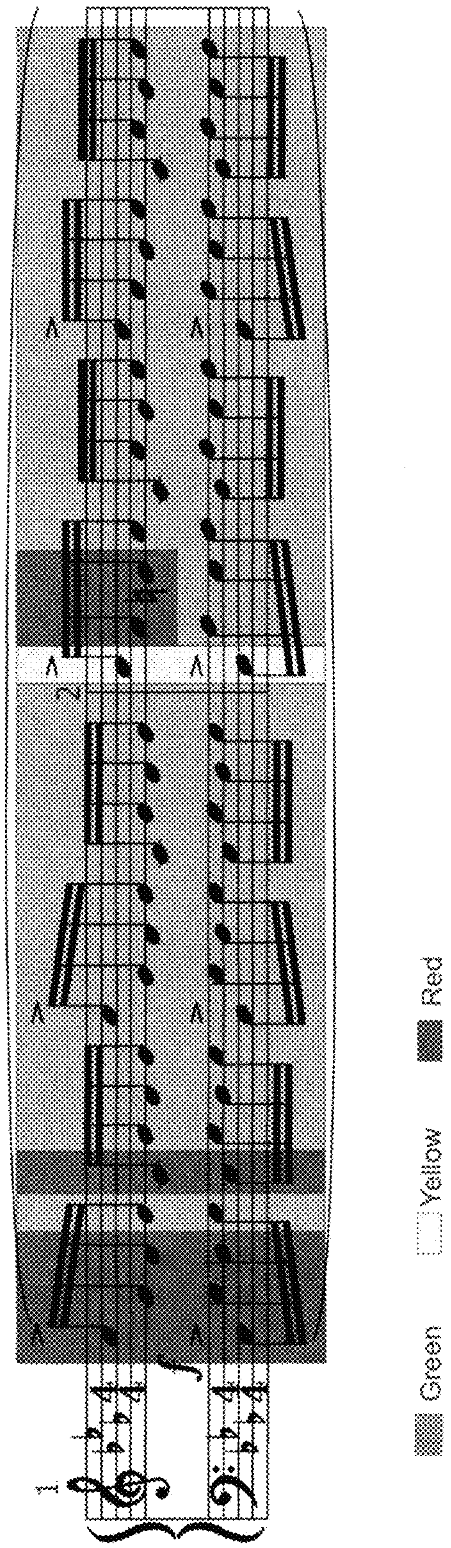
FIG. 19 is a musical score of the first two bars of the Prelude in C Minor by Johann Sebastian Bach modified according to one implementation of the invention by highlighting syntactic structures and note pitches according to a predefined colour scheme.
FIG. 20 is a table showing degrees of the scale of semiquaver 3 with relation to the local dominant of the corresponding bar, in an analysis of texture according to the invention.

Throughout the analysis syntactic structures and note pitches are highlighted. The purpose is to establish what is purely entropic and redundant, as well as what is developed material. FIG. 19 shows the typical structure of entropic, redundant and developed material in the first two bars, using the predefined colour scheme of red to indicate "entropic" (darkest shading, position of notes 1 to 3 in bar 1 and position of notes in positions 2 to 4 in treble of bar 2), green to indicate "redundant" (mid-coloured shading, position of note 4 in bar 1 and all remaining notes in bar 1 and bar 2 except those expressly identified as red or yellow) and yellow to indicate "developed" (lightest shading and first note in both treble and base in bar 2).

D.4 Form Overview

With regards to the piece in hand, (Bruhn, 1993) breaks it down into four structural sections:

1. bars 1-4 (perfect cadence in C minor)
2. bars 5-14 (modulation to Eb major)
3. bars 15-18 (modulation back to C minor)
4. bars 18-38 (complex, extended cadence in C)

The analysis makes use of more dynamic fluidity in the functionality of any given section.

This section shows that the piece divides into three different variations of the same algorithmic process. Section 1 is the first variant of this process from bar 1 to bar 18. Section 2 is the second variant present in bars 19 and 20. Section 3 is the third variant that lasts from bar 21 to bar 24. These sections each have a different algorithmic processes to produce their material and provide insight into the structure of the Bach prelude. From a formal point of view, each of these sections is capable of breaking down into more modular components.

With the entirety of the generative compositional system of the present invention, form is elastic and dictated by refining a set of brief requirements based on the structure of the multi-media product, such as a film, for which it is composing. Described are processes that detail how chord sections may be lengthened and shortened through the use of different briefing requirements.

D.5 Phrase Analysis

The purpose of this phrase analysis is to define three distinct and different sets of heuristics that will generate chord schemes and form pieces.

D.5.1 Phrase 1 (Cadential): Bars 1 to 4

This phrase functions as a loopable statement which emphasises the key centre of C minor. It demonstrates that the IV dim can be used as a cadence chord to the local tonic.

D.5.2 Phrase 2 (Sequence): Bars 5 to 12

Conventional analysis attributes this section to the harmonisation of a falling scale using the first inversion major chord to third inversion dominant 7th, figured bass as 6-3 to 6-4-2 (Ledbetter, 2002). It would be possible to consider this as a cycle of 5ths, except that the Ab to $D^7$ chords in bars 5 and 6 do not follow a strict cycle of 5ths pattern.

The following therefore applies an approach that is more than conventional analysis can offer, namely a set of logical heuristics to explain both the choice of major or minor harmony, and the choice of these chords' roots that lie outside the strict cycle of 5ths. This approach is deemed necessary because this avoids the system from being allowed just to generate any chord in an ad hoc fashion in order to harmonise melody and thus to avoid being pushed out of the realms of tonal music where there would be a loss of the priority tone or key centre.

The evaluation does, however, need to be able to categorise specific chord schemes if new ones are generated based on compositional principles described herein.

There are several readings that are possible for the chord scheme between bars 5 and 14. They do follow an intervallic relationship in the melodic minor scale, that of rising 3 scale steps for each new chord until the chord scheme has returned to Ab (equivalent to a falling cycle of 5ths within the given scale). This could be interpreted as a sequence phrase, but this still does not offer a generative structure that would produce the D7 chord. A more interesting reading is that of the principle of the tritone substitution. Known in jazz, this is where a dominant 7th that is a tritone (or augmented fourth) away from a dominant 7th, can be used in place of the dominant 7th. This supports a transposition from Ab=>D7=>Gm. However, if the Ab is functioning as a tritone substitution to elongate the D7, then switching these chords around should result in the piece still sounding quite natural, as if there was an extended cadence to Gm. This simply is not the case and sounds awkward when played by the algorithm in tests.

The preferred reading is to use a sequence phrase method that can be applied to any developmental section of a piece in a minor key. By choosing a random place within the descending melodic minor scale and then creating a descending scale from that note, repeating every note for a chord change. E.g.: Ab, G, G, F, F, Eb; or D, C, C, Bb, Bb, Ab, Ab. Wherever a semitone is encountered within the scale, a tritone substitution is made to the dominant to harmonise the pattern, and whenever a tone is encountered a simple II V7 progression is used. The scale is then discarded as it is only used to generate the chord sequence.

This can be expressed in the following pseudo-code:

```
//make an array that contains the tonic minor scale
descending
int[7] scale = tonic _melodic minor descending;
//create a list of chords to hold all generated chords
List<Chord> chordList;
//randomly choose a starting position in the scale
int positionInScale = random(7);
//loop this bit until you have enough chords
while (notAtEscapeTime)
  // if the current scale note is a semitone away from the preceding note
  if (scale[positionInScale] - scale[positionInScale+1] == semitone)
    // do tritone to dom7
    chordList.add: withPitch: scale[positionInScale], mode: major
    chordList.add: withPitch: scale[positionInScale+1] + 7, mode: dom7
  else
    // do minor II to dom7
    chordList.add: withPitch: scale[positionInScale], mode: minor
    chordList.add: withPitch: scale[positionInScale+1] + 7, mode: dom7
  // move on to next not in descending scale
  positionInScale++ mod 8
```

D.5.3 Phrase 3 (Cadential): Bars 13 to 14

The phrase 2 sequence requires an escape phrase, which occurs at bars 13 and 14 as a perfect cadence to the relative major, Eb. This sequence is generated from a scale from the relative minor. Therefore, the escape phrase can be focused on the specific key of the relative major without worrying about what was going on in the sequence beforehand. This makes for some rather interesting yet viable escape relationships, such as if the generative mechanism were to have finished on a scale position of D in the key of C using the pseudo code above.

This would mean the last two chords in the "chordList" would be Bbm and Eb7. Using the proposed escape mechanism we would get: Bbm=>Eb7=>Bb7=>Eb.

D.5.4 Phrase 4 (Cadential): Bars 15 to 16

This phrase acts as a question in the relative minor of Eb major, the original key centre of C minor. This gives a way of modulating from the relative major through the use of the relative major's supertonic dom7th, which, if we were to interpret the root as Eb, could also be classed as the relative major 9 #11 13. This chord then calls the Bb7b9 (see Section D.6.2 for the reason this chord classification), which is connected to the following answer phrase.

D.5.5 Phrase 5 (Cadential): Bars 17 to 18

This is the answer phrase to question phrase 4. It functions as a cadence to the tonic minor from the supertonic diminished (see Section D.6.2 for the reason for this chord classification).

D.5.6 Phrase 6 (Sequential): Bars 19 to 20

This phrase reveals the second set of heuristics which are an adaptation of the first. This, by definition, means that it is a self-contained section since it acts as a build-up to the escape phrase at bar 21. The phrase currently features a chord scheme which moves from the subdominant minor to the second inversion tonic via a rising diminished chord. These chords have a tonic C minor chord superimposed at the top of their voicing. There are two ways to handle this. Firstly, create two chords at this point in time and give rules for their voicings. Secondly, give the C minor notes context within the existing chords. This second approach would result in bar 19 represented as Fm7 and bar 20 as F #dim; however, the use of the B on the third semiquaver makes these chords unlikely candidates for the bars' textures. The heuristics used to embellish the texture appear to be based on C minor and clearly persist throughout the phrase. Therefore, the first reading of two superimposed chords makes more sense. This specific example of Fm and F #dim is a conventional way to arrive at a cadential six-four; however, this common invention requires explanation in the shape of heuristics.

Section 2 (D.7) considers that this two-bar phrase appears to be playing on the fact that the first two notes of the tonic triad, C and Eb here, can be extensions for many other chords that would have these as higher notes within the chord—or extensions. To create this sequence pattern of chords we can use the following pseudo code:

```
cCds[ ] = array for the chord scheme;
noOfChords = number of desired chords;
newChord = new chord holder;
for(i = 0; i < noOfChords; i++){
  if (i = 0){
    newChord = findChordWith({C, Eb}, 2 , true, cCds};
  }else{
    if (currentChords[i−1] has one extensions below){
      newChord = findChordWith({C, Eb}, 2 , true, cCds};
    } if (currentChords[i−1] has two extensions below){
      50% newChord = findChordWith({C, Eb}, 3 , false, cCds}0;
      or newChord = findChordWith({C, Eb}, 2 , true, cCds};
    } if (currentChords[i−1] has three extensions below){
      50% newChord = findChordWith({C, Eb}, 3 , false, cCds};
      or newChord = findChordWith({C, Eb}, 2 , false, cCds};
      }
  }
  cCds.add(newChord)
  ;
}
```

Here, findChordWith( ) is a function that returns a major or minor chord with any number of extensions (7ths, 9ths, etc.); it can also return a diminished chord. (An Abs can be potentially returned in this case as an Adim.)

As with all heuristics generated through this method of analysis, there is a core qualitative judgement made by the analyst which produces the analyst's first attempt in attempting to define methods which can generate as wide a variety of musical ideas as possible whilst ensuring they remain musically acceptable. These heuristics are therefore refined qualitatively by the analyst passing judgement on the return of the musical ideas that the rules produce. This can be through either dry runs or actual computation. The purpose of these refinements is to point towards a musically acceptable result as perceived by the predefined audience. How the analyst decides to define the audience therefore affects the compositional judgement that is made. Different opinions may be able to contextualise different verities of returned output. In the case of this specific phrase, an analyst with in-depth experience of jazz may perceive certain returned chords as substitutions, therefore subconsciously giving them a viable context that a different analyst would not. It is conceivable that a good composer would be able to offer a context to justify any combination of intervals, given sufficient scope to orchestrate and prepare the given chord through its surrounding syntax. Given a large enough sample set of pieces from any particular period, the evolution of heuristics offers increasing insight into the development of codes and conventions from one point in musical history to another.

In the case of this analysis, the stance taken is that the results sound idiomatic for the piece in question. This qualitative approach of listening to the returned values and assessing them through perception can offer a bulwark against criticisms such as that articulated by Ball (2011, p. 69), who suggests that "it's a common habit of musical iconoclasts who seek 'theoretical' justifications for their experiments . . . to use abstract reasoning that takes no account of how music is actually heard".

Here, Ball is referring to the auditory-cognitive processes that a mind goes through when listening to music. The pitfalls of creating a scientific theory for music without taking into account a model of the cognitive process is highlighted by Wiggins et al., (2010, p. 237). They argue that, "because music, and in particular musical structure, only has existence in the mind, the very notion of a scientific theory of Music, distinct from mind, is suspect" and "To study the thing itself [music], we need access to the implicit, or tacit, knowledge used by music analysts—the structures that are inferred and experienced by listeners and other active musicians—and to the processes that build them".

The exemplary study expressed herein provides a basis for definitions of these tacit processes, and explains the cognitive theory behind them.

In the case of this Phrase 6, we have two notes multiplied by two chords giving four possibilities. The two chords always feature the 3rd degree of the scale to highlight its harmony and the point of this section is to use the lowest extensions in the chord which is building down from the Eb. It is therefore irrelevant for this method to return any chord which alters the 5th. If this were to be the case, then the 3rd and 5th without the root would be a chord in the list that was already usable. The alternative voicing of the root and 5th would leave an ambiguity as to the tonality of the chord in question. This is not the case in Phrase 3 where extensions are sought at the top of the chord, but in this context there is no other supportive evidence for voicing or voice-leading. It would also seem unidiomatic to combine intervals which do not create a third relationship of some kind, such as a natural 7th to a flattened 9th. Consequently, the approach of the invention returns extensions which are bound to allow major and minor thirds only through the:

(a) 7th being major or minor
(b) 9th being flattened (if 7th is minor) or natural
(c) 11th being natural or sharpened (if 9th is natural)
(d) 13th being natural The method also takes an array of notes which will make the top extensions of the chord it will return. It takes an integer to state how many extensions below these notes it will include to make the chord. It takes a Boolean to decide whether it can use chords with fewer extensions than this integer. It accepts an array of chords in which it checks whether the chord it has generated exists or not.

D.5.7 Phrase 7 (Sequential): Bars 21 to 24

This phrase is interpreted as two phrases repeated. The first acts as an escape phrase to sequence phrase 6 through bars 21 and 22. It would be possible to loop these two bars, but they feel as if they require embellishment throughout the repeat with rising extensions (as in fact the piece does in bars 23 and 24). The need to embellish a repeated phrase is how an answer phrase is described: one that, if repeated, appears to be building to a climactic release of a cadence resolution.

This phrase is generated by creating a series of chords that are all cadences to the tonic, in a way which gives a rising melody by creating an initial tonic-chord texture and choosing a melody note which is the closest viable option to the top of the main texture. (This viability is based on the note being far enough away from the main texture to become a cue (Deliege, 2001) as is discussed later.) The subsequent choice is a cadence chord to the tonic and repeat of the tonic texture whilst selecting the treble's first note of the bar to be the next available note above the previous bar's top note from the cadence chord's various possibilities. Each time there is a return to the tonic chord, the next extension upwards for the treble's first note (in the previous cadence chord's bar) is used. This may cause the next down note of the texture from the top melody note to fall more than an octave away from the melody note in position 1 of the treble. However, by re-voicing the texture to be higher the texture is brought to within the octave boundary of the top note in the right hand at position 1. The bass figuration stays the same unless it ends up starting on the same interval as the treble texture, in which case it moves one inversion higher to offer a harmonic alternative.

This states that the texture's voicing is dependent on the melody. This does not stray from traditional thinking, in that the octave span is idiomatic for the instrument.

D.5.8 Phrase 8 (Cadential): 35 Till End

The current analysis is not concerned with the embellishment of the dominant ending for this piece. Suffice to say, the previous sequence phrase requires an escape phrase. The escape phrase in this context is a tonic chord for two bars. This is in keeping with the original version of the piece which cut to bar 35, (Ledbetter, 2002).

D.6 Section 1: Bars 1-18

D.6.1 Initial Observations

1. Evidence of a self-contained syntagm (or sign at the very least) is from the fact that each bar contains a complete copy of the first half in the second half. This only changes in bar 18, where the bass moves in a downward step from C through Bb to Ab. This exception can be considered within its localised context later in the analysis. Further redundancy can be found in the fact that the last three pitches of each second beat are the same as the last three note pitches of the first beat. On top of this, each 4th semiquaver within the first beat of each bar is a copy of the 2nd. This, combined with the fact that each 3rd and 4th beat is a copy of the first two beats, means that there is only a need to explain the relationships between four notes in each bar algorithmically. The rest of the bar can be generated from this material.

2. From the four notes in question in each bar, semiquavers 1, 2 and 5 are notes of the chord for the bar (with one exception at bar 14).

3. Bass notes on the first semiquaver appear to represent a pedal throughout most of the piece; these bass notes change in certain bars but not others. Conventional readings put this pedal note down to a chromatic note within the bar for which most analyses provides little more than an acknowledgment (Bruhn, 1993; Ledbetter, 2002). It would not be appropriate to leave such a compositional statement as this unexamined if the underlying algorithm is to be effective. Rather, it is necessary to establish how this note stays the same, what happens to change it and what influences the note's pitch when it does change.

4. There are non-chord notes which appear at semiquaver 3. These notes do not necessarily fall on the scale notes for the given key of C minor. The 2nd bar demonstrates this with the E natural in the top (right) hand. In fact, it appears as the leading note for the bar's chord of F minor. Ledbetter (2002) suggests that Bach used chapter VI of Niedt's Handleitung zur Variation (Niedt, 1989) in order to arrive at this figuration.

However, Niedt's book does not offer any explanation for the note's naturalisation. This chapter contains rules to obtain "stronger harmony" when voice leading. The second chapter states rules for the setup and successful resolution of consonant and dissonant intervals, including definitions of both, but these rules do not offer a set of heuristics for the appropriate selection of notes in a way which can be abstracted from the post-rationalisation of a choice which has been made. The nature of these rules is merely suggested in Bach's writing (including his abilities to break them), but they do not give us an explanation for the pitch choices of the notes in question. A system of heuristics is therefore needed to be obtained through analysis to decide how to generate their pitches. This set of heuristics should be able to be given parameters to alter the emotional stimulus of the music whilst maintaining its human aesthetic properties.

5. The pattern of direction within bars of the figuration changes in places. In various bars Bach chooses to alter the pattern of how the figuration works in the left hand. This requires explanation in order to calculate when pattern alterations are needed, and which variants are appropriate.

6. Bach's implied melody falls outside of the main texture where other notes form the figuration. Deliege (2001) explains this phenomenon through the principle of cue abstraction. Based on the concept of grouping within gestalt psychology, the mind separates these notes from the main texture, giving them a sense of continuation with a melodic function. The following considers how to reproduce this algorithmically.

D.6.2 The Texture

From point 3 in the initial observations, taking the E natural in bar two as a local leading note to the bar's chord of F, an explanation for the note's pitch is derived. This asserts that the note is derived from the dominant of the F minor chord, C major. If we consider the G which also appears below the E natural in this bar, this is consistent with the C major chord. By therefore stating that all notes in this 3rd semiquaver position in every bar are from the bar's chord's dominant or dominant 7th, an interesting pattern emerges from the rest of the bars in the piece (not including diminished chords, which we shall consider separately). Each dominant chord is guaranteed to have a 5th degree of the scale. The other note is either the 3rd to give the dominant chord, or the flattened 7th to give a dominant seventh. Furthermore, this 5th is always preceded and followed by the 3rd of the bar's current chord. This pattern can occur in either the bass or the treble. While this 5th is harmonised by a 3rd or a 7th note from the local dominant chord of the bar, 3rds are preceded and followed by roots in the bar's current chord and 7ths by 5ths. This is essentially a different way of looking at voice leading: the main chord of the bar must feature a 3rd to give it its mode. This observation of how the pattern works in this piece is simply stating that the 3rd always moves down to the 5th of the local dominant and back (underlined as 3-5-3 in the analysis), and likewise for the 1st-3rd-1st and 5th-7th-5th relationships. FIG. 20 shows the bass and treble notes within the dominant chord related to the given bar's root.

The following analysis shows a simplified version of the movement and degrees of each note in the relevant first five semiquaver positions. The notes on the third semiquaver are in relation to the bar's local dominant. The arrows to separate chords show the hierarchical flow. Cm=>G7 means that the Cm asks for the G7. In algorithmic terms, this is actually the opposite; the G7 needs to "see" the Cm chord to know what dominant chord it should be. This is simply to say that the G7's pitch is dependent on the Cm.

The red-coloured (darkest shade) notes show the entropic nature of the new observed pattern. For example, in bar two, the 3-5-3 structure is now redundant and the 1-3-1 is entropic and unrelated as a development to bar one's 5-7-5. This is therefore red (see C.3). Further to this, in bar three both become redundant and the b3 is a development, therefore shown in yellow (lightest shade). In essence, we establish heuristics to cope with the initial patterns that are found. Progress through the piece sees adaptation of the heuristics or generation of new heuristics to cope with the new entropic material that is encountered and the material that cannot be explained by the heuristics as they are (at this point of this exemplary analysis).

Bar two contains an entropic bass note with regards to the chord's root; however, this is clearly a development of the pedal from bar one because the chord has changed. The notes appearing in semiquaver five are a chord note below the previous note. This is redundant since this has already been seen in bar one. By bar two, the pitch direction arrows in the analysis become completely redundant in nature, thus proving the applied methodology.

Bar three is the first diminished chord out of two in the considered section. This chord changes the fundamental nature of how we express interval positions. Initially, these diminished bars appear to function as dominants, calling a relative minor to the root note of the diminished chord in semiquaver three, instead of the major. This is not redundant, it is a new development of the original compositional concept, hence it is coloured yellow (lightest shade) in the diagram. Treating these diminished chords as dominants with their local dominant appearing on the third semiquaver is in keeping with the principle of secondary dominants.

Figure 21:
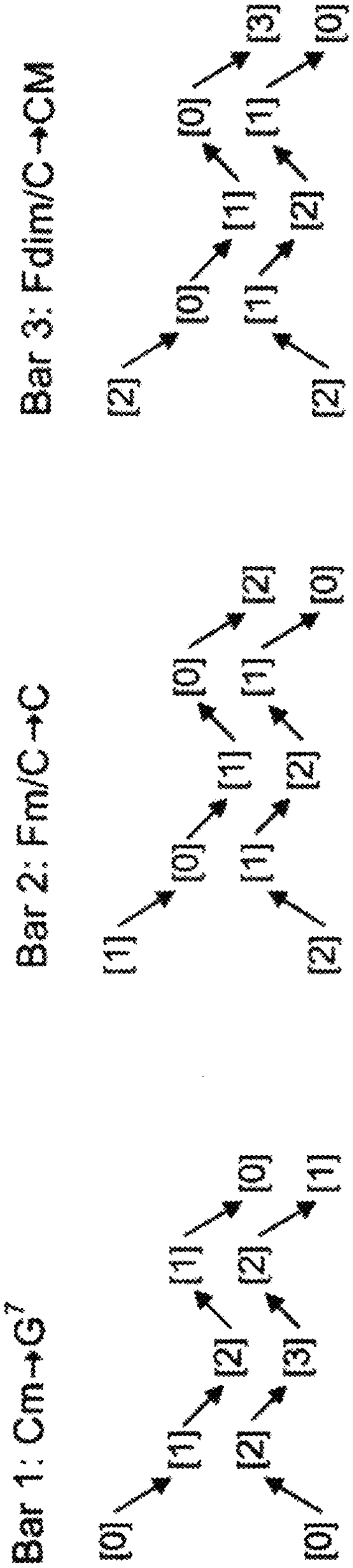
FIG. 21 is an exemplary diagram according to an implementation of the invention that expresses musical notes within Bars 1 to 3 of the Bach prelude as a numerical array.

However, classifying the fifth degree of the scale as a flattened fifth, as well as calling the sixth degree a sixth does not make any sense whilst talking about an even-interval chord, such as a diminished chord. It would be possible to make any bar featuring a diminished chord an exception, with its own local rules, but this would lead to creating ad hoc rules. This is undesirable as the new rule will simply act as a sticking plaster over the troubling statistical data at hand. However, by simplifying the interpretation of note positions within chords to simply be positions within a given array of notes, the chords can be re-expressed as arrays. Therefore, the root, third and fifth of a C minor chord simply become [0],[1] and [2] of an array. The actual values contained in the array's positions are populated by a minor chord function which returns the pitches as in integer notation: {0,3,7}. We can therefore consider liths and 7ths as the same thing: occupants of position [3] of the chord array. (This also allows use of different harmonic systems for generation based on the algorithmic processes which develop from this analysis, such as quartal harmony.) Consequently, Bars 1, 2 and 3 become expressed as array positions as shown in FIG. 21.

Figure 22:
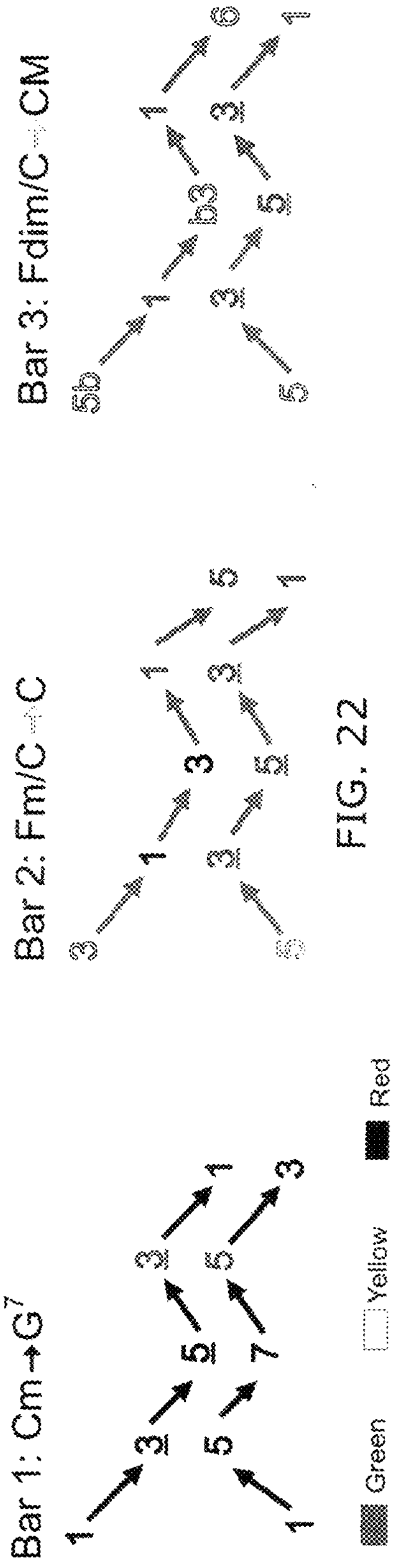
FIG. 22 is an alternative exemplary diagram according to an implementation of the invention that expresses musical notes within Bars 1 to 3 of the Bach prelude as a numerical array.

Whilst this simplification to the rule set means that we can deal with challenging extensions with ease by simply putting them into a given array position, it makes the musical interpretation of the analysis a little too abstract and difficult. Therefore, it is better to express the analysis in terms of note positions within the chord, such as 3rd, 5th, etc. (bearing in mind the computational array structure that this will eventually fit into). See FIG. 22.

This adaptation still does not help us cope with the harmonic independence the bass obtains through its leading note mechanism, but examination of more diminished chords establishes a pattern. As is seen in this analysis, the bass follows its own array rather than that of the main chord. This is generally prevalent throughout many styles of composition and is represented in lead sheets by using a forward-slash to denote that the chord is over a bass which may seem independent of the notes that appear within the chord. Consequently, this is not an ad hoc rule, but simply a fact of how music is notated, if not conceived. It is feasible to imagine any note working in the bass of a diminished chord. The initial assumption, then, is that diminished chords take the bass note of the following bar as their bass, thus creating or continuing a pedal.

The interpretation of bar three being an Fdim is simply that this makes the chord fit into the pattern of having the 3rd and 5th or 5th and 7th of the dominant in the 3rd semiquaver position, albeit a minor version of the dominant. Simply through interpreting the chord as an Fdim, there is no need for an ad hoc rule to cope with the 2nd, 3rd and 4th semiquaver notes. If the chord scheme is played without a pedal bass but a root bass, conventional reading would make this note a B or G in this bar. However, the chosen reinterpretation of Fdim would make the bass an F. This sounds perfectly acceptable. This is a simple example of computational analysis pointing towards a reinterpretation of the score for no other reason than to simplify the model without cost to the intricacies within the data.

Figures 23, 24:
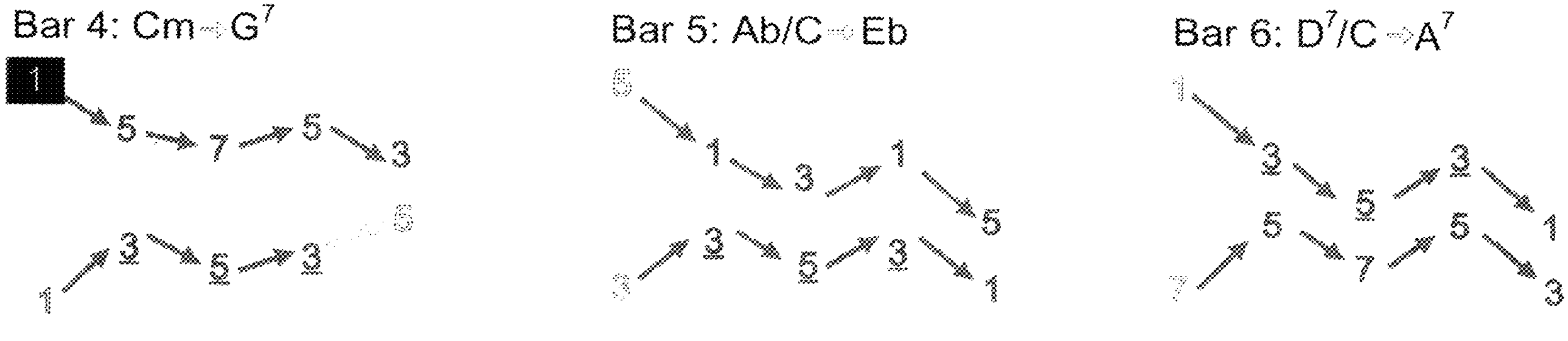
FIG. 23 is another exemplary diagram according to an implementation of the invention that expresses musical notes within Bars 4 to 6 of the Bach prelude as a numerical array.
FIG. 24 is a table illustrating changes in the pattern in the bass at semiquaver 5, including direction of the pattern, the chord component on which the 5th semiquaver in the bass lands, and the 5th's position in either the Treble T or bass B.

With reference to FIG. 23, Bar four starts with a repeat of the melody note in bar one. The repeat of this pitch is the first time that a repeat of a melody note is seen in the composition. We shall consider this new, and consequently entropic, concept as more evidence for how the melody flows becomes apparent throughout the analysis.

Bar 4 gives us our first alteration to the figuration pattern seen in the first three bars. In practical terms, this is simply because the chosen interval jump from the 1st to 2nd semiquaver in the bass means that if the downward pattern continued then the bass note at semiquaver 1 would be repeated in semiquaver position 5. The requirement for this note to rise is therefore a development of the material at hand and coloured yellow. This happens in 10 out of the 24 bars analysed. The table in FIG. 24 shows the fifth semiquaver in the bass and the chord component on which it lands. There appears to be no correlation between the chords' local dominant 5th (in semiquavers position 3) being in the bass or treble and the upward or downward movement of the 5th bass semiquaver.

The pattern goes up in the bars listed below for the following reasons:

4: To avoid repeating the 1st semiquaver.

10: To make sure the 7th in the bass is not confused as having a voice leading relationship with the 1st semiquaver leading to a new cue (Deliege, 2001) being identified by the ear through the scale step oscillation of these two notes.

11: There is no reason except for the fact that the preceding and following bars change the movement pattern. This is a choice from Bach and entropic with regards to heuristic considerations.

12: To avoid repeating the 1st semiquaver.

14: To avoid repeating the 1st semiquaver, (this is a hint at a new method of producing notes at this position which will be considered later).

17: Similar to bar 10, there would be only a scale step between the 1st and 5th semiquavers and this could lead to a bass melody being interpreted by the listener.

19: To avoid repeating the 1st semiquaver.

21: Generated by the bar 14 method, which produces such notes at this position.

23: Generated by the bar 14 method.

24: Generated by the bar 14 method.

A simple heuristic can thus be derived that produces the note at semiquaver 5 without a pattern change and then checks to see whether it is within a tone of the bass note at semiquaver 1. If it is, then the pattern change triggers. The only exception to this is the aesthetic choice that Bach makes at bar 11.

Bar six raises the question of whether the dominant 7th D chord is simply a dominant to preserve the bass pedal. Ledbetter (2002) describes the first inversion major chord to third inversion dominant 7th (figured: 6-3 to 6-4-2) in this piece as a standard way of harmonising a descending scale. The reason why this question is important here is to ascertain whether the chord is created due to the bass movement, or whether the pedal is created due to the choice of chords. We currently choose to read this as the chords creating the bass, because this simplifies the heuristics. The bass note now falls within the chosen or generated chord, rather than the chord being generated ad hoc from the descending bass scale.

Figure 25:
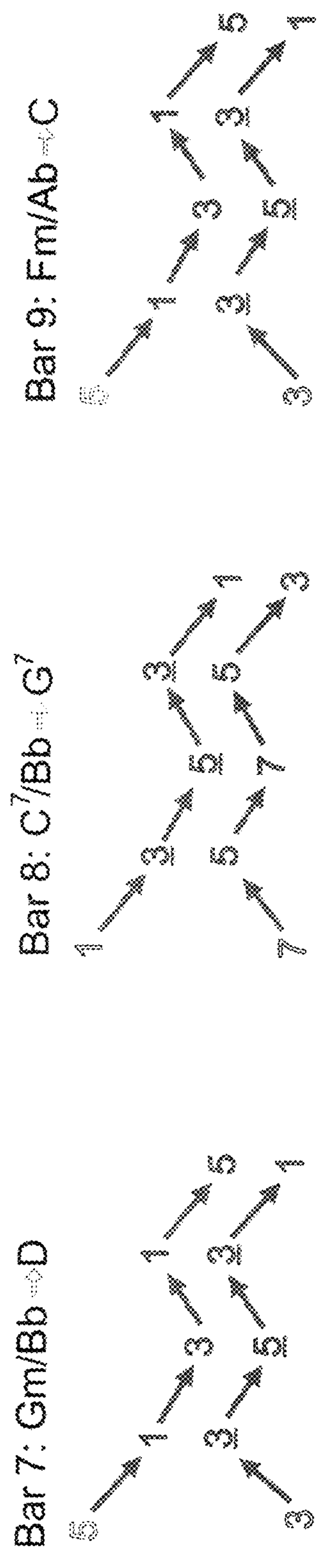
FIG. 25 is another exemplary diagram according to an implementation of the invention that expresses musical notes within Bars 7 to 9 of the Bach prelude as a numerical array.
Figure 26:
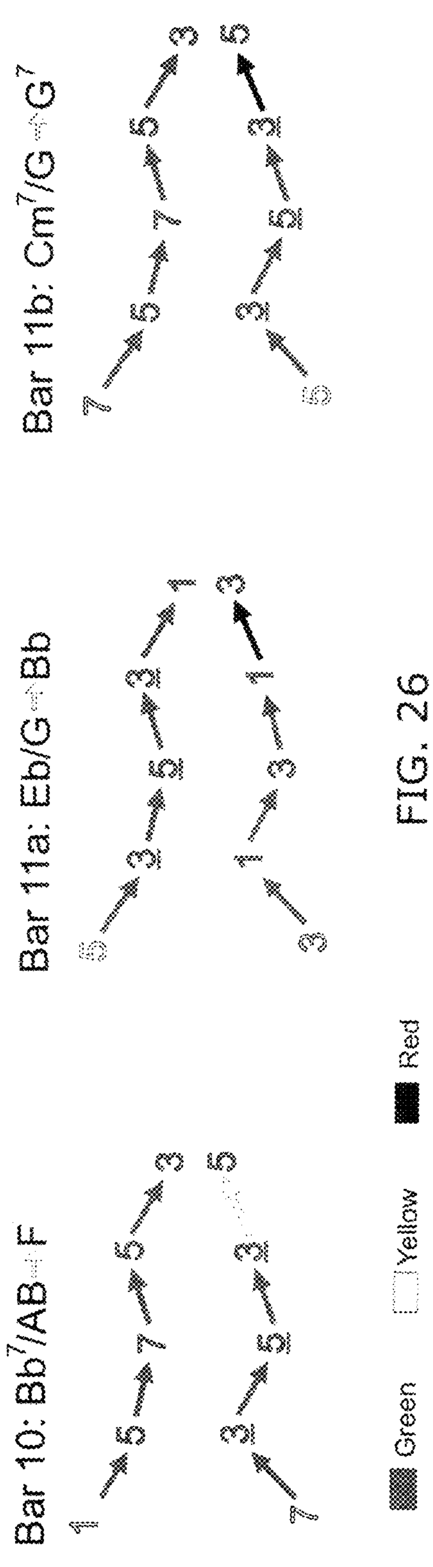
FIG. 26 is another exemplary diagram according to an implementation of the invention that expresses musical notes within Bars 10 to 11 of the Bach prelude as a numerical array.

With reference to FIG. 25, Bars 7, 8 and 9 offer no new information apart from the melody in semiquaver 1, so much so that it is interesting to note that bars 8 and 9 are complete (yet transposed) copies of bars 6 and 7. This is an important aesthetic observation because the heuristics we define will be capable of creating multiple different versions and voicings in such circumstances. It is important to note how Bach uses complete redundancy, repeating his voicing and textural decisions to give form to the listener's temporal predictions.

There are two possible readings of bar 11: that of an Eb chord or a Cm7 chord. Minor 7th chords are indeed prevalent throughout Bach's work, (such as in the 3rd beat of the 22nd Prelude in this suite in Bb minor). By using the Cm7 version, we do not need to encounter a 1-3-1 relationship in the bass in the first section's heuristics, but just the predictable 3-5-3 and 5-7-5 relationships. However, minor 7th chords do not feature in this piece's discourse because they simply do not appear as the main chord in any other bar. If the deciphered heuristics which are generated from this analysis are fed versions of this piece's chord scheme with both a Cm7 and Eb chord in this bar, then the voicings and arrangements played by the Eb chord sound far more natural and appropriate. We therefore choose to read this bar as version 11b for algorithmic reasons but appreciate that it is actually version 11a. In truth, this simplifies the preferred construction of the heuristics whilst enabling the feed of the Eb chord into the chord scheme. The only consequence is that this specific bar's voicing will not be possible. This could be developed in any later versions of the heuristics as more patterns are discovered and better generalisations are made, but is irrelevant to the extent that this analysis proves the underlying approach to analysis and generative composition based on the methodology described herein.

As previously mentioned, there is no functional requirement for the bass in semiquaver position 5 to rise in bar 11. This decision by Bach remains an entropic problem during the certain stages.

With reference to FIG. 27, Bar 12 splits the mind's interpretation between a Cmb6 chord and an Abmaj7/C chord. If we consider this to be an Abmaj7/C pattern, then the 3-5-3 relationship breaks down for the first time to give 7-5-7 in the treble and 5-3-5 in the bass. If we call this chord Cmb6, then the initial b6 in the right hand can be accommodated by treating it as a 4th element in an array, just like a 7th. However, the b6 in the bass in semiquaver 5 makes the jump through the available 5th (as we go from the 3rd in semiquaver 4 to b6 in semiquaver 5), which is problematic considering we do not see this behaviour in the rest of the piece. In other versions of the pattern break that make the bass in this position rise instead of fall in order to avoid creating a salient cue in the bass, we see the arpeggio at semiquaver 5 feature the next note from the bar's chord that is above semiquaver 4. Here it climbs from the [2] array position through to the [4]. This ambiguity is clearly desired by Bach as we sense the repeated b6 jumping out as if it were a cue. This creates an effect that sounds like the piece's rhythm has double-timed in this specific bar.

This need for a new audible cue could be handled as a specific case which arises at the point of a modulation: at this point, the movement towards Eb in bar 14. This seems acceptable in regards to the important position of this pivot chord, but does mean that the algorithm will have to be sensitive to points of modulation. This bar also resets the bass pedal back to the tonic through the jump of a perfect fourth. This is entropic considering the bass's falling movement in the piece so far.

Bar 14 introduces a completely new idea in the bass by moving stepwise up to the fourth degree of the bar's chord. This is completely out of character with the piece so far, which uses intervals from the given chord in this position, and hints at the algorithm which develops in later sections of the piece.

If this chord had a Bb instead of the Ab on semiquaver 5, there would be no entropy here.

As an aside, it is worth noting that the score version from which we take modern interpretations of this piece is known as The Wagner-Volkmann Autograph. This copy was made in 1732, ten years after the pieces were composed in 1722. The original manuscript is believed to be lost, leaving this as the only known copy of the first manuscript in Bach's own handwriting (Palmer, 1994). However, Bach's son Wilhelm Friedemann made a copy of the earliest forms of the first 11 preludes with various small corrections made by Bach's hand, a version known as The Clavier-Buchlein version. Owned by Yale University, this version clearly shows that Bach initially had the Bb instead of the Ab at this 5th semiquaver position. This can be seen in FIG. 28.

The above suggests that Bach changed the note at this point in the piece on a later revision to reflect the processes that he employs later on in the piece. (These processes simply use the sub-dominant in position 5 in a similar way that the dominant is used in position 3.)

Heuristically, this means we can separate this specific Ab occurrence from the first section under analysis, and consider it using the heuristics that we obtain from phrase 3 in which this figuration becomes more prevalent.

Figure 29:
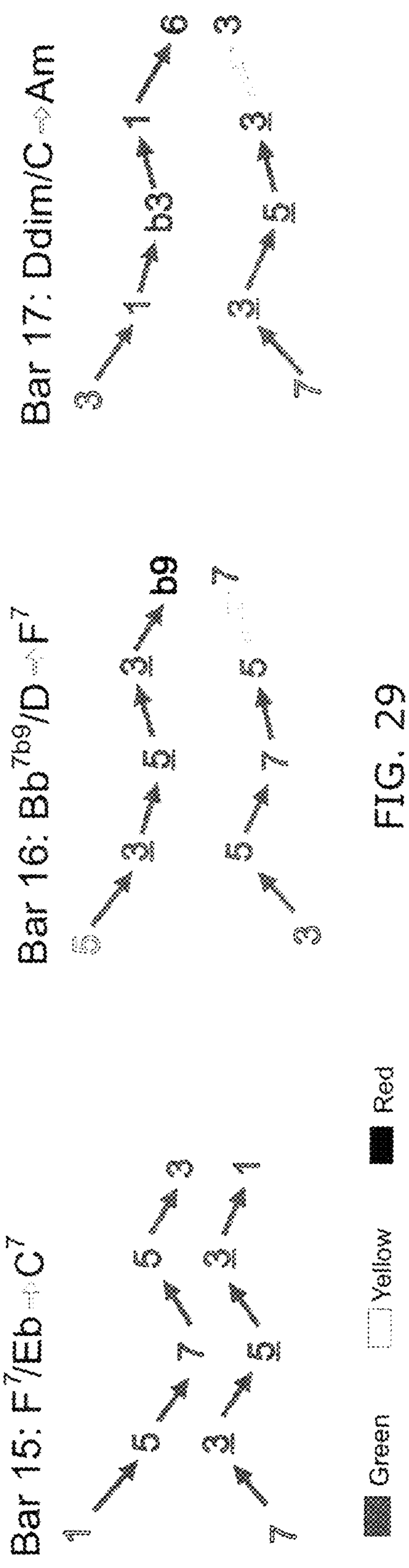
FIG. 29 is an exemplary diagram according to an implementation of the invention that expresses musical notes within Bars 15 to 17 of the Bach prelude as a numerical array.

With reference to FIG. 29, Bar 16 introduces an interesting dilemma for the 3-5-3 relationship. If this bar is interpreted as a Ddim chord, then the C and Eb in position 3 bear no relevance to the dominant A of D.

Despite the Bb not actually appearing in the bar at all, the C and Eb leave only two possibilities if the 3-5-3 relationship is to be maintained: the dominant must be either F7 or Ab. Ab makes no musical sense because it would imply the bar is the chord of db. F7 sustains the pattern of the 3-5-3 whilst making musical sense as the dominant to Bb7b9. The Bb chord functions perfectly within the chord scheme by linking to the F7 in the previous bar. (Audibly, this bar and the next remain highly chromatic.) Although we could use the lack of a 1st degree in bar 16 to suggest that the first array position could hold the b9, it is more consistent to expand the array to incorporate a 5th position which contains the b9.

Bar 17 contains the second diminished chord that we have experienced within the piece so far, (accepting bar 17's reading). The 3 5 3 relationship points to yet another secondary dominant (minor dominant) at semiquaver 3, as experienced in the first diminished chord of bar 3. This conventionally would signify a dominant function for the diminished chord. The only relationship we can see this bass note has in the pieces is that of the bass note in the next bar. This does however lead to a simple heuristic with regards to diminished chords: that they contain the bass note of the following bar's chord.

Figure 30:
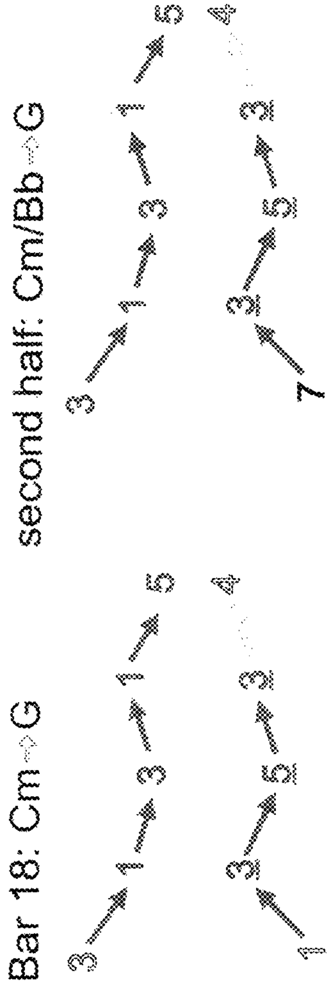
FIG. 30 is an exemplary diagram according to an implementation of the invention that expresses musical notes within Bar 18 of the Bach prelude as a numerical array.

With reference to FIG. 30, Bar 18 contains movement in the bass which is noted in the Autograph, Kirnberger, Gerber and Walther manuscripts (Palmer, 1994). Only the Kroll edition leaves this Bb note as a C (Ledbetter, 2002). Originally believed to be a copying error, this has later been poorly justified in the name of consistency. This is clearly a cue that is being established by Bach to end the section and emphasize the move to F minor in bar 19. This chord ends the section in question.

This linking movement in the bass will be ignored with regards to the current heuristics, which we will develop for bars 1-18, due to a lack of examples for how this cue is utilised. Any heuristic to create the Bb at semiquaver 9 would be an ad hoc rule without further supporting evidence. The 4th degree of the scale in the bass at semiquaver 5 is further evidence of the shift towards the algorithmic processes of the following sections, just as in bar 14. Further evidence to confuse any interpretation is that this F at semiquaver 5 is written as a repeated C in the Clavier-Buchlein version, thus emphasising the cue which is occurring in the bass movement.

D.6.3 Heuristics for Section 1: Bars 1 to 18

The following commentary numbers the notes in the bass and treble by array positions [0] to [15] to signify the 16 semiquaver positions within the bar.

D.6.3.1 H1.0: Calculate Bass at [0]

The pedal note: the entropic nature of the notes in the bass in each bar's first position means we need a generative heuristic to create these possibilities. By looking at the availability of the current pedal note within the bar's chord and the pitch value that the note takes, it is possible to calculate this bass by checking if the bass note of the previous bar falls within the current bar's chord. If the note does not, the next closest available note is selected from the chord which is below or above the previous bar's bass note. (This direction in pitch, be it up or down, is arbitrary and means we can initialise it from connotation requests through briefing elements processed by an overseeing form generator.) There is an exception for diminished chords which are used to end sections: they simply use the note in the bass of the bar to which they are cadencing. This means that there needs to be two passes whilst creating the piece. The first pass is to establish the bass notes as described without the diminished clause. The second pass is to then change the diminished chords' bass notes to look at that of the following bar, rather than that of the one preceding them. Without this double pass, the heuristic would have a null pointer when it reached a diminished chord.

This pattern continues until the bass is over half an octave from its origin. In this piece's case, the tonic C is the origin, meaning that the F # which is 6 semitones below this C is the reset position. When a bass note is generated that falls below this, the pattern is reset and the nearest note within the current chord to the initial starting bass note on the tonic is used. This can be seen when at bar 12 the note jumps from bar 11's bass of G to the original tonic of C. In the piece at hand, the pedal switches; rather than always falling, it chooses the closest note that is either higher or lower. From bar 6 to 7 it falls from C to Bb, whereas from bar 12 to 13 it rises from C to D.

D.6.3.2 H1.1: Calculate Bass at [1]

There are 13 cases out of 18 where this note is the 3rd of the chord; if not then it is the 5th of the chord. For variety's sake during the initial investigation of how heuristics sound, (before we introduce overriding aesthetic heuristics which manage choices), we can simply make this a 50/50 scenario. This makes the heuristic simple: make bass [1] randomly the 3rd or 5th above the bass in [0].

D.6.3.3 H1.2: Calculate Bass at [2]

If the bass hand note at [1] is the 5th, then make this the 7th of the dominant 7th. If this is not the case, then bass [1] must be the 3rd: we therefore make [2] the 5th of the dominant.

Either way, we transpose [2] below the bass at [1].

D.6.3.4 H1.3: Calculate Bass at [4]

As shown in the explanation for FIG. 24, this note attempts to be the chord position below the value in [3] (which is a copy of [1]) unless it comes within a tone of the value at position [0] and risks making a cue in the bass. In this event it rises to the next available chord position.

D.6.3.5 H1.4: Calculate Treble at [1]

If the bass at [1] is the 5th, then treble [1] equals the 3rd chord not in a voicing that puts it above the bass's 5th at position [1].

Else there is a 50/50 chance that this is the root, or 1st, above the bass.

Else this is the 5th.

If it is the fifth, then we check to see if it is possible to transpose this value up an octave from its current pitch as seen in bars 4, 10, 11 and 12. If the previous bar's treble at [1] is a tone or less away from the new value at the current bar's treble [1], then we perform the transposition up an octave from its current pitch. (This is a simple and initial voice-leading ad hoc rule which will need a more universal and thorough refactoring when aesthetic heuristics are introduced later.)

D.6.3.6 H1.5: Calculate Treble at [2]

If the treble at [1] is the 1st and the chord is diminished, then make this the minor 3rd of the local dominant.

Else if the treble at [1] is the 1st and the chord is not diminished, then make this the 3rd of the local dominant.

Else if the treble at [1] is the 3rd, then make this the 5th of the local dominant.

Else if the treble at [1] is the 5th, then make this the 7th of the local dominant 7th.

D.6.3.7 H1.6: Calculate Treble at [4]

We make this the next extension in the chord below the value in treble [1]. If this value is equal to or below bass [4], then get the next extension above bass [4]. This is to avoid crossing counterpoint lines, with which the ear copes poorly. This is something that Bach is sensitive to as pointed out by Ball (2011, p. 148) with an example from the E major Prelude in Book 2 of the Well Tempered Clavier. This shows how Bach avoids the sonic equivalent of a Gestalt-style continuation, by making sure the voices do not cross paths.

D.6.3.8 H1.7: Calculate Treble at [0]

The melody note is never more than an octave above the lowest note in the bar's treble, nor is it equal to or below the last note in the previous bar (which is the same as treble [1] in the previous bar). Consequently, we choose a random note from the available notes in the bar's chord which meets both requirements.

D.6.3.9 H1.8: Copy the Bass and Treble to Fill Positions

The values at positions [3], [5] and [7] equal the values in [1].

The values at positions [6] equal the values in [2].

The second half of the bar is a copy of the first.

D.6.3.10 Unexplained Entropic Considerations

Figure 31:
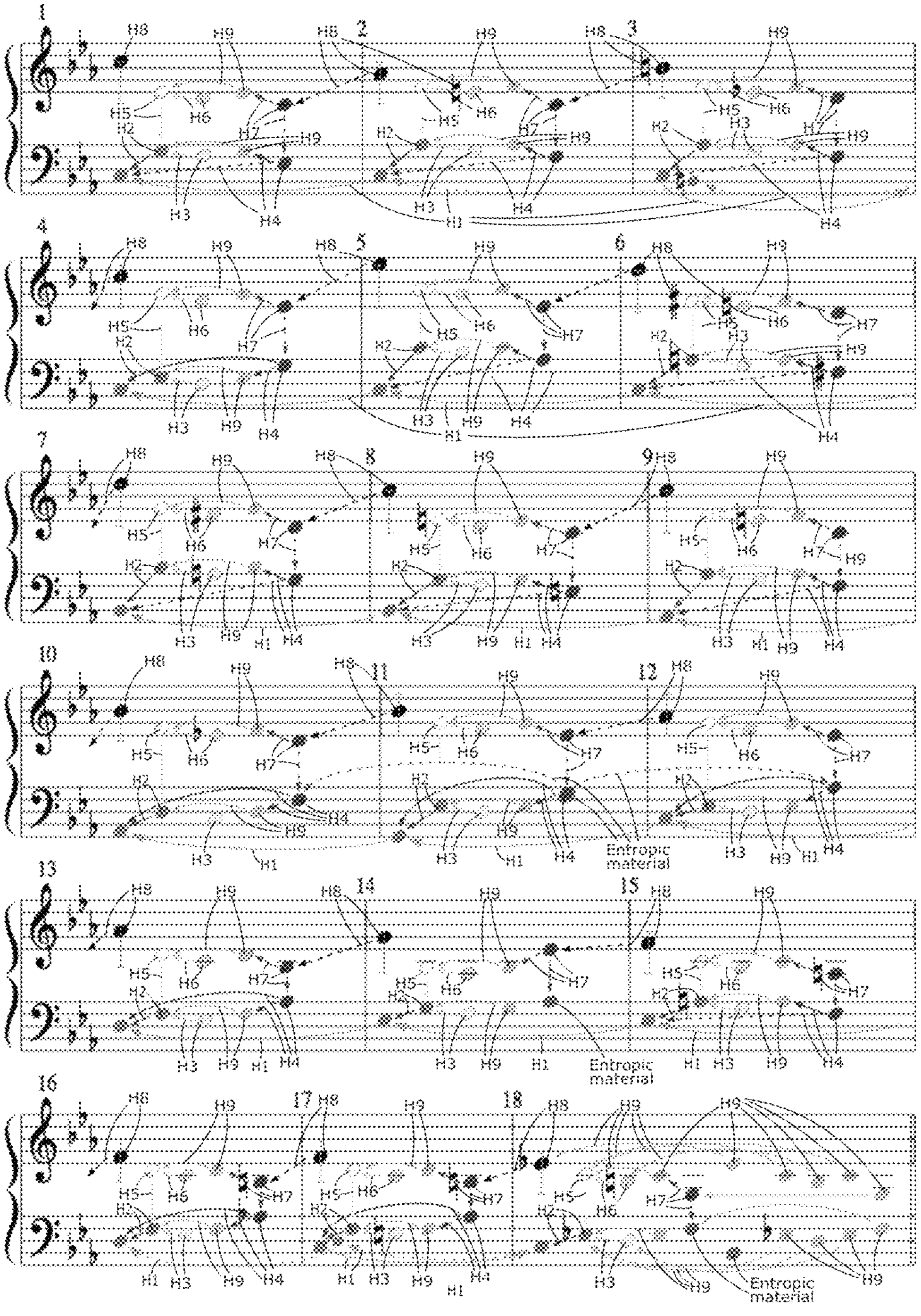
FIG. 31 is a musical score representation of the Bach prelude according to an implementation of the invention that uses color-coded heuristics showing hierarchical flow and highlighted points of entropy.

The score in FIG. 31 shows the different heuristics in action through the use of colour coding. In grayscale, however, to identify each heuristic, the notation H #(H1, H2, H3, H4, H5, H6, H7, H8 or H9) appears above or below each note. Solid arrows are pointers to other notes which provide information for the final pitch of the note in question. Dashed arrows show pointers to notes whose values are assessed but not used due to heuristic considerations.

This final overview gives a clear impression of the hierarchy of the section in hand. Nearly all notes flow return to the initial bass note in bar 1. The melody at each treble position [0] builds on the previous bar, trying to distinguish themselves from the value at treble position [15], with their options restricted to the range of notes an octave above the lowest note in their current bar. We can see the bass note the diminished chords created on the first pass before overwriting it on the second: the first pass's arrows are dashed and the second are solid. This visualisation shows exactly how the entropic red (darker shading) content cannot be linked to the currently understood hierarchy. This is where the heuristics currently break down.

The two main points where this is a serious issue are in bar 14, where the heuristics would choose a Bb over the published Ab at position [4] in the bass, and bar 18 where the special case bass pattern occurs—the only point in the piece where the first and second halves of the bar contain different material. All three of these notes are notably the only three which are different in the Clavier-Buchlein version compared to the autograph copy from which we have our modern editions. As well as these two salient points in the score, on a lesser scale the current heuristics do not account for the voicing of 5-3-5 in bar 12 if we use the Ab/C version of the chord, the only point of possible breakdown of the 3-5-3 pattern.

Similarly, we are incapable of producing the double position jump at bass position [5] if we express this bar as Cmb6. Apart from these cases, the entropic components mainly highlight a lack of aesthetic judgement in the decision-making processes of the heuristics. The rising bass at semiquaver 5 in bar 11 cannot be created without an overriding aesthetic heuristic which looks at decisions made in the surrounding bars. In both of these more trivial cases, if we randomise the firing of heuristics which are capable of producing these values, then both become possible. However, it does not seem sensible to do so simply because of the 1 in 25 times these examples occur.

Voice leading in the melody may similarly require aesthetic heuristics. A lack of repeatability in decisions from one bar to the next makes the output unnecessarily over-entropic for human listening. This is a further example of a lack of purely aesthetic decision-making heuristics. Such heuristics would simply repeat decisions in a more predictable pattern, such as in groups of two bars, but this would restrict the current system's output possibilities.

D.7 Section 2: Bars 19-20

The following two sections are based on developing the core texture of the tonic minor figuration.

In Section 2, Bach achieves this by inverting the initial semiquaver in the treble to appear below the treble and bass figurations in the other positions but [0], sitting with the bass note as a distinctive chord and salient cue. The choices Bach has made by using an Fm7 to F # diminished are recognisable as a common preparation for a cadential 6 4. However, we need to express how to choose such selections algorithmically and in a way which gives enough scope for a variety of generative results. The question, therefore, is what note pairings can sit below such a texture and add to it in an interesting way? Can the notes be random and still give a sense of harmonic movement towards, or around, the tonic of bar 21? Simple keyboard experiments show that this is not the case. The use of random intervals makes no harmonic sense (unless it is a conventional harmonic fluke). However, the use of any chord which has C and Eb in the top of the texture does, such as an Ab chord followed by an F7 chord.

Taking the C and Eb as the top extensions, it is possible to build a variety of chords below C minor which can incorporate these two notes at the top of the chord for the texture in Sections 2 and 3. The score of FIG. 32 shows the possible combinations of major and minor thirds which produce chords in descending order of pitch.

Figure 32:
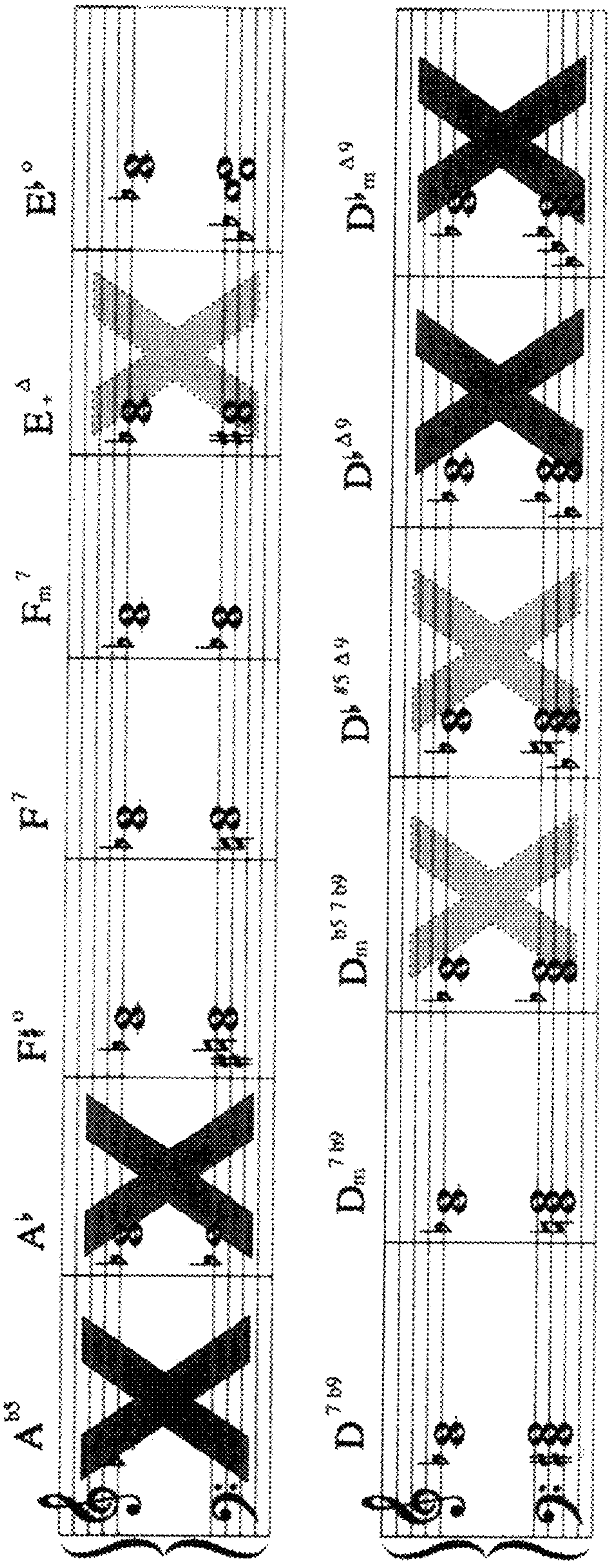
FIG. 32 is a musical score representation according to an implementation of the invention of all possible combinations (spanning an octave) of major and minor triads with C and Eb as the top extensions.

Notably, the score in FIG. 32 shows all possible combinations (spanning an octave) of major and minor triads with C and Eb as the top extensions. Rules exclude certain bars: red X chords are unavailable through D5.6 pseudo code, purple X chords are excluded due to texture limitations.

A good question to ask at this point is why the chords are triadic in form? Why not incorporate 4ths or 5ths to create chords such as the second inversion C minor chord we are moving towards at bar 21? Many of these combinations produce either the chords we have already given, or chords which make no conventional sense. Adding 4ths below many of the chords above simply produces a different inversion of the given chord. Likewise, incorporating 5ths, in other words removing certain notes to make holes in the chord voicing, either misses out a major and minor third to produce a more harmonically bare voicing, or produces dissonance due to a clash between a perfect fifth and any chord made of two major, or two minor thirds. An example of this would be adding a B a perfect fifth below an F # diminished chord. In essence, the diatonic scale, which the "7 from 12" system of western harmony has currently evolved into precludes use of the more obtuse chords which can be made from random choices of major and minor thirds. This is before we even consider introducing 4ths and 5ths, which exponentially increases the chord's abstractness, or simply ratify the chord we have already hit upon with the incorporated thirds through luck. It would seem that any of the chords in the score of FIG. 32 which fit within the diatonic scale make sense. Although the E augmented chord (E #5 maj7) could be considered an altered chord based on the Locrian natural minor mode (Levine, 1995, p. 70), the top Eb (or major 7th) does not appear in the mode, so consequently this chord does not sound like a viable option. Neither do the more obscure db augmented chords, as we are too close to obscuring the sound of a C minor components with the db chord below it.

Figure 33:
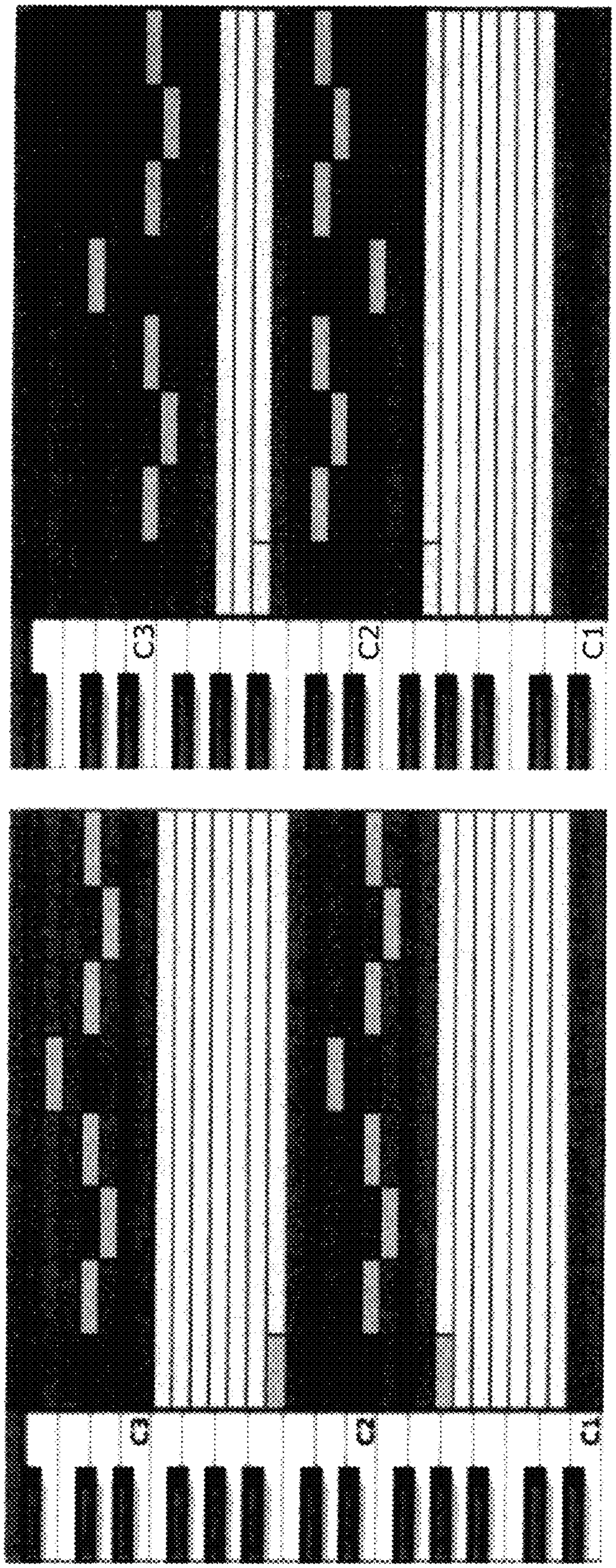
FIG. 33 is an image of a keyboard representation showing possible notes within textures of Bars 19 and 20 of the Bach prelude according to an implementation of the invention.

Balzano (1980) has previously shown that the diatonic system offers a unique number of every type of interval within the scale. The interval relationships cannot be mapped through direct transposition; however, the brain seems to realise this, and this is the trick that Bach seems to be using in Section 2. This method of finding chords through extensions is then inverted for Section 3, whereby the initial chord seems to embellish upwards from the pedal G. The pseudo code within the phrase analysis (Section D.5.6) offers a viable way of selecting appropriate chords from the array of possibilities. Given this approach, we can eliminate certain chords as highlighted in red in the score of FIG. 32. If we consider the available space for this new cognitive cue to exist in, then we are offered limited possibilities for these cues' placement, as shown through the two alternative voicings of the C and Eb texture in the keyboard representation of FIG. 33, which shows possible notes within the textures of bars 19 and 20.

In all cases, the cue notes must appear at least a minor third away from any other notes within the main texture or a melodic cue is established. If the semiquavers at position [4] travel outwards from the main texture (treble rising and bass falling), then we are given maximum availability for the treble notes at positions [0] and [8]. However, the notes in the bass cannot repeat the pitch of treble position [0], nor fall more than an octave below the pitch of the highest note in the bass throughout the rest of the figuration (the final requirement being a stylistic observation of the range of voicings throughout the given piece). This gives a trade-off in the bass: if the pitch rises at position [4], then there is more room for the bass but less for the treble.

This dilemma reveals one of the first cases of iterative recomposition that the system must employ. If a desired chord scheme is required, then the chord texture may have to be rewritten to incorporate it. If rewriting the chord texture cannot accommodate the desired chord scheme, then the chord scheme must be rewritten. This iterative process of negotiation offers a potentially descriptive insight into the compositional process. For the given example's textures, the chords in the score of FIG. 32 that are not available are crossed out in purple.

This leaves six possible chords which can all be used in a random order (excluding the F #dim which can only be 2 extensions maximum below C and Eb). These chords cannot be repeated, so this section can potentially be embellished for six bars with the current available textures.

D.7.1 Initial Observations of Section 2

1. In this section, as in the following section, the main texture of semiquavers [1] and [3] are based on the first two notes of the tonic triad: C and Eb. In this section, there is a 50% chance that the C will appear in the bass and the Eb will appear in the treble, and vice versa.

2. Semiquaver positions [4] no longer involve a neighbouring extension from the bar's chord, but an alternative voicing of the chord used at position [0] or [2]. If position [4] is copying the chord at position [2], this chord is inevitably the dominant of the featured chord in the figuration: C minor global tonic. If position [4] is not copying position [2], then the 5th and 7th are used instead of the 3rd and 5th which appear at [2]. If the chord at position [4] is the one at position [0] then we select alternative notes from the first instance of the chord and randomise the direction of the arpeggio movement. Having alternative notes can only happen for the two positions if there are four notes in the given chord, such as the diminished in this case, or else a note from a normal triad would have to be repeated by necessity. Although statistical information to support these assertions is limited, this interpretation gives a large generative potential.

3. This type of figuration is new, reversing the movement direction of neighbouring notes at position [4] from the ones we have in the heuristics for Section 1. Rather than falling at position [2] as in the first set of algorithms for bars 1 to 18, the option exists to rise at position [2] and then fall at position [4]. This offers a vast plethora of generative possibilities compared to the first section's somewhat rigid pattern. This means that the system and its methodology is creating algorithmic components which are generating original textures without any evidence of the textures ever having existed.

4. There is nothing stating that this section, based on these developed rules, could not be extended further to increase the length of this build up. If the chord chosen for position [0] never repeats, the figuration should never become a different cue from the overall build up in tension that this section is creating, and therefore it should be extendable. The full range of available chords are not equally effective, depending on whether they extend below the C and Eb by one, two or three extensions.

D.7.2 Heuristics for Section 2: Bars 19 to 20

D.7.2.1 H2.0: Calculate Bass at [1]

This is initially 50% randomly the tonic below C3 or the 3rd of the tonic chord below C3. (This ignores any voice leading from the previous phrase in preference of an appropriate range for the current voicings.)

D.7.2.2 H2.1: Calculate Bass at [2]

This heuristic extends H1.2:

If the bass at [1] is the 5th, then make this the 7th of the dominant 7th (of the featured chord in the main figuration), below bass at [1].

If the bass at [1] is the 3rd, then make this the 5th of the dominant 7th below bass at [1]. Adding to this:

If the bass at [1] is the 1st, then make this the 3rd of the dominant 7th below bass at [1].

D.7.2.3 H2.2: Preparation for H2.3

This heuristic places a value in the bass at position [0] which is either 1 or 2 (50%/50%) chord-component positions below the bass at position [1]. This value will now randomise a given probability tree branch for H2.3.

D.7.2.4 H2.3: Calculate Bass at [4]

50% of the time this follows H1.3 (which requires the note generated by H2.2).

The other 50% we make [4] the next chord-component position of the dominant 7th above the dominant 7th's related note at [2].

D.7.2.5 H2.4: Calculate Treble at [1]

If the bass at [1] is the root of the prevailing chord, then make treble at [1] 3rd plus an octave.

Else make treble at [1] the root, but in the octave that gives a pitch above the bass at [1].

D.7.2.6 H2.5: Calculate Treble at [2]

Copy of H1.5.

D.7.2.7 H2.6: Calculate Treble at [4]

50% of the time we make this the next extension in the chord above the value in treble position [1].

The other 50% we make [4] the next chord-component position of the dominant 7th above the dominant 7th's related note at [2].

D.7.2.8 H2.7: Check Availability of Pitches for Notes from the Extension Chord.

This heuristic checks the pitch range available for the notes in position [0] in both the treble and bass, where we intend to place chord notes from chords featured in the score of FIG. 32. This process is highlighted in the keyboard representation of FIG. 33. Obtain an integer range from a minor third below the treble's lowest note and a minor third above the bass's highest note.

Check that the desired second chord's 1st or 3rd appear in this range (the chord elements are referred to here as "1" and "2" respectively).

Obtain an integer range from a minor third below the bass's lowest note and an octave below the bass's highest note.

If one note out of "1" and "2" is available in the middle range, then check the other is available in this range.

If both "1" and "2" are available in the middle range then check that at least one of them is available in this range.

In the case of all notes being placeable, then distribute them appropriately in treble and bass positions [0]. (This will overwrite the temporary value in bass [0].)

Else return to H2.0 and start again whilst keeping an array of the created values for all H2.x heuristics so far. Only store the values if they change.

This means that when we have four different versions of the output, if H2.7 still has not been satisfied, we need to request an alteration to the chord scheme and then we reset the storage array and start again from H2.0.

(The distribution logic should reflect the following:

If one note out of "1" and "2" is available in the middle range then place it here and the other in the lower obtained range below the bass.

If one note out of "1" and "2" is available in the bottom range then place it here and the other in the middle obtained range in between bass and treble.

If both are available then randomly assign one to each range.)

D.7.2.9 H2.8: Copy the Bass and Treble to Fill Positions.

Copy of H1.8.

D.8 Section 3: Bars 21-24

Whereas Section 2 used C and Eb to extend chords downwards, this section uses the C and Eb texture as a basis for cadencing and extending extensions upwards. The phrase analysis in Section C.5.7 is capable of generating a chord scheme which provides the cadential, build up.

D.8.1 Initial Observations

1. This section contains a repeating texture in a similar way to the H2 set. There is a higher chance that the treble and bass at position [4] will use the dominant 7th of the bar's chord to obtain their pitches.

2. The use of the diminished chord over the G pedal in bar 22 at position [4] shows that the cadence chords generated by the phrase analysis rules do not just have be the dominant. They can in fact be any chord that is conventionally one cadence position away from the tonic. We can discover candidate chords by gathering evidence from this piece in general, as well as other works of the time. The featured cadence chords here are an F sharp diminished seventh and a dominant b9. The dominant 7th b9 features highly throughout the rest of the climax (which is excluded from this analysis) from bar 25 to the end.

D.8.2 Heuristics for Section 3: Bars 21 to 24

D.8.2.1 H3.0: Calculate Bass at [0]

This is the dominant above the initial bass tonic in bar 1, bass position [1] of the piece. (This ignores the possibility of modulation for the current study.)

D.8.2.2 H3.1: Calculate Bass at [1]

Extends H2.0. If this is the second bar of the section, simply copy the pitch calculated by this heuristic in the previous bar.

D.8.2.3 H3.2: Calculate Bass at [2]

Copy of H2.1

D.8.2.4 H3.3: Calculate Bass at [4]

Copy of H2.3

D.8.2.5 H3.4: Calculate Treble at [1]

Extends H2.4. If this is the second bar of the section, simply copy the pitch calculated by this heuristic in the previous bar.

D.8.2.6 H3.5: Calculate Treble at [2]

Copy of H1.5.

D.8.2.7 H3.6: Calculate Treble at [4]

Copy of H2.6

D.8.2.8 H3.7: Calculate Treble at [0]

This finds the pitch, in any octave, of the next available note from the bar's chord which is closest to the previous bar's pitch in this position. For the initial pitch of the first bar, take the pitch position which is the next above the highest note in the treble texture for the bar.

D.8.2.9 H3.8: Copy the Bass and Treble to fill positions.

Copy of H1.8.

D.9 Results

It is important to note that we are not advocating that Bach's choices were restricted to one note only. We are saying quite the opposite: that he was faced with multiple choices, but we generalise the majority of them with this algorithmic analysis of what he chose. The validated approach, reflected in the analysis, relies on this diversity of choices to give us the flexibility of generative composition based on the principles we have abstracted.

The previously unexplained Ab in bar 14 can easily be accounted for if we consider the latter heuristics for Sections 2 and 3. Randomly introducing these heuristics in place of earlier ones gives us the ability to explain these notes. A set of aesthetic heuristics which observe and copy random choices from neighbouring bars, as well as having the ability to interchange heuristics from other sections randomly, would produce the original score.

It is noticeable throughout latter sets of heuristics that previous ones are being reused and extended more and more frequently. This points towards an object-orientated approach for heuristic data representation. The extension of H1.2 for H2.1 shows that we should be able to override methods to add functionality, calling their super-type methods for any previous logic.

D.10 Conclusions

We have implemented a system of colouring entropic, redundant and developed material which shows us when to generate heuristics as well as giving us their functional purpose. Entropic (red/darker tone) markings in the analysis require generative heuristics which create fresh material; redundant (green/mid-tone) markings require copy heuristics to fill out the generative material and developed (yellow-lightest tone) material shows the need for function heuristics which alter the output of generative heuristics. We have three sets of heuristics which can account for all but two notes in the original piece as well as many alternatives.

We have shown that Bach's earliest version of the prelude in the Clavier-Buchlein manuscript agrees with the general heuristics derived here from the first section, removing the entropic thorns in the side of the opening section's analysis in bars 14 and 18. This shows that we have created a set of rules which are closely compatible with Bach's original compositional approach to this piece.

Unless specific arrangements are mutually exclusive with one another, the various embodiments described herein can be combined to enhance system functionality and/or to produce complementary functions or system that support the effective identification of user-perceivable similarities and dissimilarities. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions. In terms of the suggested process flows of the accompanying drawings, it may be that these can be varied in terms of the precise points of execution for steps within the process so long as the overall effect or re-ordering achieves the same objective end results or important intermediate results that allow advancement to the next logical step. The flow processes are therefore logical in nature rather than absolute. The functional architectures of the drawings may be implemented independently of one another, as will be understood, so that the resulting system is a distributed system potentially dispersed via a wide area network, such as the Internet. Architecturally, realization of aspects of the system, such as but not limited to texture classification as described herein (as a basis for final automated musical composition) can be implemented using technologies such as the Java Expert System Shell "JESS" and, more typically, a bespoke expert system.

Aspects of the present invention may be provided in a downloadable form or otherwise on a computer readable medium, such as a CD ROM, that contains program code that, when instantiated, executes the link embedding functionality at a web-server or the like.

The doctoral thesis of Joseph Michael William Lyske titled "Meta Creation for Film Scores", contemporaneously and first published on 31 Mar. 2021 by the School of Electronic Engineering and Computer Science, Queen Mary, University of London, is incorporated in its entirety herein by reference.

The invention disclosed herein is applicable to any musical scale and any cultural precondition, not just Western music which has been used as an exemplary format.

As disclosed herein, whilst the Form Atom provides an extremely important building block upon which generative composition can be based, the totality of the disclosure includes multiple independent (but related) aspects that, together, provide a comprehensive implementation having considerable detail, including the use of the hypernode framework. For example, from a composition perspective, the classification and manipulation of textures is highly significant. For example, stand-alone technical solutions are related to the process by which chord spacing is determined, as well as how primitives are developed and employed within the context of building a generative system.

It will, of course, be appreciated that the above description has been given by way of example only and that modifications in detail may be made within the scope of the present invention. For example, whilst the generative system has been expressed in the context of Western music having a particular degree of scale, the techniques are commutable to other styles and metres.

The analysis technique, coupled with the generative framework, gives a foundation for looking at music hierarchically in a way that leads to effective output. This is not only a useful method of creating aesthetically functional generative film composition and game scores that can, in fact, be orchestrated personally by the user provided that they are given access to the system via an interface and a database containing Form Atoms meta-tagged to artists and songs of their personal liking.

Completely autonomous solutions are feasible, based on the given hierarchy, in which computers analyse works and compose music based on analysis. For example, a trained artificial intelligence mechanism, such as deep learning neural networks and generative algorithms with associated fitness functions, can learn how to select appropriate primitives based on a score. This approach leads to more efficient ways to create ever smaller sets of heuristics [Occam's Razor] that can generate the same standard of output from the same set of analysed compositions. The only thing then left for humans potentially to do would be to meta-tag the emotional concepts, although even this task can be made the subject of AI networks (such as those in described in US 2020-0320398 and related works) that close the semantic gap and which make use of NLP or file properties to correlate to with emotional perception. The skilled person will thus understand which aspects of the system intelligence may benefit for different forms of processor.

What is claimed is:

1. A Form Atom defined by self-contained constructional properties contained within metadata associated with the Form Atom and where the self-contained properties are representative of an historical corpus of music and where the Form Atom comprises:

a generative set of heuristics that support generation of a set of chords in a chord scheme or many different sets of chords in the same or different tonics that achieve a same form function and which thus have similar associated emotional/musical connotations, and chord spacer heuristics that space out temporally any number of generated chords across a defined window of musical time;

a tag that describes compositional heuristics of its respective Form Atom;

a chord list in a local tonic where the chord list defines branching structures giving options for generation of different chords from the local tonic, and a progression descriptor in combination with a form function that expresses musically one of a question, an answer and a statement, wherein:

the metadata creates a meta-map of a chord scheme for a musical section that is linkable to one or more secondary Form Atoms to generate a musical generative composition in which, upon automated selection and concatenation of musically related Form Atoms by a computing system operationally arranged to identify and select different Form Atoms, musical good form is established in the musical generative composition based on compatible heuristics, chord lists and progression descriptors of each Form Atoms selected for adjacent concatenation, and wherein:

musical good form is compliant with conventions in accepted musical composition and musical good form contrasts with musical bad form in which there is no obvious or known linking that makes any discernible musical sense between successive musical phrases and in which musical bad form fails to communicate structure because sound signals cannot logically be processed into a sensually resolvable anticipatory order.

2. The Form Atom of claim 1, wherein:

a question is a chord scheme suggesting musical tension requiring mental settlement as indicated by notes that have appeared within a harmony or melody and which are questionably present because they are outside of the key centre of the local tonic of the Form Atom;

an answer is the resolution of the question which operates to resolve the presence of the questionable tones (i.e., pitch) or notes (i.e., pitch with duration) from the mind's perspective by reinforcing the key centre of either the local tonic or any new tonic of the answering Form Atom; and a statement is entirely self-contained from a musical question and doesn't imply or induce any meaningful musical tension that requires release through resolution; a statement is neither a question nor an answer.

3. The generative composition of claim 2, wherein multiple successive questions can be asked musically.

4. A database comprising a multiplicity of Form Atoms according to claim 1.

5. The database of claim 4, wherein for each Form Atom:

a question is a chord scheme suggesting musical tension requiring mental settlement as indicated by notes that have appeared within a harmony or melody and which are questionably present because they are outside of the key centre of the local tonic of the Form Atom;

an answer is the resolution of the question which operates to resolve the presence of the questionable tones (i.e., pitch) or notes (i.e., pitch with duration) from the mind's perspective by reinforcing the key centre of either the local tonic or any new tonic of the answering Form Atom; and a statement is entirely self-contained from a musical question and doesn't imply or induce any meaningful musical tension that requires release through resolution; a statement is neither a question nor an answer.

6. The generative composition of claim 5, wherein multiple successive questions can be asked musically.

7. A generative composition comprised from a plurality of groups of Form Atoms each according to claim 1, wherein each group includes a plurality of Form Atoms that are selected to provide harmonic structure to the group and in which each group said Form Atoms have similar tags but different constructional properties.

8. The generative composition of claim 7, wherein adjacent Form Atoms are linked through Markov-chain associations that identify, from the historical corpus, prior transitions that have worked musically with good form.

* * * * *